(12) United States Patent
Piestun et al.

(10) Patent No.: US 11,994,533 B2
(45) Date of Patent: May 28, 2024

(54) METHODS AND SYSTEMS FOR SCANNING PROBE SAMPLE PROPERTY MEASUREMENT AND IMAGING

(71) Applicant: The Regents of the University of Colorado, a body corporate, Denver, CO (US)

(72) Inventors: Rafael Piestun, Boulder, CO (US); Simon Labouesse, Boulder, CO (US); Markus B. Raschke, Boulder, CO (US); Eric Muller, Hamilton, NY (US); Samuel Johnson, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 702 days.

(21) Appl. No.: 17/105,475

(22) Filed: Nov. 25, 2020

(65) Prior Publication Data
US 2021/0080484 A1  Mar. 18, 2021

Related U.S. Application Data

(63) Continuation-in-part of application No. PCT/US2019/034200, filed on May 28, 2019.
(Continued)

(51) Int. Cl.
*G01J 3/02* (2006.01)
*G01J 3/10* (2006.01)
(Continued)

(52) U.S. Cl.
CPC ............ *G01Q 60/22* (2013.01); *G01J 3/0208* (2013.01); *G01J 3/10* (2013.01); *G01J 3/2846* (2013.01);
(Continued)

(58) Field of Classification Search
CPC ........ G01Q 10/06; G01Q 60/22; G01Q 60/06; G01Q 30/04; G01J 3/10; G01J 3/028; G01J 3/2486; G01J 3/4412; G01J 3/45
See application file for complete search history.

(56) References Cited

U.S. PATENT DOCUMENTS

| | | | |
|---|---|---|---|
| 5,412,980 A | 5/1995 | Elings et al. | |
| 8,488,895 B2 * | 7/2013 | Muller | G02B 21/0048 382/128 |

(Continued)

FOREIGN PATENT DOCUMENTS

| | | |
|---|---|---|
| WO | 2015/126826 A1 | 8/2015 |
| WO | 2017/185161 A1 | 11/2017 |
| WO | WO-2017185161 A1 * | 11/2017 ............. G01B 11/24 |

OTHER PUBLICATIONS

International Application No. PCT/US2019/034200, International Search Report & Written Opinion, 12 pages, Aug. 16, 2019.

*Primary Examiner* — David E Smith

(57) ABSTRACT

Infrared (IR) vibrational scattering scanning near-field optical microscopy (s-SNOM) has advanced to become a powerful nanoimaging and spectroscopy technique with applications ranging from biological to quantum materials. However, full spatiospectral s-SNOM continues to be challenged by long measurement times and drift during the acquisition of large associated datasets. Various embodiments provide for a novel approach of computational spatiospectral s-SNOM by transforming the basis from the stationary frame into the rotating frame of the IR carrier frequency. Some embodiments see acceleration of IR s-SNOM data collection by a factor of 10 or more in combination with prior knowledge of the electronic or vibrational resonances to be probed, the IR source excitation spectrum, and other general sample characteristics.

46 Claims, 30 Drawing Sheets
(27 of 30 Drawing Sheet(s) Filed in Color)

Related U.S. Application Data

(60) Provisional application No. 62/676,675, filed on May 25, 2018.

(51) Int. Cl.
    *G01J 3/28*     (2006.01)
    *G01J 3/44*     (2006.01)
    *G01J 3/45*     (2006.01)
    *G01Q 10/06*     (2010.01)
    *G01Q 30/04*     (2010.01)
    *G01Q 60/06*     (2010.01)
    *G01Q 60/22*     (2010.01)

(52) U.S. Cl.
    CPC ............... *G01J 3/4412* (2013.01); *G01J 3/45* (2013.01); *G01Q 10/06* (2013.01); *G01Q 30/04* (2013.01); *G01Q 60/06* (2013.01)

(56) References Cited

U.S. PATENT DOCUMENTS

2010/0328657 A1* 12/2010 Dholakia .................. G01J 3/44
    356/300
2017/0219621 A1* 8/2017 Andreev ................ G01Q 20/02
2017/0284867 A1* 10/2017 Gensemer ............. G01J 3/0221

\* cited by examiner

Amide

PTFE

RuOEP

SiO$_2$

METHODS AND SYSTEMS FOR SCANNING PROBE SAMPLE PROPERTY MEASUREMENT AND IMAGING

CROSS-REFERENCE TO RELATED APPLICATIONS

This application is a continuation-in-part of International Application No. PCT/US2019/034200 filed May 28, 2019, which claims priority to U.S. Provisional Application No. 62/676,675 filed May 25, 2018, which is incorporated herein by reference in its entirety for all purposes.

STATEMENT REGARDING FEDERALLY SPONSORED RESEARCH

This invention was made with government support under grant number 1548924 awarded by the National Science Foundation. The government has certain rights in the invention.

TECHNICAL FIELD

Various embodiments of the present technology generally relate to imaging, quantitative imaging, and spectroscopy. More specifically, some embodiments relate to sensing spectroscopy and imaging collecting less data.

BACKGROUND

Infrared (IR) vibrational scattering scanning near-field optical microscopy (s-SNOM) has advanced to become a powerful nanoimaging and spectroscopy technique with applications ranging from biological to quantum materials. For example, s-SNOM can provide a variety of information of optical properties of a sample under investigation. Typically, this is done by focusing an incident IR light onto a tip collecting the scattered light which can be used to detect the optical properties of the sample. A raster scan is done to measure the sample. Unfortunately, full spatiospectral s-SNOM continues to be challenged by long measurement times and drift during the acquisition of large associated datasets.

SUMMARY

Various embodiments of the present technology provide for various techniques and systems for computational spatiospectral s-SNOM by transforming the basis from the stationary frame into the rotating frame of the IR carrier frequency. In accordance with various embodiments, an acceleration of IR s-SNOM data collection can be increased by a factor of 10 or more in combination with prior knowledge of the electronic or vibrational resonances to be probed, the IR source excitation spectrum, and other general sample characteristics. In some embodiments, a sample can be identified within a spectroscopy system. Then, using a smart sampling system connected to the spectroscopy system, a grid to the sample can be applied. The smart sampling system can then generate instructions that when executed by one or more processors cause a spectroscopy system to perform a spectroscopy analysis of the sample based a subset of measurements from the grid in a selected pattern. These instructions can then be executed to perform the spectroscopy analysis in accordance with the instructions.

In some embodiments, a scan of the sample can be pre-shaped in phase, amplitude, or spectrum, before or after light is incident on the sample. The selected pattern may be a pseudo random pattern that takes into account information regarding a physical setup of components of the spectroscopy system or estimated information regarding the sample. The estimated information regarding the sample can includes pulse spread time or members of chemical species. In some embodiments, the subset of measurements taken from the grid can be fed back and the subset can be updated to include additional measurement from other areas of the grid. In addition, some embodiments may generate an optimized trajectory of a tip of a probe that minimizes scanning time. A carrier frequency can be shifted into a rotating frame to reduce a number of data points required to sample a spectrum of the sample.

In some embodiments, a profile hint (e.g., identifying specific properties of such as, but not limited to, resonances of interest) associated with the sample that is the subject of the spectroscopy analysis can be received or determined. Instructions for performing the spectroscopy analysis of the sample can be generated. The instructions can be based on a selected subsampling of the sample (e.g., which may be based on the profile hint). The instructions can be communicated (e.g., wirelessly or via a wired connection) to a spectroscopy analysis system that performs the spectroscopy analysis in accordance with the instructions. In some embodiments, the instructions can cause the spectroscopy analysis system to shift a carrier frequency into a rotating frame to reduce a number of data points required to sample a spectrum of the sample. The instructions may also cause the spectroscopy analysis system to identify two basis vectors spanning a rotated space and measure a complex-valued field using amplitude modulated two-phase homodyne imaging. In some embodiments, the instructions can cause the spectroscopy analysis system to generate spectroscopically resolved voxels by repeating the two-phase homodyne imaging at each reference arm delay, stack resulting images, correct for spatial drift, and Fourier transform an interferogram at each pixel using the rotating frame.

In accordance with various embodiments, the profile hint can identify resonances of interest and a spectral resolution and maximum measure frequency are selected based on the resonances. The instructions, in some embodiments, may cause the spectroscopy analysis system to feed back the subset of measurements taken from the grid, update the subset to include additional measurement from other areas of the grid; and/or generate an optimized trajectory of a tip of a probe that minimizes scanning time.

Embodiments of the present technology also include computer-readable storage media containing sets of instructions to cause one or more processors to perform the methods, variations of the methods, and other operations described herein.

Some embodiments of a smart sampling scattering scanning nearfield optical microscopy system can include a probe with a tip, a light source, a smart sampling system, a spectroscopy analysis system, and a reconstruction module. The probe can be connected to an actuator to move the tip to a desired location over a sample. The light source can illuminate the tip of the probe and at least a portion of the sample. The smart sampling system can be configured to generate instructions to perform a spectroscopy analysis of the sample by scanning selected areas within a grid covering the sample. The spectroscopy analysis system can be communicably coupled to the smart sampling system and configured to take measurements from the selected areas within the grid covering the sample and perform a spectroscopy analysis based on the measurements collected. The reconstruction module can be configured reconstruct an image of the sample from the spectroscopy analysis based on the measurements collected from the selected areas.

In a first aspect, the disclosure provides smart sampling scattering scanning near field microscopy system. The system may include a probe to generate measurement signals based on a location of the probe relative to a sample. The system may also include an actuator. The probe can be operably coupled to the actuator to move the probe to a desired location over the sample. The system may further include a sampling system capable of generating instructions to determine the location, and a state, of the probe. The system may also include a reconstruction module to reconstruct a representation of the sample based on the measurements collected from selected areas of the sample. The reconstruction module can be implemented in the system of the first aspect, the method of the second aspect, and/or the apparatus of the third aspect, as hardware components (e.g., application-specific integrated circuit(s)) and/or software code associated with a computing device or a computer processing system including one or more processors and at least one memory device storing the software code as program instructions executable by the processors to perform, implement, or otherwise facilitate at least some of the functions and other operations of the systems, methods, and apparatuses according to the present technology.

In an embodiment of the system of the first aspect, the probe may be an optical probe. The system can include, or be associated with, a light source that may be positioned or otherwise capable illuminate at least one of: the probe, and at least a portion of the sample. The probe can generate signals for processing to facilitate retrieval of an optical spectrum. For generating the signals facilitating optical spectrum retrieval, the probe may include one or more of: a spectrometer, an interferometer, a grating spectrometer, a Fourier transform spectrometer, an optical homodyne, a heterodyne detection component, and a laser. The optical spectrum can provide spectroscopic data including a spatial analysis or a spectral analysis. In an example, the system includes a spectrometer. In the example, the sampling system may be configured to, or otherwise capable of, dividing the sample into a grid, where the instructions generated by the sampling system may cause the probe to select a pseudo-random subset of the grid for a spectroscopy analysis.

In another embodiment of the system of the first aspect, the sampling system is configured to, or otherwise capable of, determining the location and the state of the probe based on prior signals collected by the probe. In an example, the sampling system may be configured to, or otherwise capable of, determining the location, and the state, of the probe based on prior knowledge about at least one of: the sample, and the sampling system. In the example, the prior knowledge may include at least one of: a light source spectrum, a spectral sparsity of the sample, a number of distinct chemical species, compositional characteristics of the sample, and structural features in the sample.

In yet another embodiment, the sampling system may be configured to, or otherwise capable of, dividing the sample into a grid, wherein the instructions generated by the sampling system may cause the probe to select a pseudo-random subset of the grid. In an example, the probe can operate in a plurality of probe states. In the example, the probe can be configured to, or otherwise capable of, measuring different qualities of the sample at a given location. Also, in this example, the system can also include a Fourier transform interferometer including a mirror, where the plurality of probe states may correspond to different positions of the mirror.

In still another embodiment of the system of the first aspect, the sampling system may be configured, or otherwise capable of, dividing the sample into a grid, where the instructions generated by the sampling system can cause the probe to at least one of: select a subset of the grid, and a subset of the states of the measurement probe. In an example, the sampling system can be configured to, or otherwise capable of, dividing the sample into a grid, where the instructions generated by the sampling system can cause the probe to: first use a random spatial sampling of the grid to collect data, and then use the collected data to identify the selected areas within the grid covering the sample.

In another example embodiment of the system of the first aspect of the disclosure, the representation provided by the reconstruction module may include at least one of: spatial information, and spectral information, about the sample. In yet another example embodiment, the representation may include sub-diffraction limit spatial resolution information about the sample. In still another example embodiment, the reconstruction module may be configured to, or otherwise capable of, reconstructing the representation to include nanometer scale images having at least one of intrinsic vibrational, phonon, and electronic resonance contrast. In another example embodiment, the reconstruction module may be configured to, or otherwise capable of, reconstructing the representation to include information about at least one of: biological, molecular, and quantum, systems. In yet another example embodiment, the sampling system may be configured to, or otherwise capable of, providing sub Nyquist sampling. In still another example embodiment, the sampling system may be configured to, or otherwise capable of, performing at least one of: compressed sampling, matrix completion, and adaptive random sampling. A person having ordinary skill in the art is expected to understand and appreciate that the various embodiments of the system of the first aspect may be utilized, without undue experimentation, with any of the embodiments of the present technology disclosed herein, include those described with reference to the second and third aspects.

In a second aspect, the disclosure provides a method. The method may be implemented using the system of the first aspect of the disclosure. The method may include the step of identifying a sample within an imaging and spectroscopy system. The method may also include the step of applying, using a smart sampling algorithm, a grid to the sample. The method may further include the step of generating, using the smart sampling algorithm, encoded instructions that, when executed by one or more processors, can cause the system to obtain a spectral image representation of the sample. In the method, the spectral image representation can be based on a subset of measurements from the grid in a selected pattern. The smart sampling algorithm can be implemented in the system of the first aspect, the method of the second aspect, and/or the apparatus of the third aspect, as hardware components (e.g., application-specific integrated circuit(s)) and/or software code associated with a computing device or a computer processing system including one or more processors and at least one memory device storing the software code as program instructions executable by the processors to perform, implement, or otherwise facilitate at least some of the functions and other operations of the systems, methods, and apparatuses according to the present technology.

In an embodiment of the method of the second aspect, the method may include the step of pre-shaping a scan of the sample in phase, amplitude, or spectrum, before light is incident on the sample. In an example, the method may include the step of pre-shaping a scan of the sample after light is incident to the sample. In another example, the selected pattern in the method may be a pseudo random pattern, where the pseudo random pattern can take into account information regarding at least one of: a physical setup of components of the system, and estimated information regarding the sample. In yet another example, the selected pattern may be a pseudo random pattern, where the pseudo random pattern can take into account information regarding estimated information regarding the sample, the estimated information including at least one of: pulse spread time, and members of chemical species. In still another example, the method may include the steps of: feeding back the subset of measurements taken from the grid, and updating the subset to include, or remove, a measurement from other areas of the grid.

In another embodiment of the method of the second aspect, the method may include the step of generating an optimized trajectory of a probe to facilitate minimizing a scanning time. In an example, the method may include the step of shifting a carrier frequency into a rotating frame to reduce a number of data points required to sample a spectrum of the sample. A person having ordinary skill in the art is expected to understand and appreciate that the various embodiments of the method of the second aspect may be utilized, without undue experimentation, with any of the embodiments of the present technology disclosed herein, including those described with reference to the first and third aspects.

In a third aspect, the disclosure provides an apparatus. The apparatus may be employed in the system of the first aspect or the method of the second aspect. The apparatus includes a non-transitory computer readable medium and a processing system. The non-transitory computer readable medium can have program instructions (e.g., software code) stored thereon. When executed by the processing system, the program instructions may direct the processing system to receive a profile hint associated with a sample that is the subject of spectroscopy analysis. When executed by the processing system, the program instructions may also direct the processing system to generate encoded instructions for performing the spectroscopy analysis of a sample based on selected subsampling of the subject. When executed by the processing system, the program instructions may further direct the processing system to generate encoded instructions for performing the spectroscopy analysis of a sample based on selected subsampling of the subject. When executed by the processing system, the program instructions may also direct the processing system to communicate the instructions to a spectroscopy analysis system that performs the spectroscopy analysis in accordance with the encoded instructions generated by the processing system. In an example, the apparatus further includes the spectroscopy analysis system.

In an embodiment of the apparatus of the third aspect, the encoded instructions generated by the processing system may cause the spectroscopy analysis system to shift a carrier frequency into a rotating frame to facilitate reducing a number of data points required to sample a spectrum of the sample. In an example, the encoded instructions further cause the spectroscopy analysis system to: identify two basis vectors spanning a rotated space, and measure a complex-valued field using amplitude modulated two-phase homodyne imaging. In another example, the encoded instructions generated by the processing system may cause the spectroscopy analysis system to generate spectroscopically resolved voxels by: repeating the two-phase homodyne imaging at each reference arm delay, stacking resulting images, correcting for spatial drift, and Fourier transforming an interferogram at each pixel using the rotating frame.

In another embodiment of the apparatus of the third aspect, the profile hint identifies resonances of Interest. In the embodiment, a spectral resolution and a maximum measure frequency can be selected based on the resonances. In an example, the encoded instructions generated by the processing system may cause the spectroscopy analysis system to: feedback a subset of measurements taken from a grid, update the subset to include an additional measurement from other areas of the grid, and generate an optimized trajectory of a tip of a probe to facilitate minimizing a scanning time. A person having ordinary skill in the art is expected to understand and appreciate that the various embodiments of the apparatus of the third aspect may be utilized, without undue experimentation, with any of the embodiments of the present technology disclosed herein, including those described with reference to the first and second aspects.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present technology will be described and explained through the use of the accompanying drawings.

Figure 1:
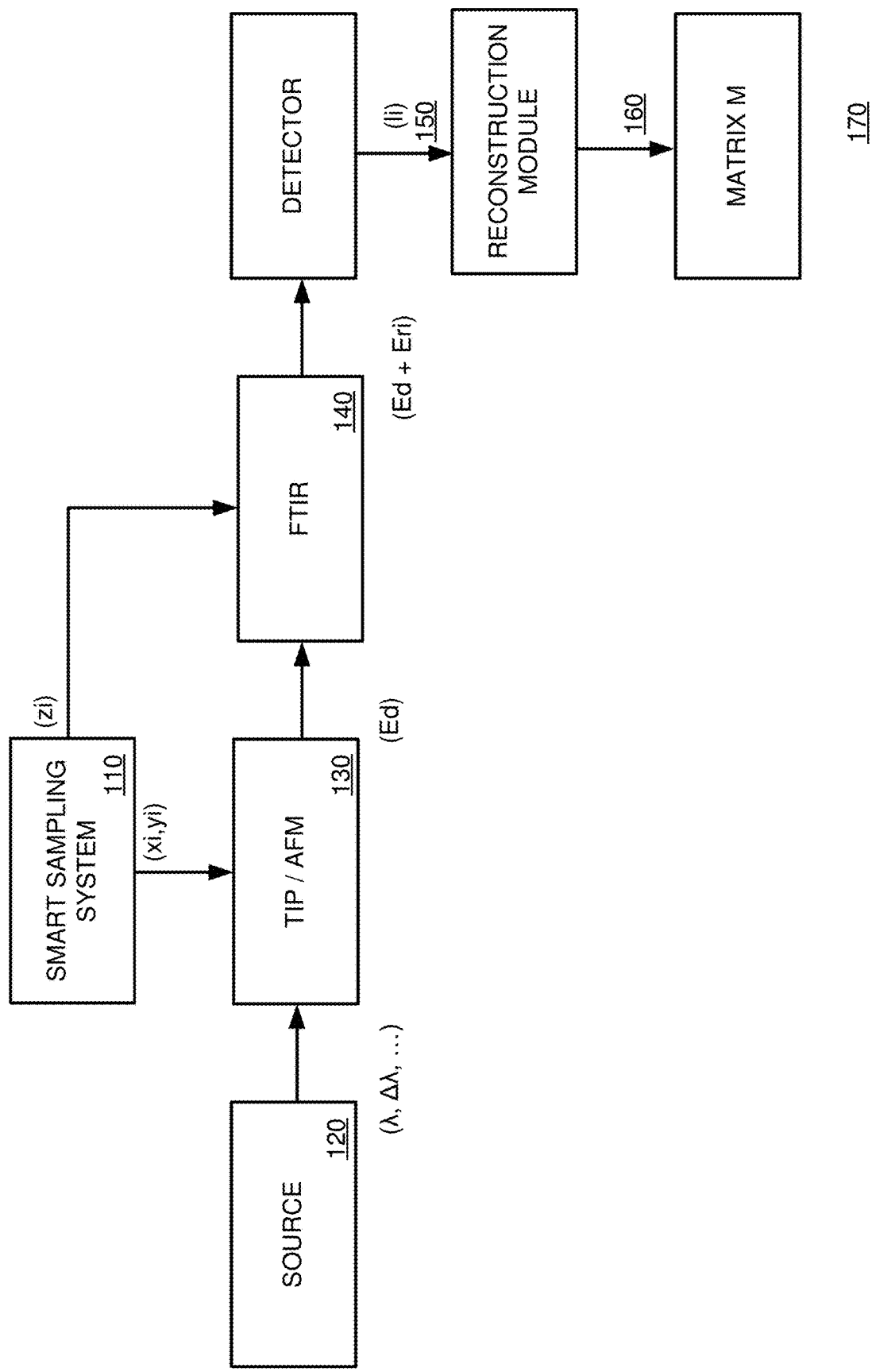
FIG. 1 is a block diagram illustrating various components of a smart s-SNOM system that may be used in various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to quantitative imaging and spectroscopy. More specifically, some embodiments relate to sensing Fourier transform infrared nano-spectroscopy and imaging. Some embodiments of the present technology include a scanning probe apparatus and method that generates at least one of the following: images, spectra, and sensing data representing physical/chemical properties of a sample. The method and system can include hardware, smart algorithms (as described in more detail below), a post-processing unit, and (possibly) real-time feedback.

As used herein, "probe" means a device that is capable of interacting with electrical or magnetic fields. More specifically, near field probes are sensitive devices that interact with the electrical or magnetic field in close proximity to a sample. Such probes are use across the electromagnetic spectrum. In particular, they are used in the optical regime, including near infrared radiation. The optical near fields exist in the near vicinity of material boundaries. Materials' inhomogeneities create concentrations of fields to sub-diffraction limit dimensions. Near-field probes are important devices in near field optical microscopes, including s-SNOM. The probe can be used to locally illuminate the sample or to collect light from the sample. In some cases, both situations are present. The spatial resolution of these microscopic and nanos copia techniques depends on the capability of the probe to confine energy. Illumination of sample and or probe is typically performed with lasers, but can also consist of other types of radiation such as from a synchrotron. Optical near field probes can be, for instance, dielectric, including tapered optical fibers and glass structures such as pyramids. They can also be dielectric with a metal coating to create an effective aperture probe. Atomic force microscopy (AFM) probes are typically made of silicon or silicon nitride and can as well be used for optical detection and excitation. Metal probes are effectively optical antennas, which can, for instance, be in the form of tips, bow ties, scatterers, or more elaborate shapes to help localize and impedance match the radiation. See for instance: Principles of Nano Optics, L. Novotny, B. Hecht, second edition, Cambridge University Press. 2012, which is incorporate herein in its entirety.

Some embodiments of the instrument can be based on a probe (e.g., tip, nanoparticle, etc.) held at a distance less than a few 100 nm above a sample surface, and scanned across the surface. At least one signal emitted from the tip can be detected. An image can be obtained by correlating said signal with the position of the probe above the sample. The image can represent the sensing data, namely one or various physical/chemical properties such as spectral characteristics, chemical composition, temperature, electromagnetic material properties including dielectric permittivity or permeability, absorption, or index of refraction.

An algorithm-based adaptive scanning method can be used in some embodiments to acquire images of samples at a faster rate than allowed by Nyquist sampling, by using fewer samples to obtain the same or better image content compared to methods not using the approach. Some embodiments use prior knowledge (e.g., material properties, laser source spectrum, sparsity, molecule type, or any other physical attribute known about this instrument, the experiment, the sample, and the like) to enable what is defined as smart sampling. Having prior knowledge enables the design of the "smart" algorithm. Machine-learning tools can be used in some embodiments to make the algorithm smarter by enabling the system to learn from calibration and prior data collection and imaging experiments.

Some embodiments can include a "data collection protocol" to guide the apparatus to collect/scan the data. Scanning can be performed parallel to the average surface of the sample, following the topography of the sample, or along different three-dimensional surfaces above the sample while always staying within a few 100 nm distance from it. The result is an enhanced image with multi-dimensional spatial resolution. In addition to providing faster data collection, smart sampling can also be used to provide better resolution, discrimination between samples, or classification of sample choices.

The smart sampling Scattering Scanning Nearfield Optical Microscopy (sSNOM) used in various embodiments can provide a sampling strategy consisting of sampling data points and possibly optimal trajectories for the probe. Trajectories and sampling points can be adaptive, namely they will be determined or redefined as the data collection is taking progress based on a feedback mechanism that takes into account the ongoing collecting data. Optical signal collection in sample scanning is one embodiment that was built and demonstrated, though this method can be used for other modalities.

The optical signal can be generated by the probe in proximity to the sample of less than a few 100 nm, and where the optical signal contains a signal about a physical property of the sample. The probe can be illuminated by a light source of any kind over any wavelength range. The light can be of any spectral characteristics, it can be broadband or narrowband, it can be pulsed or continuous wave. The optical signal can be emitted, radiated, or scattered by the tip. The optical signal can be detected by a photodetector or spectrometer. The spectrometer can be used on but not limited to a grating spectrometer, Fourier transform spectrometer, or any form of optical homooder heterodyne detection. The optical signal is where the optical spectrum (tip-scattered light) is acquired.

For an optical scanning system, either the input light or the scattered light can be spectrally resolved. This spectrometer can have all the smart controls which the spatial sampler has. The spectrum can be, besides optical, either force, current, temperature, magnetics, surface potential or any physical or chemical property that the probe is sensitive to an interaction with the sample. Either "pre-shaping", in phase, amplitude, polarization, or spectrum, can also be done before light is incident on the sample, or shaping can be done after light is incident, or a combination of the above two can be used with the scattered light and the source light. The probe can interact with the sample within the optical near field.

Some embodiments of the present technology can use a rotating frame method for spectral acquisition that utilizes prior knowledge of the bandwidth of the source and central carrier frequency. Knowing these two parameters, the Nyquist sampling limit is more accurately understood as having a necessary cutoff frequency equal to the bandwidth of the source. For example, a light source with a center frequency of 1400 $cm^{-1}$ and a bandwidth of 400 $cm^{-1}$ would traditionally be viewed as having a Nyquist cutoff frequency of 1600 $cm^{-1}$ for complete data reconstruction. However, utilizing the prior knowledge of the laser specifications, the 1600 $cm^{-1}$ requirement is reduced to 400 $cm^{-1}$. Practically, as an example in FTIR spectroscopy—to which this method is not limited—the maximum step size of mirror delay can be increased by a factor of 4 (based on the example given above) to match the Nyquist limit. The utilization of this prior knowledge is independent of specific hardware implementation and can be used where a signal has a finite bandwidth and a center frequency displaced from zero.

Various embodiments of the present technology provide for a wide range of technical effects, advantages, and/or improvements to computing systems and components. For example, various embodiments include one or more of the following technical effects, advantages, and/or improvements: 1) faster, higher resolution (gained from faster scans); 2) higher resolution is also related to the size of the tip; 3) if the sample is drifting, movement is compensated and clearer images are obtained; 4) use of smart sensing in nano-spectroscopy; 5) a nano-spectroscopy system with a raster scan; 6) use of unconventional and non-routine computer operations to scan the tip in a special trajectory above the surface to sample a reduced number of points, and reconstruct an image by an algorithm with a higher image content than the sample point image itself; 7) spectrally controlling/shaping the light incident on the tip; 8) changing the manner in which a computing and/or spectroscopy system reacts spectroscopy commands; and/or 9) use of a rotating frame that allows sampling is achieved by interferometer stage movement controlled by algorithms informed about the carrier frequency of the incident light wave.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Scattering Scanning Nearfield Optical Microscopy (sSNOM) can recover meaningful material characteristics with high spatial resolution of about 20 nm, far beyond the diffraction limit by applying near field based techniques. Light is coupled to a scanning probe acting as a vibrating antenna. The vibration allows to identify components of the light interaction with the top and so to increase the spatial resolution. The spectrum of the diffracted light is recorded with an interferometer providing information about the sample like, bio-minerals, quantum materials, molecules. Coupled with Fourier-transform infrared spectroscopy (FTIR), sSNOM is sensitive to specific atomic bound vibrations in molecules. To cover the full mid-IR spectral range broad emission spectra are required, covering the wavenumber range from 400 cm$^{-1}$ to 4000 cm$^{-1}$. Acquisition time of sSNOM hyperspectral images depends on the used light source spectral range and irradiance, and can be up to several days.

Various embodiments of the present technology generalize compressed sampling ideas to sSNOM to reduce the acquisition time or improve performance. In accordance with various embodiments, (usually ignored) redundancies in sSNOM data can be used to reduce the necessary number of sample points without scarifying physical information. FIG. 1 is a block diagram illustrating various components of a smart Scattering Scanning Nearfield Optical Microscopy (sSNOM) system 100 that may be used in various embodiments of the present technology. As illustrated in FIG. 1, smart sSNOM system 100 can include a smart sampling system 110, light source 120, tip/AFM 130, FTIR 140, detector 150, reconstruction module 160, and matrix 170. Diffraction limited application resolution is limited to about half wavelength of the light source.

As illustrated in FIG. 1, light source 120 can be shined onto a nanometric vibration tip 130 and interact with the sample. Interference between light diffracted by the sample and a referential arm is then recorded. Vibration of the tip 130 allows smart sampling system 110 to isolate the signal coming from few hundred nanometers around the top. The achievable resolution is approximately proportional to the size of the tip 130 and is no longer limited by diffraction. Usually the tip 130 performs a scan covering a rectangular area of the object, the spatial sampling points are distributed along a regular discrete grid of evenly spaced points. A Michelson interferometer is commonly used to acquire FTIR interferograms 140. One point of FTIR data corresponds to one delay between reference and signal light, usually a mirror is moved with a constant speed and measurements are periodically performed. Classical measurement schemes provide a hyperspectral image.

Call X the sSNOM output matrix gathering all the measurements. Element $X_{ij}$ of the matrix corresponds to one spatial point of the coordinate $(x_i, y_i)$ and one delay $d_j$. The recorded interferograms are stacked along the lines of X. The smart sampling show that physical prior knowledge can be used to limit the data set size and to create a sparse representation of sSNOM data.

Molecules can vibrate with a given number of vibrational modes, this property translates to peaks in vibrational spectrum. Each chemical species has its own vibrational spectrum signature encoding its spatial structure. A mix of different chemical species is present at each spatial point pf the sSNOM measurements and so the Fourier transform of the recorded interferograms is a combination of species' vibrational spectrums. In other terms, sSNOM spectrums are usually sparse, they contain mostly zero values except at specific peak locations.

Furthermore, sensitivity is limited inside the light source bandwidth, hence the desire to use the broadest source with the highest irradiance, such as synchrotron source. Moreover, if the number of chemical species in the sample is small compared to the number of spatial, management points, then all the spectra are a combination of a few chemical vibrational spectra. Under mild assumptions, those properties lead to a small rank for the matrix X. Under linear mixing assumption it can be shown that rank will be smaller than the number of chemical species in the sample. Let $s_k$ represent the pure spectrum of chemical species k and $a_k$ the spatial distribution of abundance or map of concentration. The matrix, $$X=\Sigma_{k=1}^{K} a_k \times s_k^t,$$

And so, the rank of X is at most K. The spatial dimensions also convey some redundancies, for one mirror positions, a tip scan would give one spatial representation of the sample for a given delay. Assuming this image to be piecewise smooth with smooth boundaries, then its 2D wavelet transform is sparse. A counter example would be the presence of a chemical species in only one spatial point which would cause the image to be no longer sparse in the wavelet domain. One could argue that this could be an interesting feature to catch or not and so if the Wavelet domain sparsity should be used or not. Thus, both cases are covered in by various embodiments of the present technology. Some embodiments of the present technology use these assumptions to reduce the number of sampling points to measure and so to greatly reduce the acquisition time.

As previously stated, each measurement $X_{ij}$ requires a demodulation of an intensity signal and there is no guaranty for the result to be a positive value. Compressed sampling (CS) can be used efficiently acquire and reconstruct a signal in some embodiments. Two main assumptions are the sparsity and mathematical incoherence. Note that compressed sensing is only one embodiment of smart sampling. As previously stated, sSNOM data can be represented in a sparse matrix form, called hereafter $\bar{X}$ by applying a 1D Fourier transform along the lines of X and optionally by applying a 2D wavelet transform along the columns $$X=W\bar{X}F$$

where W and F are matrices performing respectively a 2D wavelet transform and a 1D Fourier transform. When no wavelet transform is used, W can be replaced by the identity matrix. Incoherence, insures that local information $p_f$ the signal is spread in all the measurements in different matters, mathematically speaking, if we call φ by n by orthonormal matrix representing linear transform between sparse space representation and measurement space, incoherence is measured by $\mu=\sqrt{n}\max_{ij}$. Some embodiments use the Daubechies orthonormal wavelet transform. Both conditions can be applied to attain a dedicated subsampling strategy and reconstruction algorithm. An empirical study was performed using real data measurement showing the capacity of compressed sampling to increase acquisition speed of sSNOM data.

The capacity of this particular implementation technique has been verified on three different kinds of sample, namely a biomineral, molecular, and quantum material. The physical phenomena into play for each kind are different and so the behavior of the recorded spectrum is. The compressed data conveyed a comparable information as fully sampled data.

Probe based imaging techniques providing interferometric information usually need large number of data points and hence long acquisition time. Various embodiments reduce the data collection requirement and hence the acquisition time by proposing a new sampling strategy and a reconstruction algorithm to recover non-sampled part of the signal or physically significant information. Some embodiments are applicable to any system that includes a scanning probe and possibly a spectrometer. Usually, these system scan a regular rectangular spatial grid with the probe (see FIG. 2) and provide an evenly sampled interferogram for each probe position.

Measurements can be gathered in a hyperspectral image or matrix 170. Consider a scattering Scanning Nearfield Optical Microscopy (sSNOM) setup as an example, the probe is a nanometric tip giving a spatial resolution around 20 nm, then Fourier transform infrared spectroscopy is used to access information on the sample like chemical composition. The light source can be of multiple kind, laser, synchrotron radiation or others, the spectral sensitivity is driven by the bandwidth of the light source.

Hyperspectral images contain multiple redundancies (e.g., spectrum composed of a few peaks, natural images sparse in wavelet domain, few chemical species present in the sample, etc.). Various embodiments can use the multiple redundancies to under-sample this image and then recover desired information with a dedicated algorithm. Redundancies can be interpreted as sparsity of the data in a known domain. For example, the Fourier transform of the interferogram may be a vibrational spectrum containing peaks related to vibrational modes of the molecules present in the sample. Usually, the number of peaks in the spectrum is small enough to consider the spectrum sparse. Moreover, in some applications, the spatial chemical density distribution is piecewise smooth with smooth boundaries. In this case, the wavelet transform of the concentrations map is sparse, a curvelet transform can also be used. The number of chemical components is often small compared to the number of sample points. It can be shown that the rank of the hyperspectral image is small in this case. If a linear mixing model is considered, it can be shown that the rank is at most equal to the number of species. All these sparsity sources can be used to greatly reduce the number of samples necessary to extract desired physical information.

A dedicated sampling strategy can be developed for probe based interferogram imaging. As an example, for sSNOM imaging various embodiments can use physical prior knowledge about the pulses to design a distribution for random sampling. Prior information such as pulse starting delay or envelope pulse maximums can be known in advance. As an example, some embodiments can use a truncated gamma distribution to select the samples to acquire. Spatially prior knowledge like AFM images can be useful to adapt the distribution used for random spatial sampling. Sampling strategy can be optimized by taking Mechanical constraint into account. Various embodiments of the present technology are well adapted to random sampling but are not limited to it, deterministic strategies can also be employed. Adaptive techniques identifying where the next sample to acquire is designated using already acquired samples as prior information can also be used in some embodiments.

Subsampled data alone does not give access to the desired information. A dedicated reconstruction algorithm needs to be used by reconstruction module 160. As an illustration, some embodiments can reconstruct the fully sampled hyperspectral image from subsampled data. All sparsity priors are used to improve the reconstruction quality. The criterion used in some embodiments to minimize is $$J(X)=\|A*\text{vect}(X)-y\|_2^2+G(X).$$

Matrix A is encoding the linear transform from the sparse representation of the hyperspectral image to the sample, it can include a 1D Fourier transform of interferograms dimension, a 2D spatial wavelet transform, or other such transform. The regularization terms allow to favor solutions with desired sparsity $G(X)=\alpha_1\|X\|_{12}+\alpha_2\|X^t\|_{12}+\alpha_3\|X\|_*+\alpha_4\|X\|_1$. A regularization term like l-12, l1 or nuclear norm can be used to respectively enforce sparsity among the columns or lines of X, the small rank of X and finally the sparsity among the entries of X. A reconstructed matrix from which the spectrum and images can be obtained. A generalized Forward-Backward algorithm can be used to minimize criterion J.

---

Algorithm 1: Generalized Forward-Backward [1]

Initialize $x = x_0$
repeat
    Compute $g = \nabla_x F(x)$
    for $i = 0$ to N do
        Compute $z_i = \text{prox}_{N\theta H_i(\bullet)}(2x - z_i - \theta g)$
    end Compute $x = \frac{1}{N}\sum_{k=1}^{N} z_k$ until convergence;
return x

---

In accordance with various embodiments, the output of the algorithm within reconstruction module 160 doesn't need to be a reconstruction of the fully sampled image, it can also be a direct estimation of desired property, like chemical concentrations, pure chemical spectrum or other physical properties. As such, redundancies in probe and spectral based measurements can be used to reduce the number of samples needed to reconstruct the required imaging/spectral information. A dedicated algorithm can then recover meaningful physical information.

Figure 2:
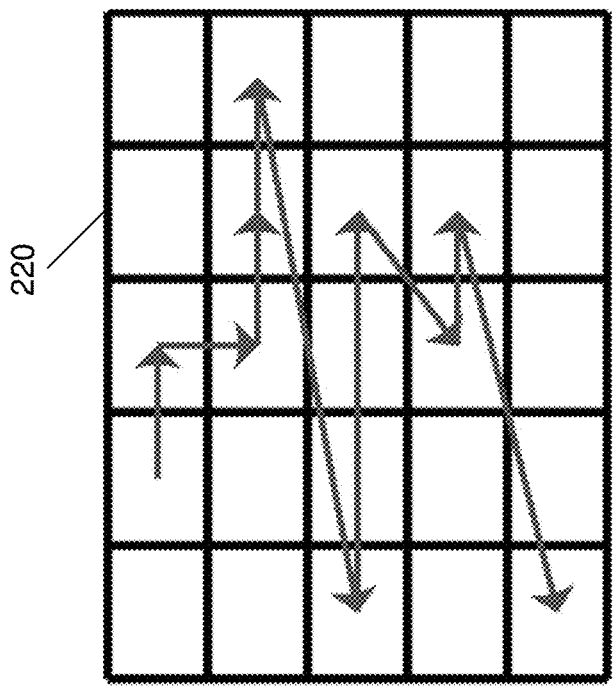
FIG. 2 illustrates is a comparison between a traditional raster scan and a smart scan used by various embodiments of the present technology.
Figure 2:
Figure 2:
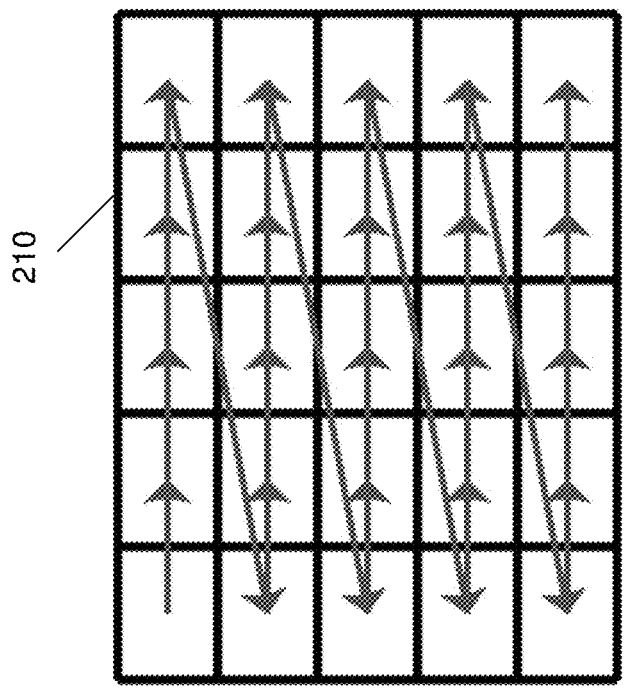

FIG. 2 illustrates is a comparison between a traditional raster scan 210 and a smart scan 220 used by various embodiments of the present technology. The tip position (x,y) can move in step sizes ($\Delta x$, $\Delta y$), which may be fixed or varied. The range (Rx, Ry) over the sample can then be used to identify the number of positions of Nxy with the following formula: Nxy=Rx*Ry/($\Delta x*\Delta y$). As a result, for raster scan sampling, the acquisition time T can be computed by T=t*Nxy*Nz.

Some embodiments may use a random sub-sampling. For example, some embodiments of the SMART sampling can be based on random subsampling of the spectrum and of the spatial dimensions, sparsity priors are used to recover "missing" elements with a dedicated algorithm. The distribution used for random sampling can take into account physical prior knowledge (e.g., pulse starting time, pulse maximum time, AFM image, etc.) or estimated physical prior knowledge (e.g., pulse spread in time, member of chemical species, etc.). An example of a scanning path with SMART sampling is illustrated by smart scan path 220. Mechanical constraints can be considered to improve the sampling strategy for the tip. AFM image can be considered to customize the sampling distribution. For example, some embodiments may use norm of AFM gradient image as distribution.

Figure 3:
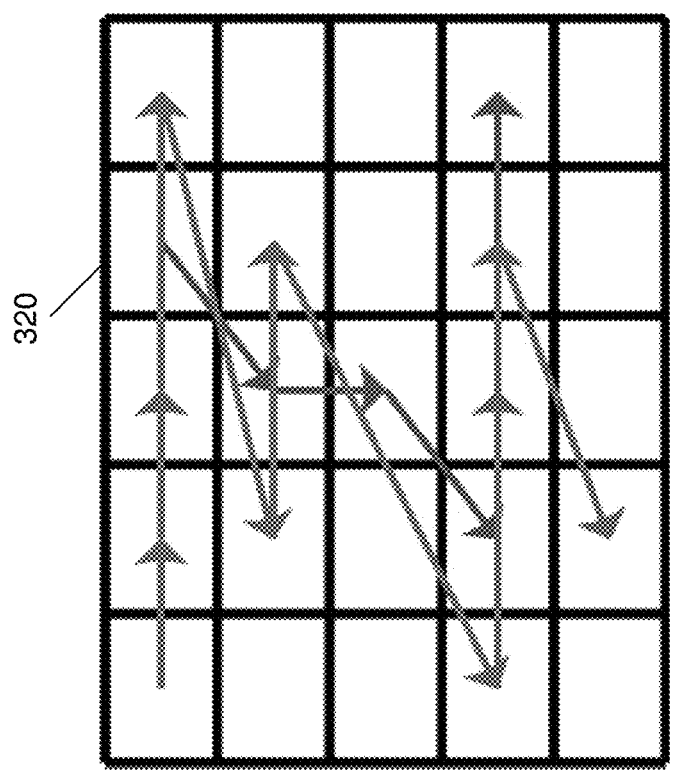
FIG. 3 illustrates an example multiple passes of an adaptive sampling strategy that may be used in various embodiments of the present technology.
Figure 3:
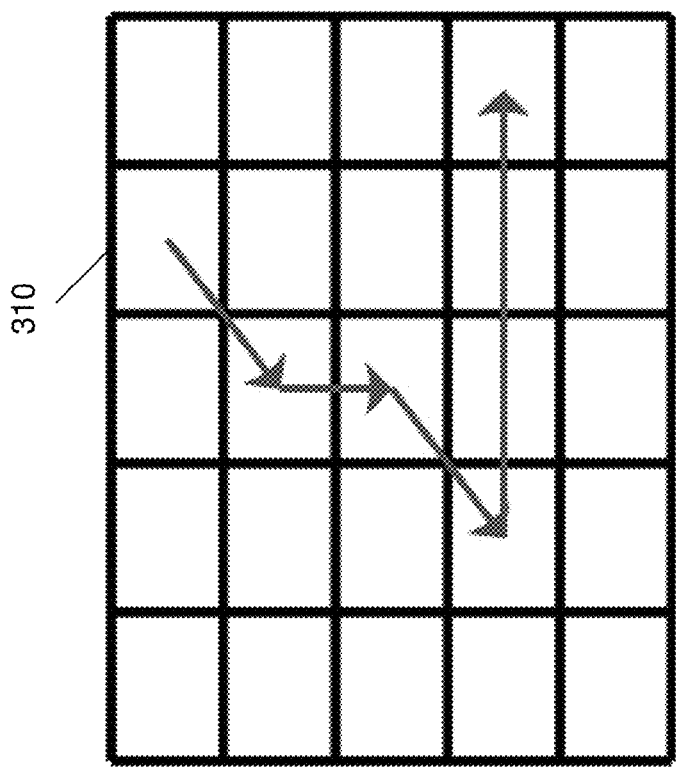

FIG. 3 illustrates an example multiple passes of an adaptive sampling strategy that may be used in various embodiments of the present technology. A first pass 310 allows the system to estimate the spread of the pulses, the number of chemical species or spatial zone of interest. This information can then be used by various embodiments to adjust the second pass 320 sampling distribution. As such, some embodiments use a two-step strategy to reduce the acquisition time of sSNOM data. The first step can include using a smart random subsampling to reduce the number of acquisition points and so the acquisition time. The second step used in some embodiments reconstruct the "missing points" or identifies abundances and types of chemical components using a dedicated algorithm.

Recent advances in infrared (IR) vibrational scattering scanning near-field optical microscopy (IR s-SNOM) have enabled chemical nanoimaging of a wide range of systems including molecular and quantum materials. Of particular note is nanoimaging of biological systems that exhibit structural features on mesoscopic scales ranging from proteins of nanometer dimension to membranes and cytoskeletons of multiple micrometer dimension. These active regions that determine biological function are often sparse and separated by distances far greater than the size of the features of interest.

Desired characteristics in multispectral imaging include high spatial resolution, large field of view, and broad spectral range. However, this leads to growing datasets scaling linearly in measurement time with each spatial and spectral dimension. The associated long measurement times and compounding drift of the sample, signal, source, and detection system, as well as the possible diffusion in active biological systems, limit what can be achieved in conventional Fourier transform IR s-SNOM Fourier transform nanospectroscopy (nano-FTIR) imaging. Therefore, the application of s-SNOM nanospectroscopic imaging for systems with objects of interest that are sparsely distributed but spatially compact, in particular for biomaterials, has remained limited.

High-pixel-density imaging is required in multiscale composite systems as commonly encountered in many chemical or biological systems. In a mollusk shell, as a representative example, the extended shell structure is composed of CaCO3 crystallites of calcite or aragonite. A small amount of interspersed organic material, typically less than 5% by weight, acts as a scaffold that directs growth rates, modifies crystal habit, and controls the type of $CaCO_3$ polymorph to nucleate. However, because of its sparsity, the organic material is difficult to locate and study.

Bulk analysis of decalcified oyster shells shows that the organic component contains proteins, which are often enriched in acidic residues and which can be post-translationally modified, as well as other components like polysaccharides. Furthermore, in situ techniques have localized proteins to sheath-like structures that cover individual $CaCO_3$ crystallites. However, no chemical nanoscopic characterization has yet been performed.

To address these challenges and increase imaging speed, compressive sensing has recently been applied to broadband s-SNOM in its implementation of synchrotron IR nanospectroscopy (SINS). In compressive s-SNOM, the analogous signal to be recovered is assumed to be sparse in some domain and can be fully estimated from a sub-sampled set of measurements. This offers a probabilistic approach to obtaining the desired spectral content at a drastically reduced acquisition time.

Various embodiments can shift the spectroscopic carrier frequency into a "rotating frame" to dramatically reduce the number of data points required for a spectrum. Faster acquisition through rotating frame detection is enabled through a reduction in the required number of sampled points for a given spectroscopic resolution by shifting the carrier frequency of the signal to zero. Rotating frame detection has been extended to time-domain far-field optical spectroscopy, including 2D-IR spectroscopy, enabling improved detection speed and sensitivity.

Various embodiments use a rotating frame detection applied to IR near-field spectroscopy (R-sSNOM) and its performance in chemical imaging within the prismatic region of oyster shells. Some embodiments resolve heterogeneous nanoscale spatial protein distribution in the large scale calcite matrix in nanospectroscopic imaging based on the protein amide I IR response. In nano-FTIR with the use of an IR source of narrow bandwidth, some embodiments move into the rotating frame in order to shift the zero-point frequency to the lowest frequency of the vibrational response. Mathematically, this is analogous to a change of coordinates in the Fourier transform integral where w is shifted by the vibrational resonant frequency $\omega_0$ to $\omega-\omega_0$. This rotating frame s-SNOM imaging technique allows for significantly shorter spectral acquisition times and in-creased spatial data densities. As a result, some embodiments provide a shortening in acquisition time using R-sSNOM by up to a factor of 60 compared to conventional nano-FTIR imaging. This enables higher spatial resolution imaging over large fields of view. R-sSNOM is particularly advantageous for experiments with light sources of intermediate bandwidth and materials with broad vibrational resonances.

Figure 4A:
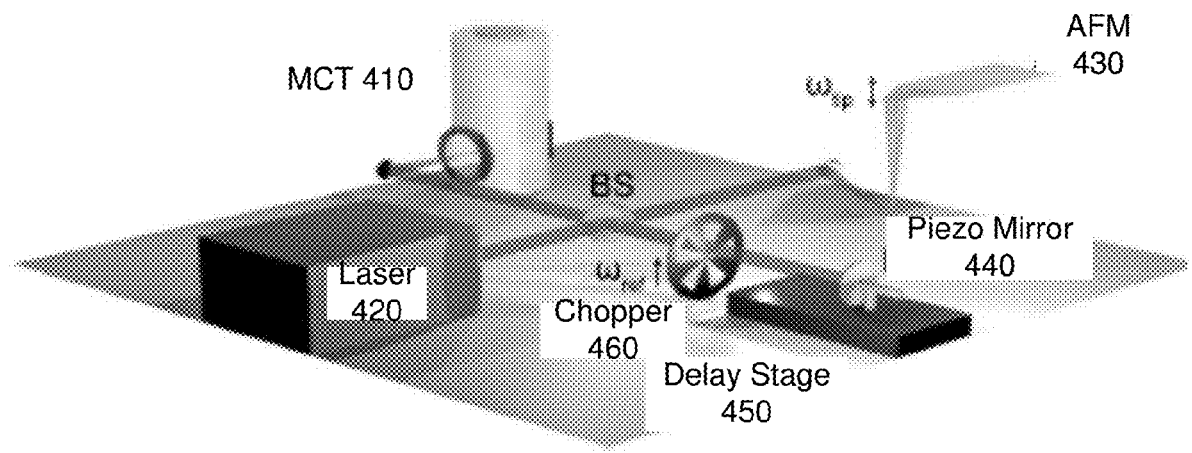
FIG. 4A illustrates a rotating frame s-SNOM (R-sSNOM) experimental design with an IR light source and asymmetric Michelson interferometer that may be used in some embodiments of the present technology.

FIG. 4A illustrates a rotating frame s-SNOM (R-sSNOM) experimental design 400 with an IR light source and asymmetric Michelson interferometer that may be used in some embodiments of the present technology. The IR s-SNOM experimental layout shown in FIG. 4A includes a tunable mid-infrared (mid-IR) light 420 that can be generated by difference frequency generation (DFG) by mixing signal and idler beams in a $AgGaS_2$ crystal (e.g., Harmonixx DFG, APE) from an optical parametric oscillator (e.g., Levante OPO, APE), pumped by a Yb:KGW (e.g., Flint, Light Conversion) femtosecond laser (1034 nm, pulse duration 90 fs, 6 W, 75.7 MHz repetition rate). The IR light is tunable from ~4 μm to ~15 μm (2500 to 650 cm$^{-1}$) with a pulse duration of 150 fs and a full width at half-maximum (FWHM) of ~100 cm$^{-1}$.

In accordance with various embodiments, –18 mW of DFG power can be directed and centered at 1680 cm$^{-1}$ into the s-SNOM instrument (e.g., nanoIR2-s prototype, Anasys Instruments). An off-axis parabolic mirror 440 (e.g., NA 0.45, reflected focal length 25.4 mm) focuses the IR beam onto a gold-coated cantilever atomic force microscope 430 (AFM) tip (e.g., 160AC-GG OPUS, pmash) operating in intermittent contact (tapping) mode. The heterodyne amplified backscattered light can then be detected by a HgCdTe (e.g., MCT KLD-0.5-J1/DC/11, Kolmar Technologies) detector. The Fourier transform of the resulting asymmetric interferogram provides the near-field spectral amplitude $A(\tilde{v})$ and phase $\phi(\tilde{v})$ response of the sample at the tip location, with spatial resolution given by the tip apex radius. The amplified near-field can be selected by demodulating the MCT 410 signal at the second harmonic of the tip dither frequency $\omega_{tip}$ with a lock-in amplifier (e.g., HF2LI, Zurich Instruments).

Chopping the reference beam at $\omega_{ref}$ further eliminates residual far-field background and corrects for the DC baseline offset. R-sSNOM nano-FTIR images can then be acquired based on the near-field heterodyne signal, which is selected by lock-in demodulating at the first side-band of the near-field signal, $2\omega_{tip}$ $\omega_{ref}$. The spectrum can then be normalized to a gold reference, which has a flat optical response across the mid-IR to good approximation. To eliminate water vapor and $CO_2$, various embodiments can purge the IR source, AFM, reference arm, and detector enclosure with dry and $CO_2$-free air. The reference arm length can be controlled in some embodiments using a linear direct-drive translation stage (e.g., Aerotech, ANT95-50-L-MP).

Sample Preparation

The shell of the Pacific Oyster (*Crassostrea gigas*) is a widely studied model mollusk and is characterized by a distinctive microstructure called the prismatic layer. The prismatic layer is composed of closely packed calcite columns that are tens to hundreds of micrometers tall and are approximately 10 µm across. Each column is delimited by thin polygonal sheaths of intercrystalline organic material. Thin sections were prepared following established procedures as described in more detail below). A quick (~3 second) and mild (0.1 M HCl) etch was performed after polishing to reexpose the organic sheath, which is preferentially removed during the polishing procedure.

Figure 4B:
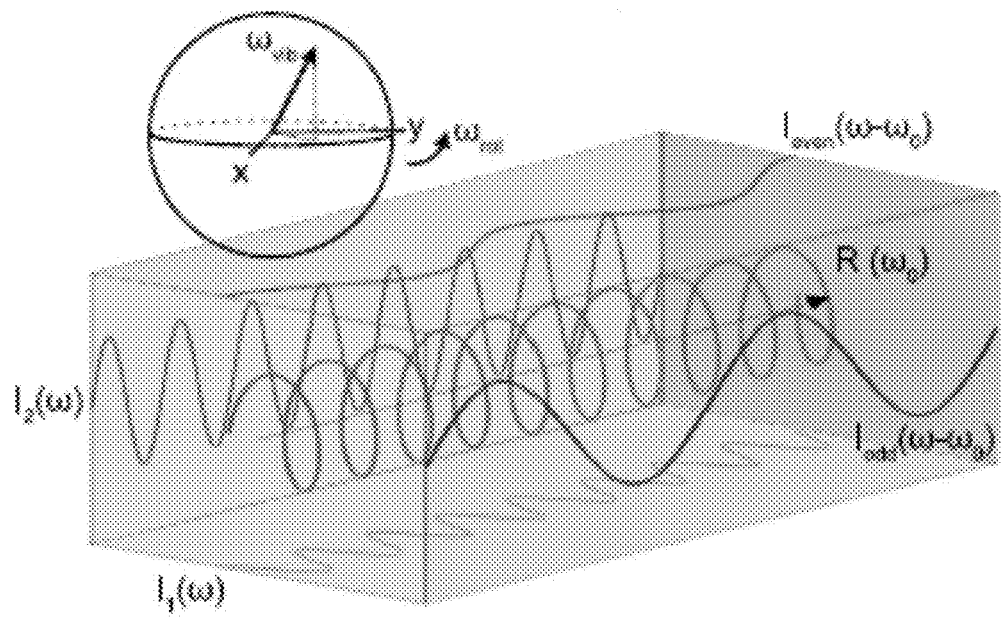
FIG. 4B is a schematic of rotating frame reducing the frequency of the basis waveforms (red and orange) to generate new waveforms (light and dark blue) with the same information, but with the beat frequency between the rotation and basis.

FIG. 4B is a schematic of rotating frame reducing the frequency of the basis waveforms to generate new waveforms with the same information, but with the beat frequency between the rotation and basis. The rotating frame used in various embodiments is a reference frame where the Nyquist cutoff frequency is lowered, reducing the amount of data necessary for resolving a given spectral feature. The rotating frame approach is based on the rotation frequency $\omega_{rot}$, linewidth $\Gamma_{vib}$, and center frequency $\omega_{vib}$ of the vibrational resonance to be probed (see, e.g., FIG. 4C), where $\omega_{rot}$ is less than $\omega_{vib}$ and is typically $\omega_{vib}-\Gamma_{vib}$ or smaller. FIG. 4B shows the rotating frame concept pictorially. The basis vectors span the rotation space and are collected as in conventional nano-FTIR with increased reference arm step size. The rotating frame analysis is then applied as a complex apodization to the collected datasets (green spiral). The recovered waveforms span the same space but have a lower apparent frequency. Transforming into the rotating frame is analogous to spinning a Bloch sphere, where the vibrational resonance precesses with frequency $\omega_{vib}$, around the precession axis at the rotation frequency $\omega_{rot}$. This results in the vibrational response being reduced by the rotation frequency $\omega_{vib}-\omega_{rot}$.

Figure 4C:
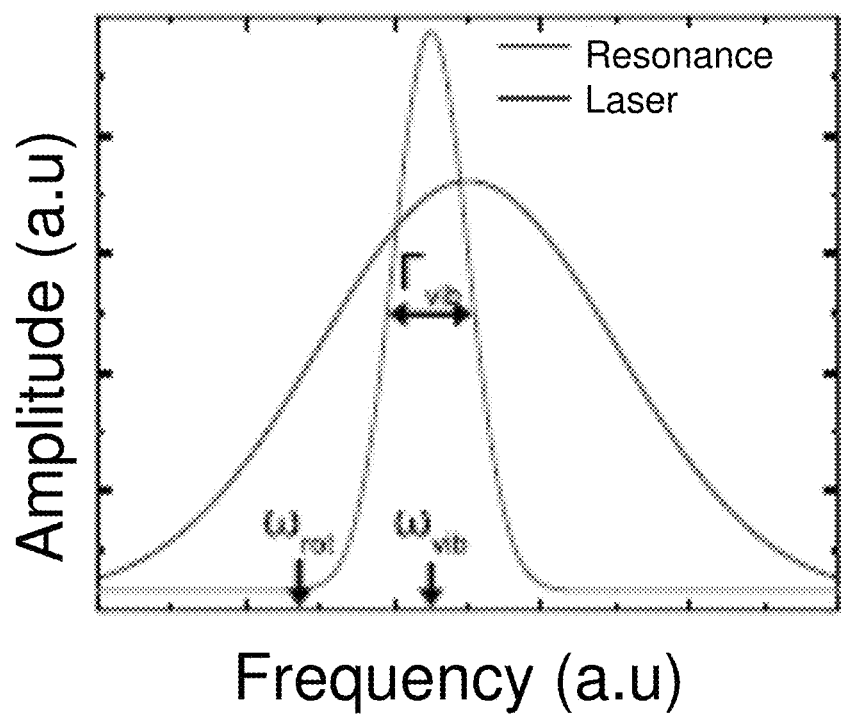
FIG. 4C is a depiction of resonant IR feature within the IR source bandwidth.

As such, some embodiments only need to collect the near-field signal interferogram in increments of $1/\Gamma_{vib}$ over a length set by the desired spectral resolution. The required step size only depends on $\omega_{vib}$, $\Gamma_{vib}$, and $\omega_{rot}$ rather than the carrier frequency, yet is still Nyquist limited. FIG. 4C is a depiction of resonant IR feature within the IR source bandwidth.

Figure 4D:
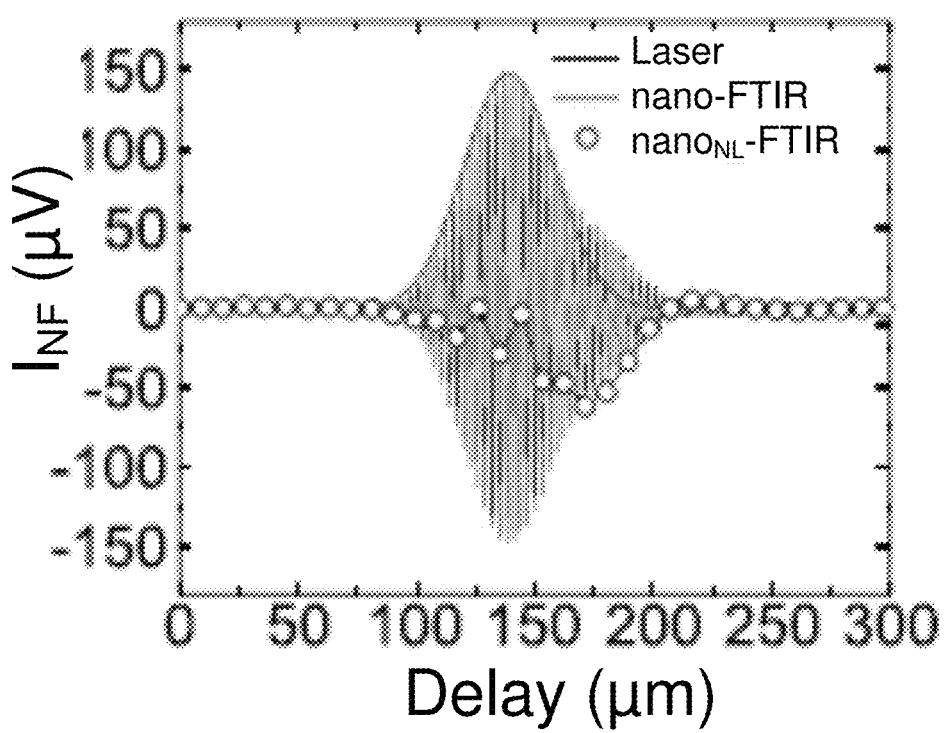
FIG. 4D is an example of a full experimental nano-FTIR interferogram and a 30× subsampled interferogram that is at the Nyquist limit.
Figure 4E:
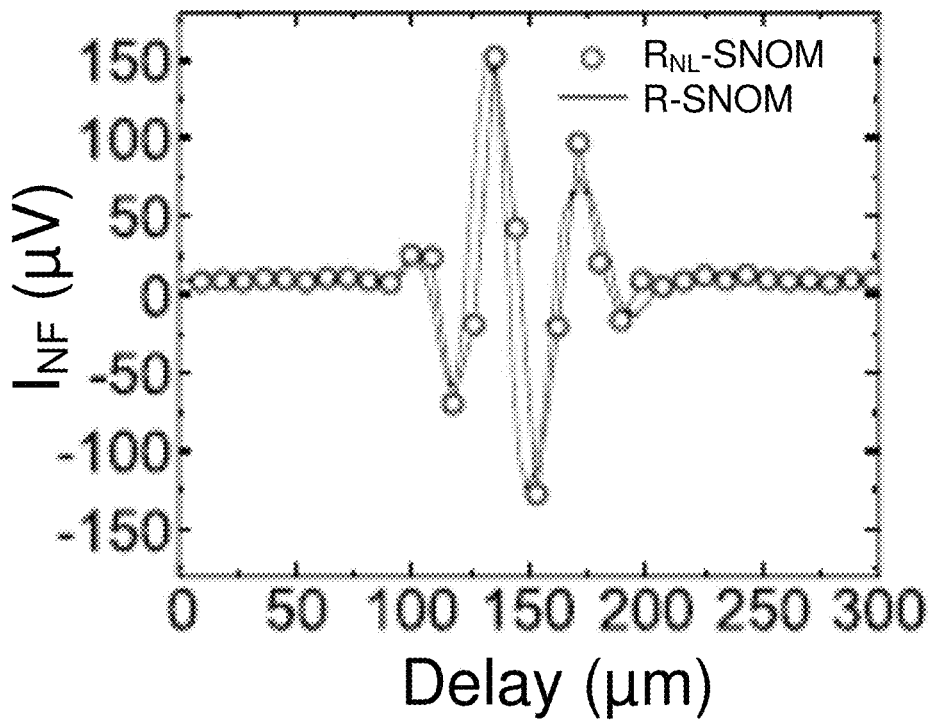
FIG. 4E is an example of a low-frequency full dataset nano-FTIR interferogram rotated by 1550 $cm^{-1}$ and the similarly rotated subsampled points.
Figure 4F:
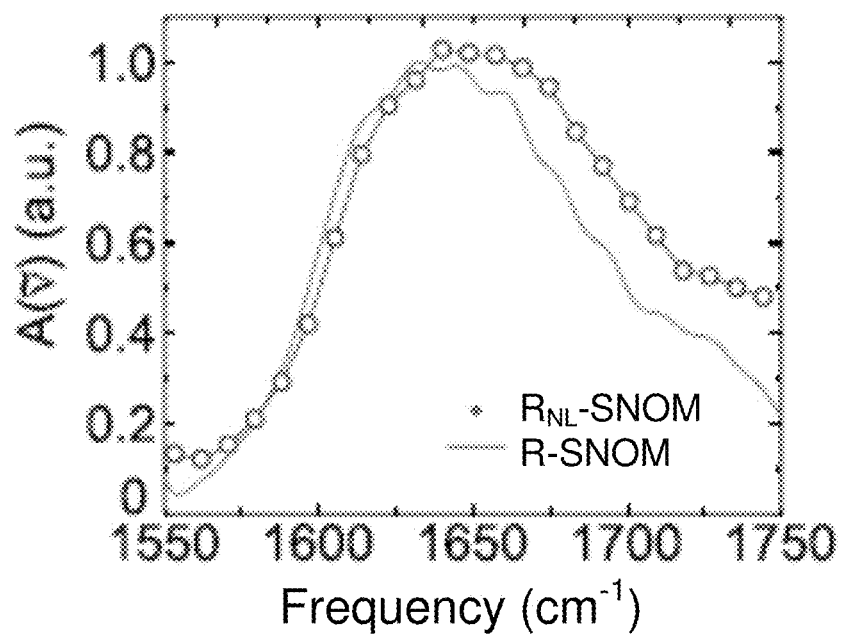
FIG. 4F is a frequency comparison of stationary and rotating frame spectral response.

The R-sSNOM concept can be demonstrated through subsampling a conventionally acquired nano-FTIR dataset. FIG. 4D shows a standard nano-FTIR interferogram (stationary frame $\omega_{rot}=0$) and a ~30 fold subsampled dataset. While seemingly nonrepresentative, after transformation of both interferograms (FIG. 4E) into the rotating frame, the rotated and Nyquist limited and R-sSNOM interferograms closely resemble each other. The Fourier transform the if rotated interferograms can be computed and the frequency can be shifted back by $\omega_{rot}$ to its original value, good agreement between the R-sSNOM and the Nyquist limited R-sSNOM spectra can be reached as shown in FIG. 4F.

Chemical imaging can now be performed approximately 60 times faster in this specific example while maintaining the same signal quality for each image voxel. Following this conceptual validation of the approach, various embodiments implement R-sSNOM as a spectroscopic imaging method enabled by this dramatic reduction in sampling within the rotating frame. In this approach, various embodiments can image the full sample region of interest at each reference arm delay point. The rotation process requires two basis vectors spanning the rotated space; therefore, the complex-valued field can be measured at each reference arm delay using amplitude-modulated two-phase homodyne imaging as previously described. Spectroscopically resolved voxels can be obtained by repeating the two-phase homodyne imaging at each reference arm delay, stacking the images, correcting for spatial drift, and Fourier transforming the interferogram at each pixel using the rotating frame algorithm described above. In the following example, various embodiments apply R-sSNOM spectroscopic imaging to achieve 4000 voxels at 100 nm spatial resolution, 20 $cm^{-1}$ spectral resolution, and 200 $cm^{-1}$ bandwidth.

Figure 5A:
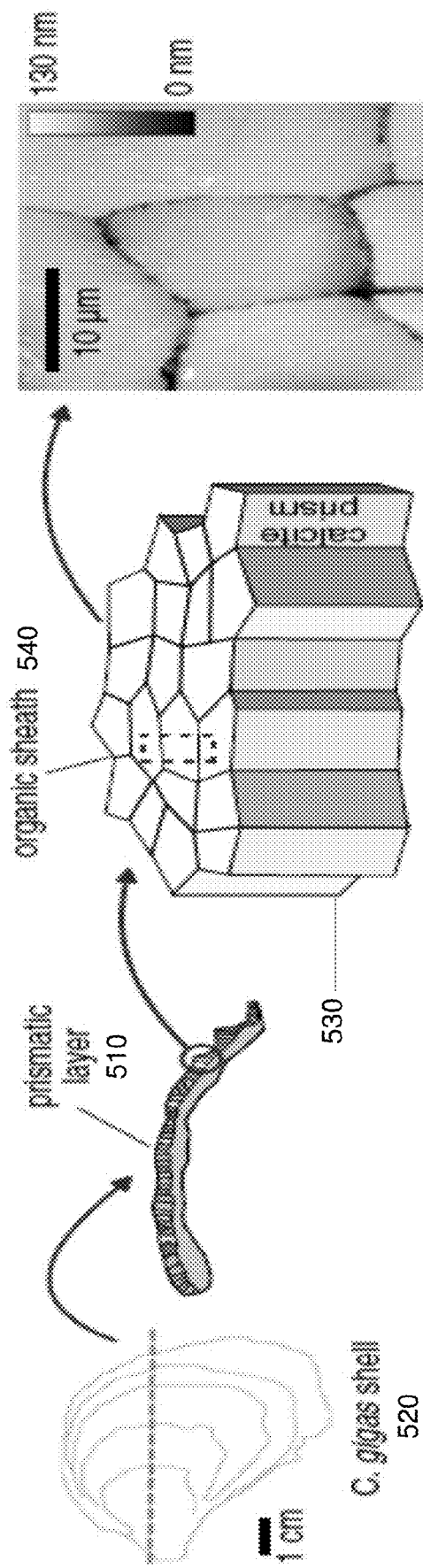
FIG. 5A is an example of a rotating frame R-sSNOM imaging where the prismatic layer (middle schematic, thickness exaggerated) is surrounded by organic sheaths.
Figures 5B, 5C:
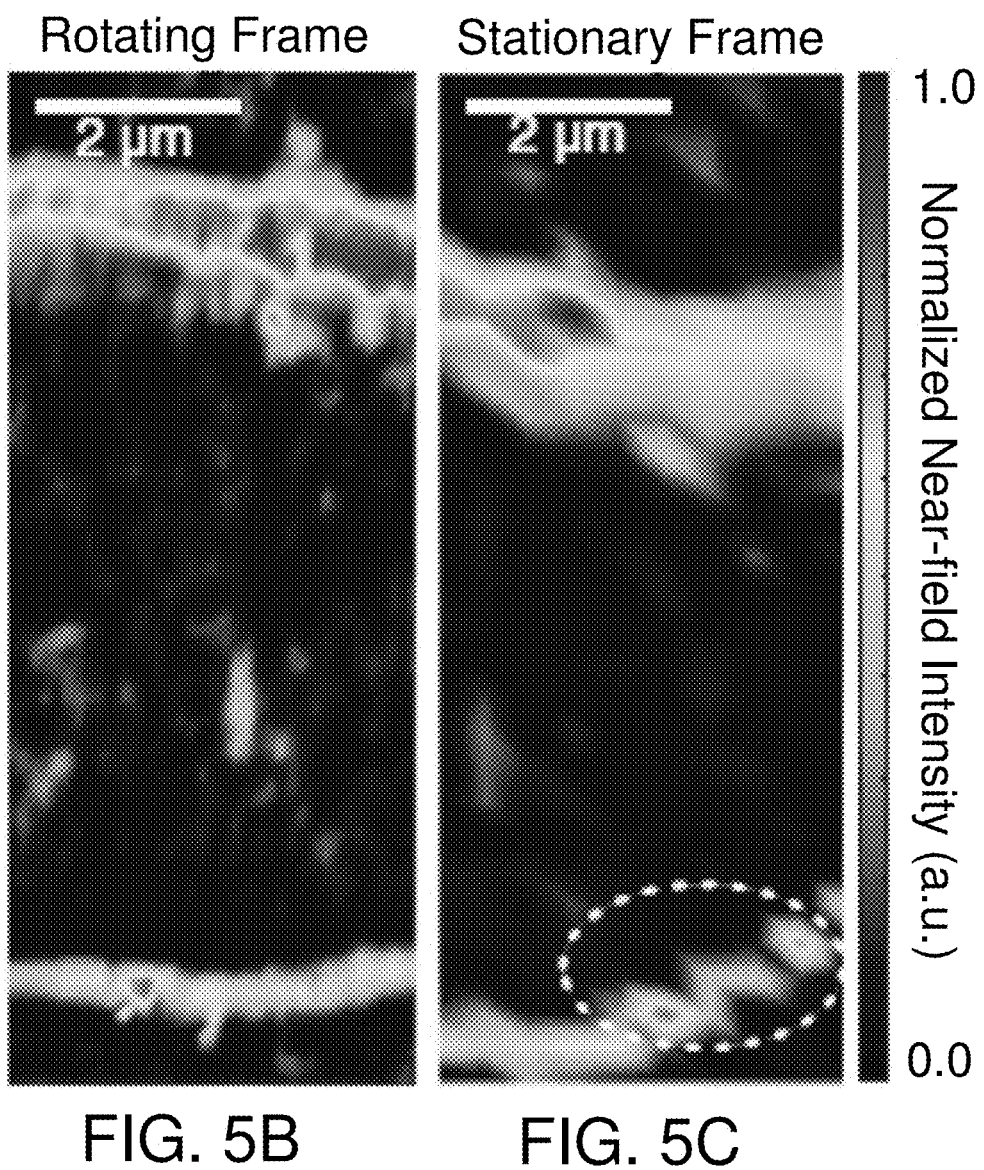
FIG. 5B is an example of a near-field scattering amplitude heterodyne amplified at zero phase difference between tip and reference arms in the rotating frame.
FIG. 5C is an example of a stationary frame yielding lower spatial resolution of the same region compared with FIG. 5B with the white dashed line emphasizes drift artifact.
Figure 5D:
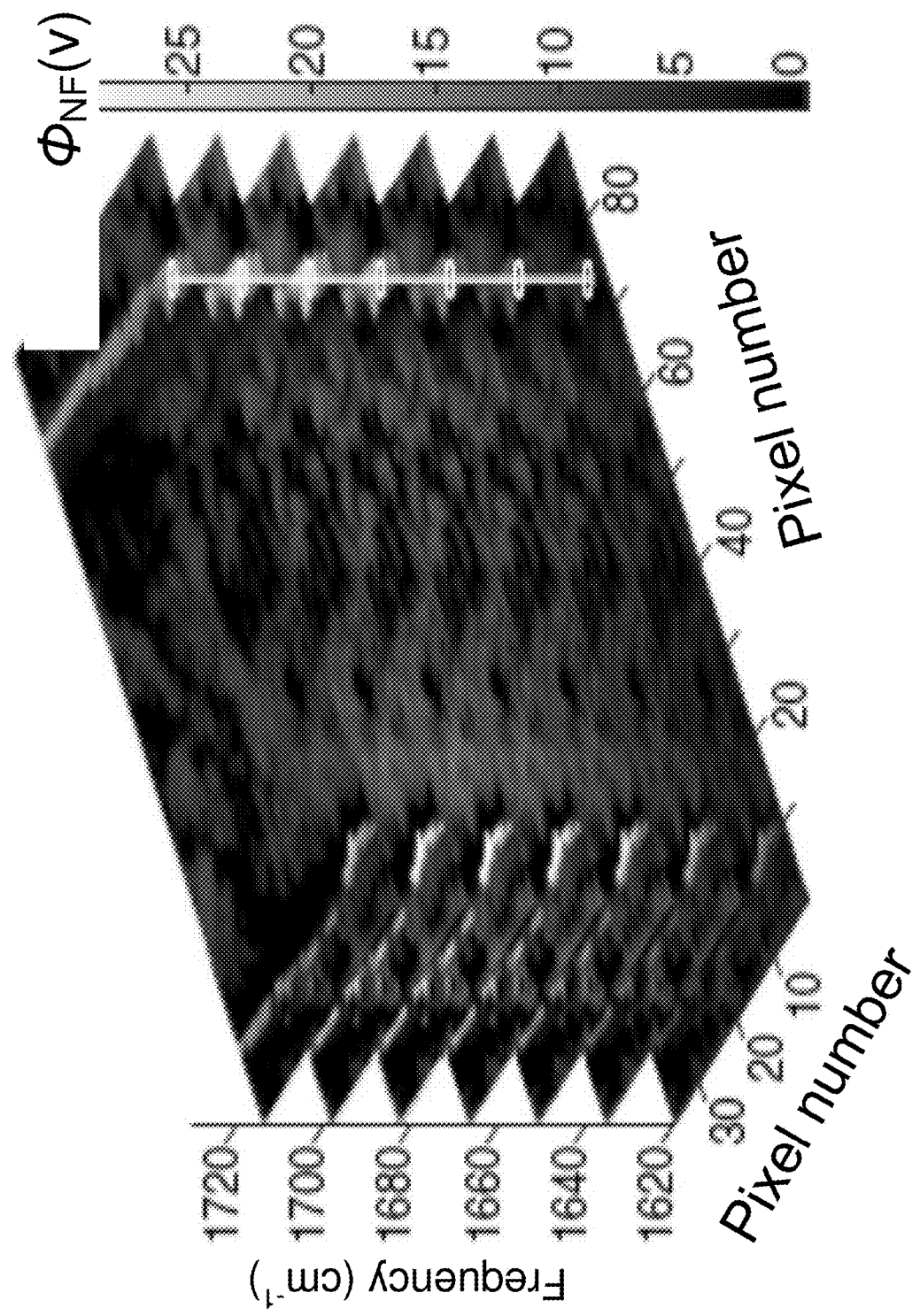
FIG. 5D is a spatiospectral phase image of same region acquired with R-sSNOM.
Figure 5E:
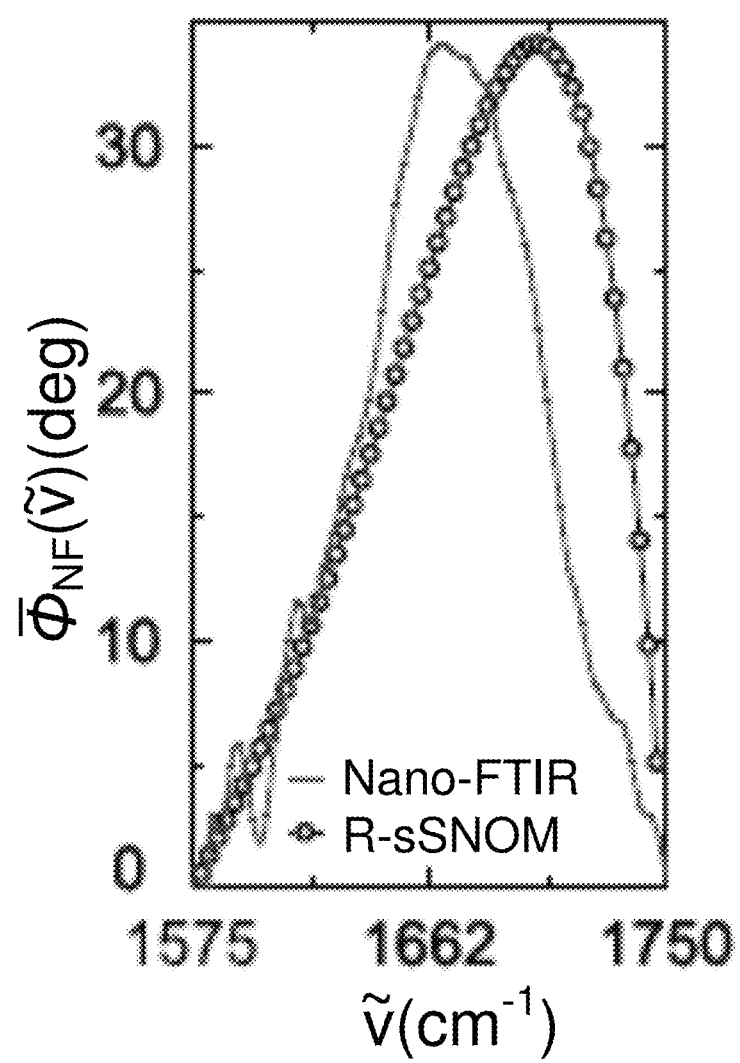
FIG. 5E is a representative spectrum of location indicated in FIG. 5D showing typical amide I response of the organic sheath acquired with nano-FTIR and R-sSNOM.

For a direct experimental comparison between conventional nano-FTIR and R-sSNOM imaging, the protein distribution in the prismatic region or layer 520 of an oyster shell 520 can be imaged. The hierarchy of scales in this biological system is shown schematically in FIG. 5A. The laser was centered at the peak of the protein specific amide I response at 1680 $cm^{-1}$. A 4 µm by 10 µm region was selected across a calcite crystal 530 covering two organic sheaths 540 as indicated. For R-sSNOM, this region (40 by 100 pixels) was imaged, with a pixel size of 100 nm by 100 nm (see, e.g., FIG. 5B). For the conventional stationary frame nano-FTIR experiment (FIG. 5C), an array (10 by 30 pixels) was used, approximately 10 times fewer spatial points for the same amount of acquisition time and identical spectral resolution. An AFM image of the area was taken halfway through to characterize the AFM drift. The typical length scale (in the narrow dimension) for prismatic region features was approximately 3 voxels, or ~1 µm, wide in the conventional image. To normalize the phase spectrum, reference was made to a known calcite region. This compensates for the tail end of the much stronger calcite peak, yielding a pure amide response. FIG. 5D shows the corresponding full spatiospectral R-sSNOM phase dataset. An example spectrum from the organic region is shown in FIG. 5E.

Figure 6A:
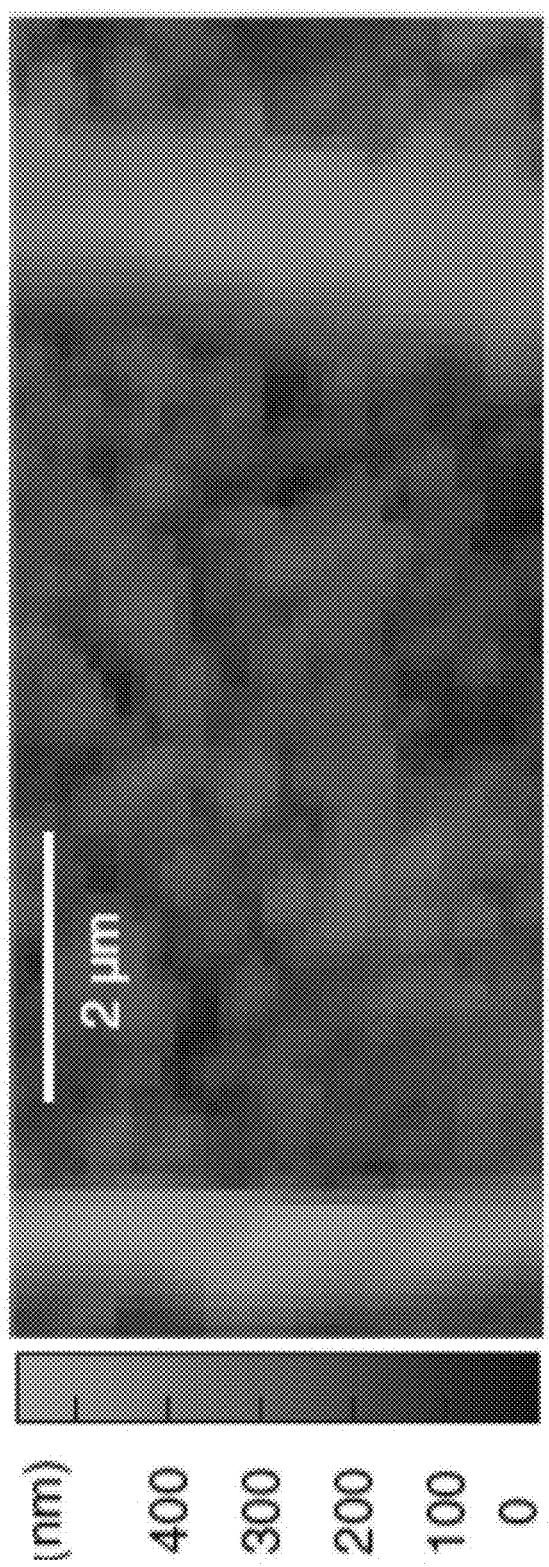
FIG. 6A is a topography from AFM.
Figure 6B:
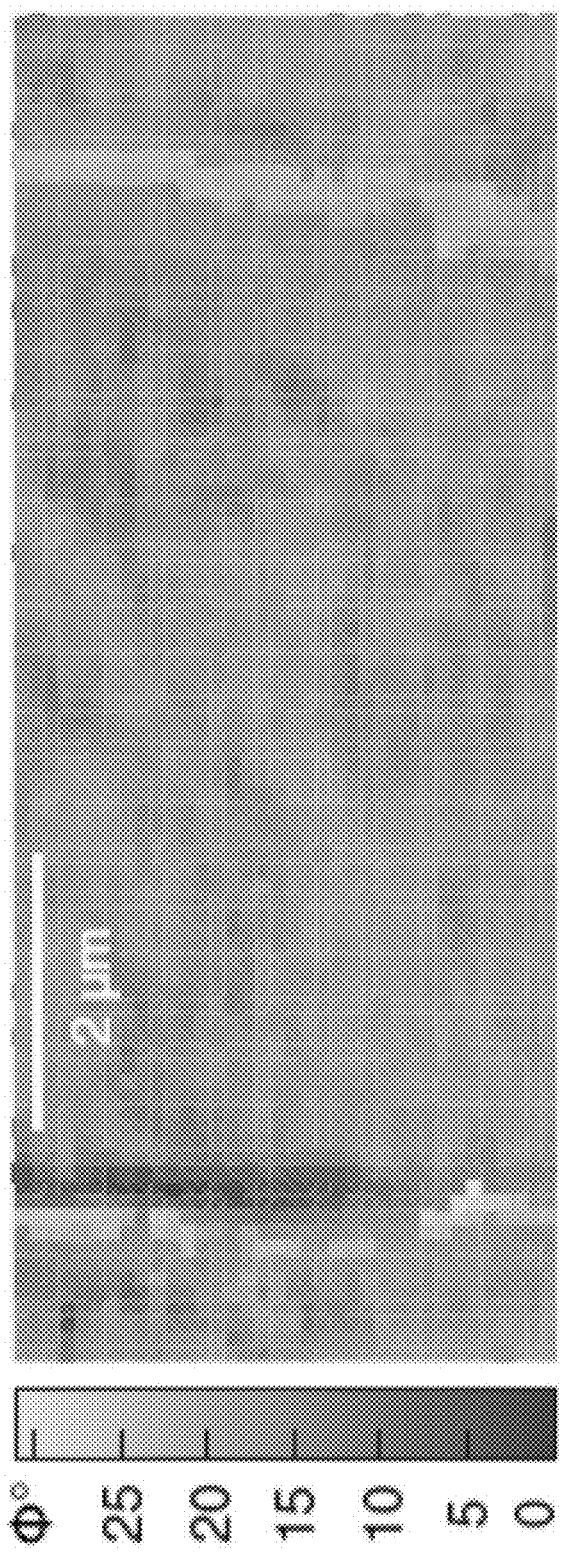
FIG. 6B is a strength of near-field phase response at 1680 $cm^{-1}$.
Figure 6C:
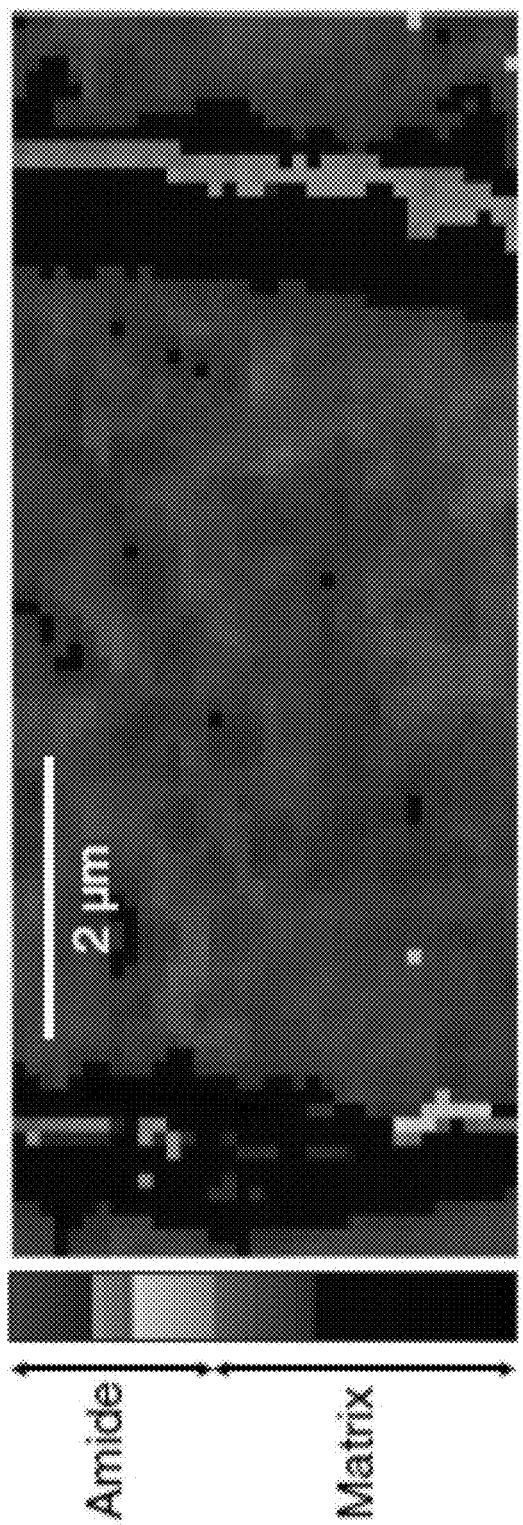
FIG. 6C is a correlation comparison of sample topography and amide phase response. Points of high value indicate high correlation, and points of low value indicate a deviation between topography and the local amide population.
Figure 6D:
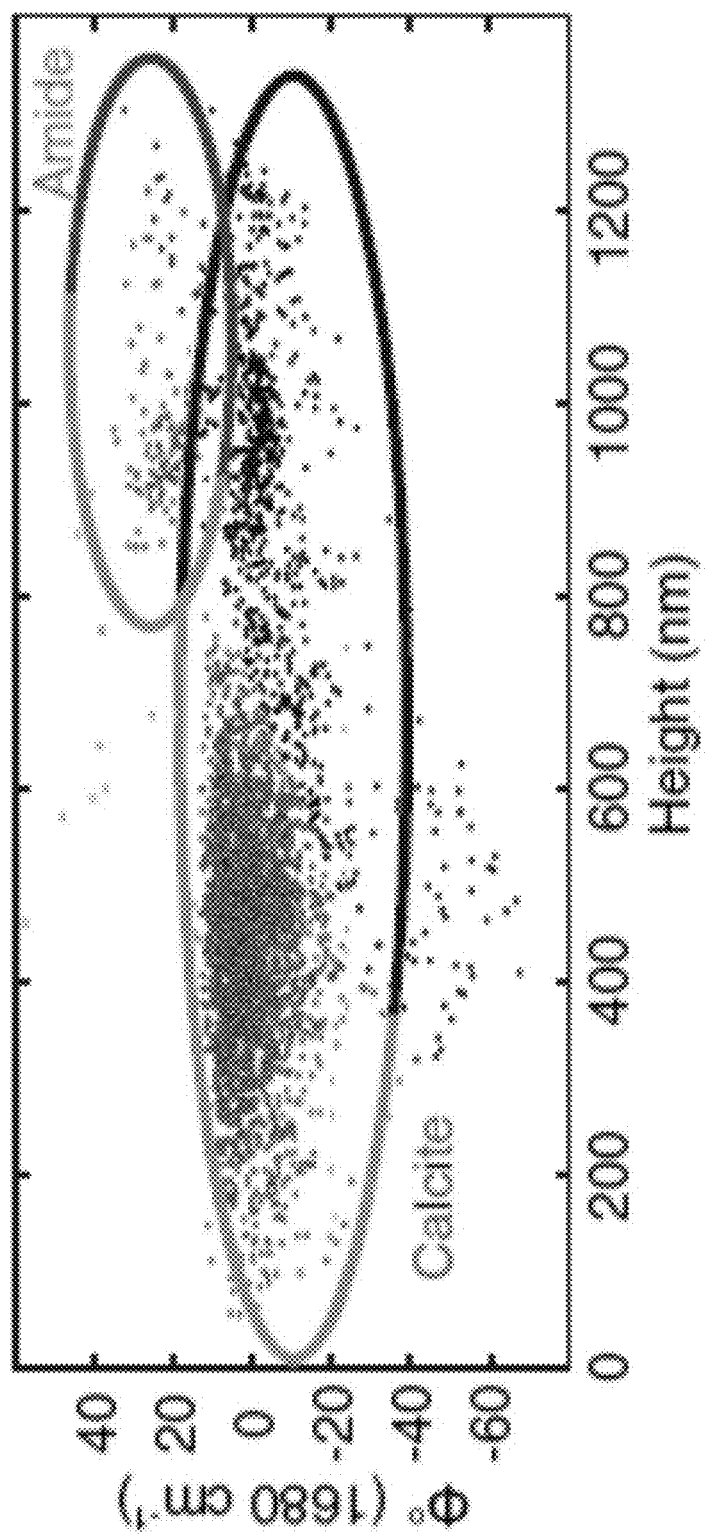
FIG. 6D is a correlation plot of height and phase dependence between FIG. 6A and FIG. 6B.

A map of protein content was then reconstructed by correlating AFM topography (FIG. 6A) with the R-sSNOM amide I phase map (FIG. 6B) by identifying five regions based on the calcite and amide content and their relative surface heights (FIG. 6C). When compared to the topographic feature size given by the etching process, this correlation analysis identifies and locates proteins in the prismatic region with higher spatial resolution. FIG. 6D shows the corresponding correlation diagram of height and the amide I phase response. These results show that in spatiospectral imaging, where the spatial resolution needs to be relatively high, but the spectral resolution can be low, R-sSNOM provides clear benefits compared to conventional s-SNOM.

In the rotating frame, the scan length and step size of each interferogram can be chosen such that the resulting spectral resolution and maximum measured frequency are no higher than necessary to resolve the resonances of interest. This allows for faster interferogram collection based on the reduced maximal measured frequency in the rotating frame. To effectively leverage the reduced data volume required by R-sSNOM and to increase the rate of data acquisition, various embodiments can image the sample continuously, while the reference mirror is moved between images. This approach also simultaneously enables passive drift compensation.

R-sSNOM has less frequent interruptions in data collection and is only paused between successive images to step the mirror position. Additionally, R-sSNOM is less sensitive to drift, as the reference mirror only needs to be stable on the ~µm scale, rather than the ~nm scale required of the AFM tip. Both of these effects result in faster and more stable multispectral chemical imaging.

As demonstrated by this experiment, some embodiments can see the speed increase by a factor of ~60 for the same signal quality per voxel. As a more general example, an image with 10,000 spatial locations (100×100 pixel image) conventionally needs to be reimaged for conservative drift correction every 50 data points, with each image taking approximately 10 min. That reimaging time alone is longer by an order of magnitude than retrieving the complete hyperspectral image through R-sSNOM. A direct comparison where, in the conventional method, to achieve 20 $cm^{-1}$ spectral resolution demonstrates that the scan the reference mirror at a rate of 10 µm/s fora total of 25 s.

Three hundred spatial positions were sampled and one AFM image was collected at the beginning and one AFM image halfway through the coordinate set. Thus, the conventional imaging time is 2.3 h, generating 10 spectral data points per sample position for a total of 3000 data points of interest. This is contrasted with the R-sSNOM technique where 20 $cm^{-1}$ resolution over 4000 sample positions yields a total of 40,000 data points in slightly less time. This corresponds to an improvement of more than an order of magnitude in acquired data points. From the accelerated acquisition, R-sSNOM not only is drift-corrected but also has a much higher spatial resolution compared to conventional nano-FTIR for the same measurement time.

When using the rotating frame approach, the first few data points of the transformation in rotation space can be slightly unstable from interference of the dual negative frequency components through frequency folding (frequencies close to the rotation frequency are not always a faithful representation). Therefore, the rotation frequency for this dataset was chosen to be 1550 $cm^{-1}$, i.e., away from the amide response, leading to a maximum recoverable frequency of 1750 $cm^{-1}$ based on our choice of 200 $cm^{-1}$ bandwidth.

In addition to the first few dropped data points near the rotation frequency, the spectral accuracy in the rotating frame was observed to be not as good as that obtained using conventional methods. While simple chemical identification is still possible, the R-sSNOM measurement of the amide I response is blue shifted by ~20 $cm^{-1}$ compared to conventional nano-FTIR (see, e.g., FIG. 5E).

Further, and in general, spectrally narrow material resonances can be measured with a lower Nyquist cutoff frequency, but they also require higher resolution to determine their peak position with sufficient accuracy. This trade-off between resolution and cutoff frequency requires measuring with larger reference arm mirror step sizes over a longer travel distance. Similarly, this trade-off exists with broader resonances with smaller step sizes over a shorter total travel distance. Materials systems with spectrally well-separated narrow resonances would therefore not benefit from R-sSNOM to the same extent, as both resolution and band-width need to be high.

The nanometer scale and convoluted shape of sparsely distributed organic mineral interfaces is well matched to the capabilities of R-sSNOM. The discrepancy between the length scales of the features of interest and their distribution highlights the necessity of high-resolution imaging over large spatial scales. Therefore R-sSNOM uniquely delivers chemically sensitive nanoimaging with a large field of view with an improvement of image quality, speed, and spatial resolution.

Various embodiments of the present technology can use passive drift correction, replace dropped pixels, process interferograms, and/or modify the reference arm in a conventional s-SNOM measurement. Over the course of data acquisition, depending on the thermal stability of the AFM stage, the sample may drift relative to the tip. This is typically in the range of a few hundred nanometers per hour. To compensate for this, various embodiments may use a post processing passive drift correction. Instead of measuring and tracking a fiducial marker, some embodiments can use the height data channel already collected when taking AFM scans in the multi-step 2 phase homodyne data collection. Various embodiments can calculate the cross correlation in Fourier space using the first mirror step position as the reference. Some embodiments can then search for the pixel with the highest cross correlation and generate a running drift vector. Then using this dictionary to stack the X and Y data channels, corresponding to the drift of the accompanying height channel such that the drift is removed. All images in the stack can be cropped in some embodiments so that only the pixels shared in all images are kept.

The s-SNOM pixel quality in each mirror position depends on the combination of the stability of the laser output, chopper frequency, AFM tip frequency and the demodulation of these frequencies. When there is an instability in one or more of these components, the image being taken loses data for at least a pixel. This manifests itself in an unusually high demodulation value, typically from the lock-in detecting a low frequency noise component, that is easily seen by eye. To correct for this, a series of operations can be performed in some embodiments. For example, first, from duplicity of data for each X and Y channel, if a pixel is dropped on either a trace or retrace scan, but not the other, the pixel can be filled in using the other direction's pixel value. Second, each image is analyzed to identify pixels above a given threshold, when one is found, the pixel can be replaced by the average of the surrounding 8 pixels. Finally, the remaining dropped pixels can be isolated pixels below the conservative threshold, but they are clearly still not accurate. Each image can be scanned for isolated pixels that strongly deviate from the mean of the surrounding pixels, and again, these pixels are replaced with the mean of the surrounding pixels. A standard 4,000 pixel image has approximately 10 dropped pixels.

In accordance with various embodiments, interferograms from either method of data acquisition can be processed in the same way. The data vector can be first zero-padded asymmetrically such that the length of the vector is a power of 2 and approximately 4 times as long and are added such that the center-burst is in the middle of the vector. This has the effect of increasing the speed at which the FFT runs and interpolating the data in frequency space. The vector can then be apodized with a Blackman-Harris function to further increase the signal to noise of the data in frequency space. The interferogram can be inverted and Fourier transformed (e.g., using Matlab's native FFT algorithm). Some embodiments can then reference the output spectrum to a chosen spectrum from a non-resonant sample such as template stripped Au as described in detail above. Here, for robust and clear Amide I response, reference to an average phase response from a known calcite region may be used. This has the effect of compensating for the tail end of the much stronger calcite peak, yielding a purely Amide response. Note that different strengths from topographic defects of the calcite response yields a non-uniform phase response at the calcite tail. Using a typical calcite response limits these artifacts to a few pixels which are easily confirmed to be amide free by examining the individual spectra.

To reduce far-field illumination artifacts and to increase acquisition speed, two modifications may be made in some embodiments to the reference arm of a typical s-SNOM setup. The first modification can include inserting a chopper wheel into the reference arm, giving a characteristic frequency to EREF; it should be noted that the selection of blade size relative to beam size greatly impacts the distribution of the frequency components added to the electric field. To isolate the heterodyne interference term at the detector, various embodiments can demodulate at the chopper frequency plus the second harmonic tip frequency, which isolates the near-field signal directly amplified by the reference arm from far field or background electric field contamination.

The second modification used in some embodiments include the use of a piezo actuated mirror mount for the reference arm mirror. By adding a piezo, various embodiments of the system have fast, reproducible and stable control of our mirror position at mesoscale distances. This can be used in conjunction with the typical long range stage used for stationary frame spectroscopic purposes.

Figure 7:
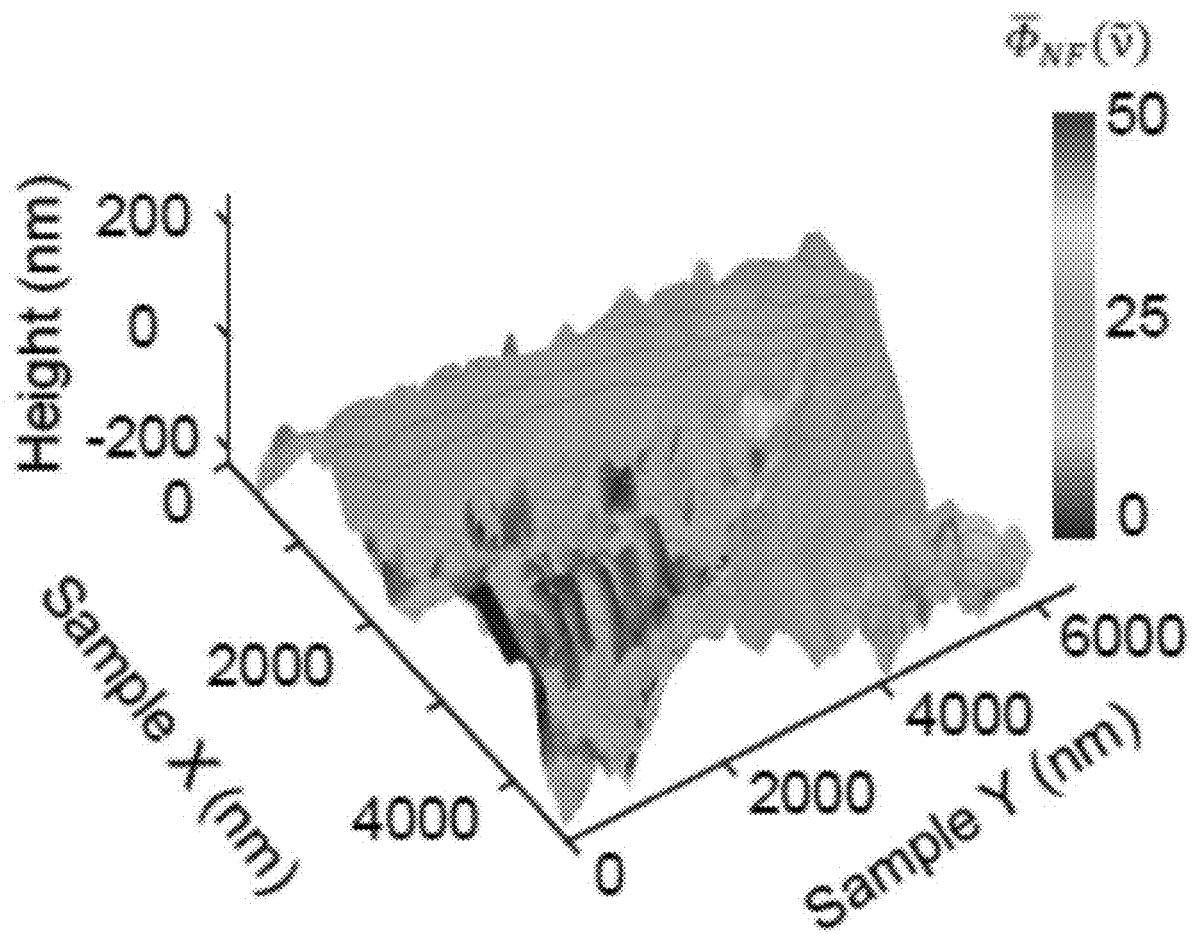
FIG. 7 illustrates an additional rotating frame data set acquired in the prismatic region of an Oyster shell showing a high protein concentration in a V-shaped region as determined by the Amide I response.

FIG. 7 shows rotating frame applied to another area of the prismatic region. Here, the X and Y axes are the relative positions across the sample's surface and the Z axis shows the topography of the sample at each of these points. The colormap shows the relative strength of the phase response at 1680 cm$^{-1}$ response typical of Amide, indicating the presence of proteins, in good agreement with the organic ridge formed by the etching process.

Figures 8A, 8B, 8C:
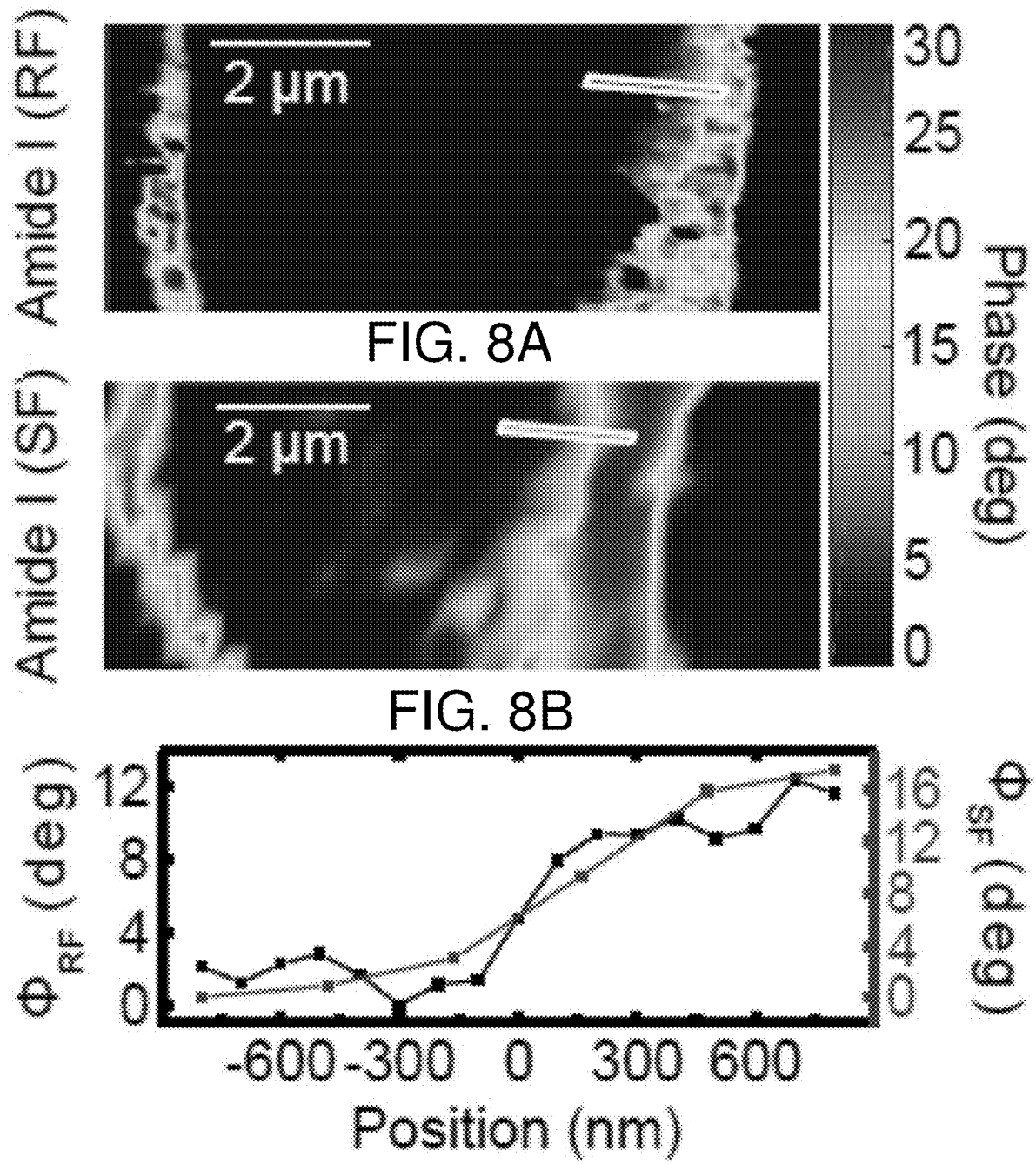
FIG. 8A illustrates a rotating frame phase response at 1680 $cm^{-1}$.
FIG. 8B illustrates an example of a stationary frame phase response at 1680 $cm^{-1}$.
FIG. 8C is a plot illustrating a feature edge comparison between rotating and stationary frame Amide I phase response at regions indicated in FIG. 8A and FIG. 8B.

FIG. 8A illustrates a rotating frame phase response at 1680 cm$^{-1}$. FIG. 8B illustrates an example of a stationary frame phase response at 1680 cm$^{-1}$. FIG. 8C is a plot illustrating a feature edge comparison between rotating and stationary frame Amide I phase response at regions indicated in FIG. 8A and FIG. 8B; More specifically, FIG. 8C shows the marked spatial resolution improvement of the rotating frame (FIG. 8A) compared to the stationary frame by taking corresponding line-cuts from the Amide slice images and comparing their slopes at the edge of a figure of interest. In terms of time, and correspondingly usable data points, along with accurate sample positions, this represents a non-trivial and marked improvement upon previous hyper-spectral imaging modalities.

The slight deviation of the phase response (1680 cm$^{-1}$) from a typical s-SNOM experiment is a result of the inverse mirror symmetry associated with the phase from the Fourier transform. This symmetry necessitates a strong turning point near 1750 cm$^{-1}$ and leads to a small contamination in the absolute spectral position, and shape, of the resonance. This effect can be minimized in various embodiments by choosing a larger bandwidth for the rotation, or shifting the incident light source frequency such that the rotated resonance frequency is smaller than shown. Here however, the resonance is so broad that the laser cannot be further blue shifted. Additionally, for chemical mapping of extremely broad resonances, like the Amide response, the only necessary consideration is resonance identification which is not affected to a measurable degree by the shifting of a peak center by 10 cm$^{-1}$. It should also be noted that this shifting is on the order of typical peak shifts across these biological samples, further making the peak assignment reasonable.

Rotating Frame Theory

First consider the standard s-SNOM detected signal and contrast this with the rotating frame approach through subsampling data collected in the conventional manner. Second compare the pseudo-heterodyne and chopper demodulated 2 phase homodyne as detection schemes for implementing the rotating frame. Finally, apply the rotating frame technique to investigate the nanoscopic prismatic region in an oyster shell. Equation S1 demonstrates the near-field heterodyne amplified intensity of the scattered light in the x demodulated channel of the lock-in in frequency space.

$$I_x(k) = \sum_{n=0}^{N_{STAT}-1} e^{\frac{-2\pi i}{N_{STAT}}} I_{2H}(\tilde{x}_n(t)) \tag{S1}$$

Here, NSTAT is the number of data points collected along the interferogram, k is the output frequency of the transform, x̃ is the position of the interferometer arm (where n is the sampling number—position index). Normalizing the complex valued response from our sample of interest can be done dividing it by the complex valued reference spectrum. The minimum value NSTAT can take is given by the Nyquist sampling theorem and for our laser, centered at 1680 cm$^{-1}$, (and a resolution of 20 cm$^{-1}$) is 181. In the rotating frame various embodiments can now measure the relative optical frequency, as shown in equation S2.

$$I_x(k - k_0) = \sum_{n=0}^{N_{ROT}-1} e^{\frac{-2\pi i}{N_{ROT}}(k-k_0)(\tilde{x}_n(t)+\tilde{\varphi})} I_{2H+\Omega}(\tilde{x}_n(t)) \tag{S2}$$

Where the subtracted frequency $k_0$ has been included, a mirror position offset $\tilde{\varphi}$ (controlled by the reference mirror piezo) and $\Omega$ the chopper frequency. Again, the minimum value NROT can take is given by the Nyquist sampling theorem. This time though, $\tilde{x}_n - \tilde{x}_{n-1}$ determines the maximum cut-off frequency, which was chosen to be approximately $3*\Gamma_{vib}$. Therefore, the minimum value $N_{ROT}$ can take (for a resolution of 20 cm$^{-1}$) is 21—a reduction by almost an order of magnitude. While the minimum sampling number is lowered by approximately an order of magnitude, the typical hyper-spectral imaging modality cannot leverage this reduction in data points to faster data acquisition. To utilize the reduction granted by transforming to the rotating frame, various embodiments can borrow an imaging technique created for CW sources.

In the rotating frame, the frequency response can be shifted, but still needs a mechanism for background free imaging and DC offset subtraction. Two phase chopper demodulated homodyne has previously been shown to effectively extract both the amplitude and phase response of a material under illumination of a single wavelength source. By employing this technique and simultaneously scanning the reference arm, various embodiments are able to extract the amplitude and phase response for every frequency contained in our source. Pseudo-heterodyne with a broadband light source has a normalization condition between the real and imaginary channels of the near-field response that is non-trivial to tease out and further complicated by being extremely sensitive to experimental parameters. Pseudo-heterodyne, while theoretically possible, is not a practical method for background suppression in broadband s-SNOM hyper-spectral imaging. The detected signal when using a broadband source with pseudo-heterodyne is given by equation S3.

$$I(\omega) = \int_{-\infty}^{\infty} dt e^{-i\omega t} e^{\frac{-2\sigma^2 \epsilon^2}{c^2}} \int_{\omega_1}^{\omega_2} d\omega_0 e^{-i\omega_0 t} e^{\frac{-i2\omega_0 \epsilon}{c}} \quad (S3)$$

$$e^{\frac{-2\sigma^2}{c^2}(c\xi \sin(mt+\phi_m)+\xi^2 \min^2(mt+\phi_m))} \alpha_{\text{eff}}(\omega_0, t) * \left[ J_0(2\omega_0 \xi) + \right.$$

$$\left. 2 \sum_{n=1}^{\infty} (J_{2n}(2\omega_0 \xi) \cos(2n(mt+\phi_m)) + i J_{2n-1}(2\omega_0 \xi) \sin((2n-1)(mt+\phi_m))) \right]$$

Here, a complex interplay can be seen between the laser specifications, including $\omega_0$=laser carrier frequency and $\sigma$=laser bandwidth, the reference mirror motion, including $\xi$=mirror oscillation amplitude, $\varphi_m$=mirror phase offset and m=mirror oscillation frequency and the near-field response (as modeled by $\alpha_{\text{eff}}$=effective complex polarizability). Broadband pseudo-heterodyne contains a complicated mixing of real and imaginary sidebands dependent on how the parameters listed above interact.

Figure 9A:
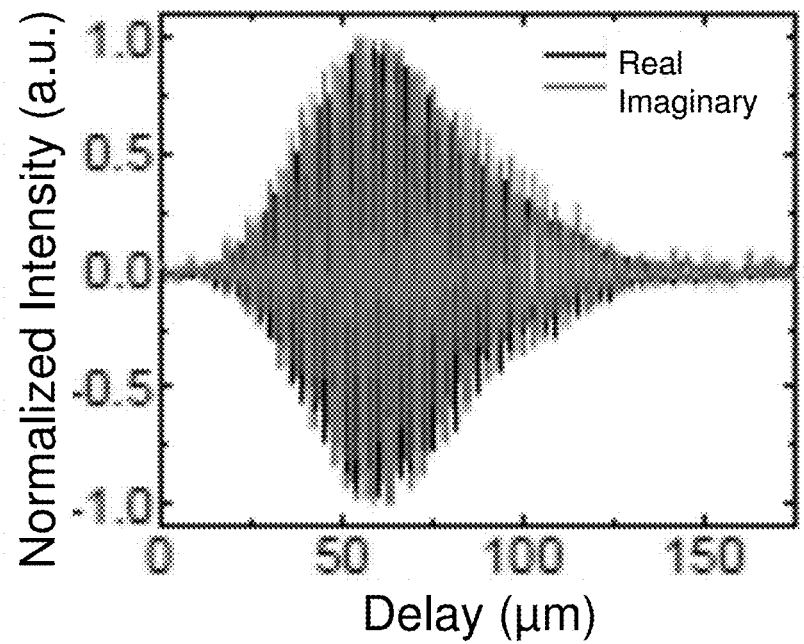
FIG. 9A is a plot of experimental data of two typical interferograms as two basis vectors to span rotation space collected using the fine delay mirror control.
Figure 9B:
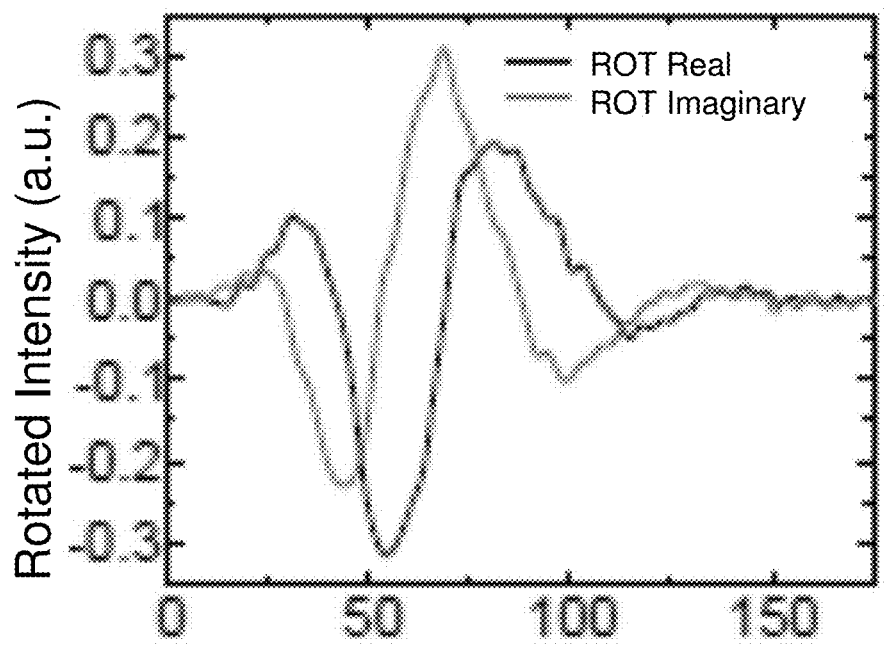
FIG. 9B is a plot of rotated interferograms of experimental data in FIG. 9A.
Figure 9C:
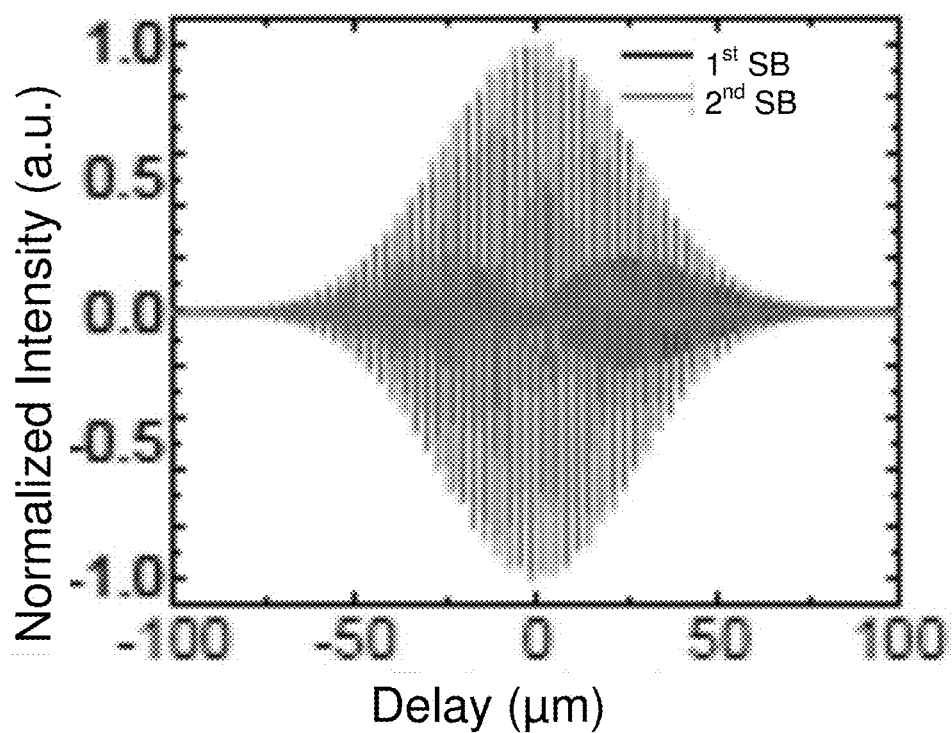
FIG. 9C is a resonanceless model data generated by computing pseudo-heterodyne data collected by demodulating at the second harmonic of the cantilever frequency and the 1st and 2nd sidebands (SB).
Figure 9D:
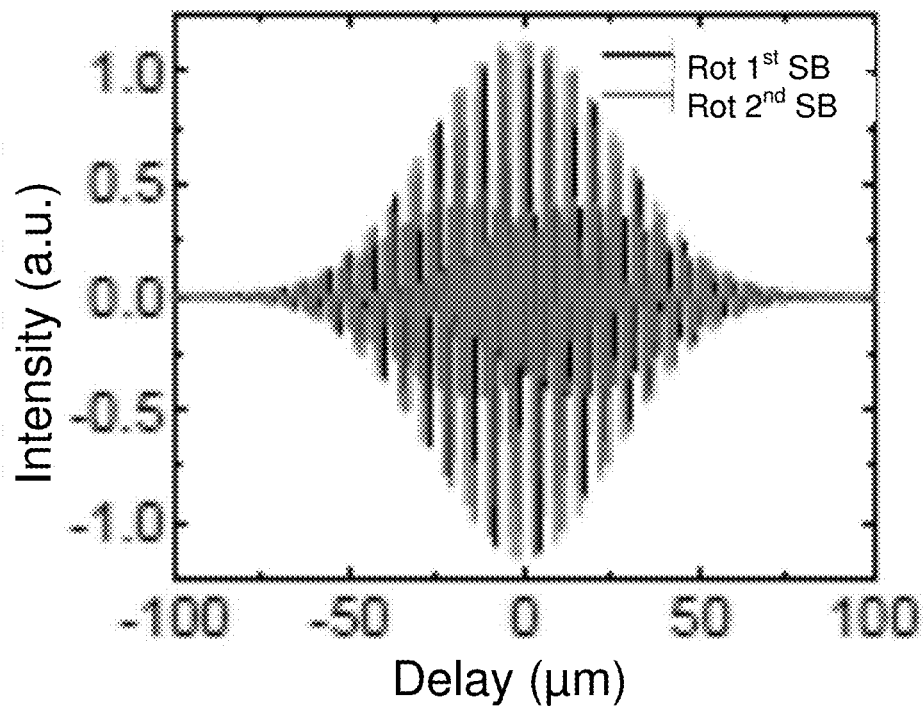
FIG. 9D is a plot of a rotating frame applied to interferogram basis vectors acquired through pseudo-heterodyne.

Immediately obvious is the increased complexity of pseudo-heterodyne interferograms when compared to stationary frame (FIG. 9A) and rotating frame (FIG. 9B) interferograms. Depending on the mirror position, the center frequency, and the bandwidth of the light source, the real and imaginary nearfield response start mixing. FIG. 9C shows this behavior. The complicated (non-slowly varying) waveform in the rotating frame (FIG. 9D) doesn't solve the problem of reducing the acquisition distance (mirror step size). Therefore, various embodiments can select multi-step chopper-demodulated two-phase homodyne for our background suppression and DC offset correction.

For pseudo-heterodyne background suppression, the sidebands can be generated through the Jacobi-Anger expansion that results from argument of the electric field that depends on the sinusoidal motion of the reference arm mirror. This results in, relative to center frequency, positive and negative sidebands with weight defined by the expansion coefficients, which for the case of single wavelength sources, can be paired such that each pair of neigh-boring sidebands has the same maximal value. Experimentally, this means as the reference mirror is scanned, the relative populations of the first two sidebands oscillate to a shared maximum out of phase. This is complicated however when the source has a non-negligible bandwidth. In addition to the difficulty of scaling the waveforms generated by pseudo-heterodyne (and it being phase dependent—impossible to do in general for a broadband source), there is a complicated secondary envelope function for the two sidebands. Again, while it is theoretically possible to deconvolve this mixing, the experimental nature of crucially determining these parameters with stability on the few to 10s of hours timescale is simply not practical. Additionally, assuming the deconvolution could be done, the Jacobi-Anger expansion splits the near-field signal into an infinite series of sidebands, diluting the signal to channels that are discarded and decreasing the relative signal to noise compared to a method that creates sidebands of finite (or faster converging) order. From these considerations the choice for background free imaging between pseudo-heterodyne and chopper demodulation should clearly be the latter.

Shells of the Pacific Oyster (*Crassostrea gigas*) were cleaned of tissue by hand, rinsed with water, and stored in a freezer prior to sampling. Both valves of *C. gigas* contain prismatic layers, but this layer is thickest and easiest to locate in the right valve. The prismatic layer is located between an outer organic coating, called the periostracum, and inner chalky and foliated layers. In *C. gigas*, the prismatic layer, chalky layer, and foliated layer are all primarily made of calcite, the most stable polymorph of $CaCO_3$. Portions of a right valve were sampled by hand using a rotary tool (e.g., Dremel) fitted with a diamond-impregnated disc. These sections include the full thickness of the shell. Because it is difficult to section in a perfectly longitudinal plane, the resulting surface is oblique with respect to the columns. The sections were mounted on a round glass slides (e.g., 2.5 cm) using Araldite 502 resin (e.g., Pelco), and polished with progressively smaller diamond grit sizes, ranging from 60 μm to 0.15 μm (Beta Diamond and 3M), in a slurry with water. Ultrasonication in 18 MΩ pure water when switching between polishing grit sizes removed residual grit. After polishing, the organic sheaths of the prismatic layer were topographically exposed using a quick (e.g., 3 second) and mild (e.g., 0.1 M HCl) etch.

Example—Smart Scattering Scanning Near-Field Optical Microscopy

Introduction

Scattering scanning near-field optical microscopy (s-SNOM) provides spectroscopic imaging from molecular to quantum materials with few nanometer deep sub-diffraction limited spatial resolution. However, in its conventional implementation SNOM is slow to effectively acquire series of spatio-spectral images, especially with large fields of view. This problem is further exacerbated for weak resonance contrast or when using light sources with limited spectral irradiance. Indeed, the generally limited signal-to-noise ratio prevents sampling a weak signal at the Nyquist sampling rate. Here, we demonstrate how acquisition time and sampling rate can be significantly reduced by using compressed sampling, matrix completion, and adaptive random sampling, while maintaining or even enhancing the physical or chemical image content. We use fully sampled real datasets of molecular, biological, and quantum materials as ground-truth physical data and show how deep undersampling with a corresponding reduction of acquisition time by one order of magnitude or more retains the core s-SNOM image information. We demonstrate that a sampling rate of up to 6 times smaller than the Nyquist criterion can be applied, which would provide a 30-fold reduction in the data required under typical experimental conditions. Our smart s-SNOM approach is generally applicable and provides systematic full spatio-spectral s-SNOM imaging with a large field of view at high spectral resolution and reduced acquisition time.

Figure 10:
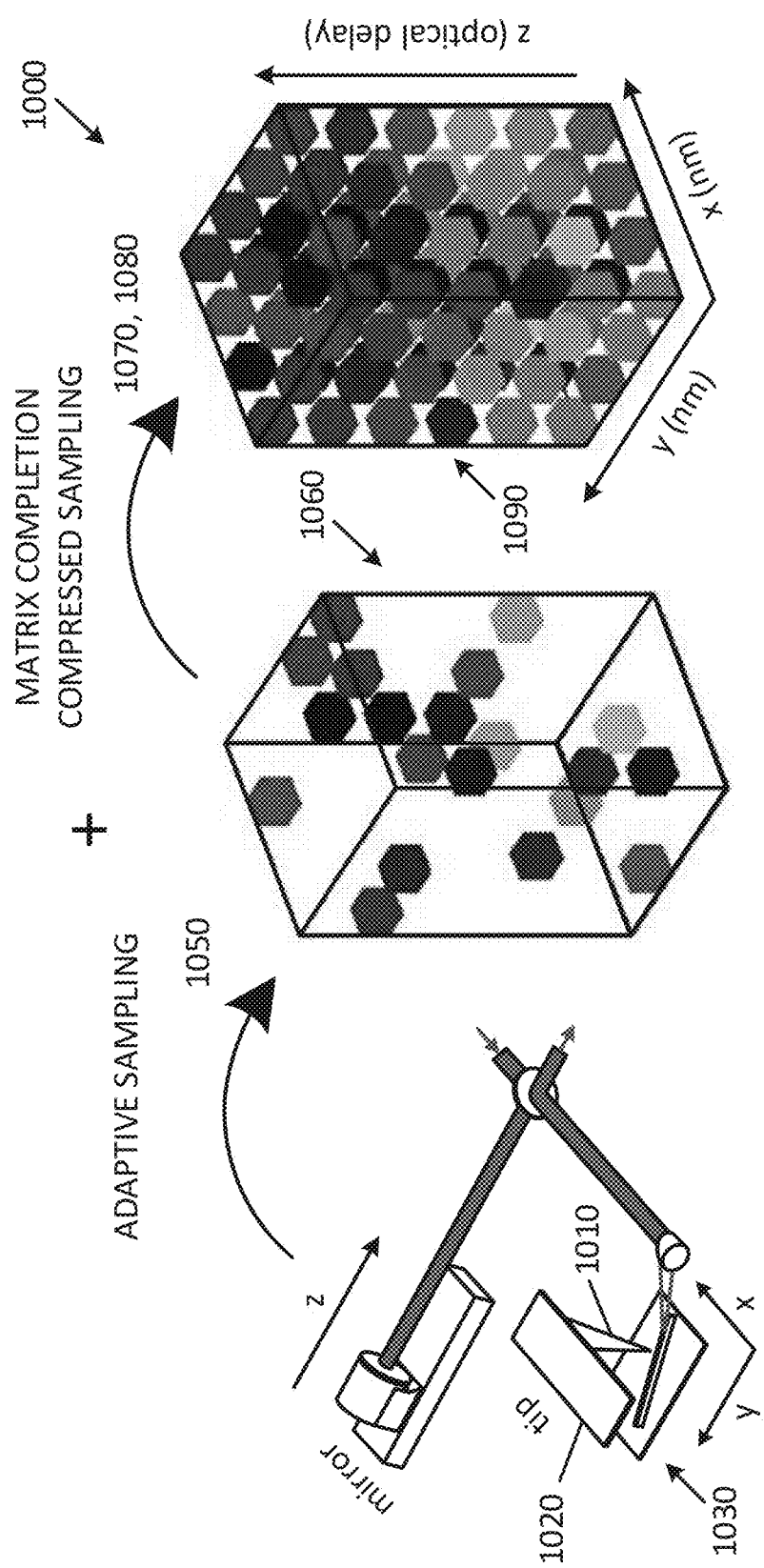
FIG. 10 illustrates a schematic representation of a smart sampling scattering scanning nearfield optical microscopy system that may be used in an example embodiment of the present technology.

FIG. 10 illustrates a schematic representation of a smart sampling scattering scanning nearfield optical microscopy system 1000 that may be used in this Example. A tip 1010 of a probe 1020 positioned proximate sample 1030 is provided, and the system includes a mirror 1040. An adaptive sampling process 1050 provides a subset 1060 of data points from a grid of the sample 1030, and then matrix completion 1070 and compressed sampling 1080 processes are employed for the dataset 1090, as shown in FIG. 10.

Infrared vibrational scattering scanning near-field optical microscopy (IR s-SNOM) provides nanoimaging with intrinsic vibrational, phonon, and electronic resonance contrast with chemical and material specificity at deep-subdiffraction spatial resolution (≤20 nm). Recent advances in IR s-SNOM enable nanoscopic chemical imaging of diverse materials, ranging from biological to molecular and quantum systems. The meso- and macroscopic behavior of these systems is determined by interactions at the nanoscopic level and therefore require imaging techniques with high spatial resolution and large fields of view. Typical datasets for IR s-SNOM chemical imaging include two spatial dimensions across the sample surface and one spectral dimension, e.g., as obtained by scanning the reference arm mirror position in nano Fourier-transform infrared spectroscopy (nano-FTIR), as shown in FIG. 11.

Figure 11:
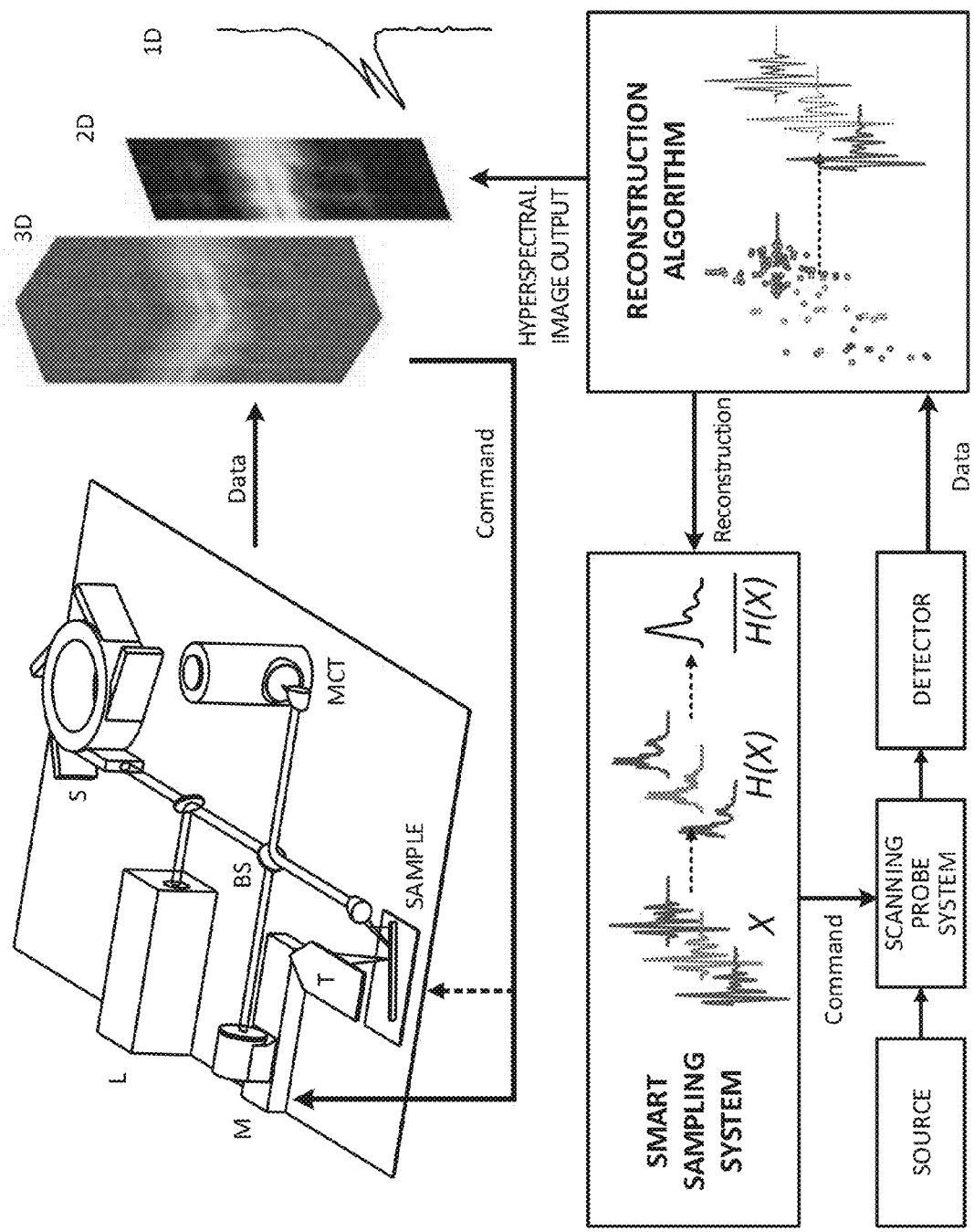
FIG. 11 illustrates datasets for IR s-SNOM chemical imaging that may be obtained using the system of FIG. 10 according to the present technology.

FIG. 11 illustrates datasets for IR s-SNOM chemical imaging that may be obtained using the system of FIG. 10 according to the present technology. Shown are a light source laser L or synchrotron S, beam splitter BS, scanning mirror M on reference arm. Also shown are sample on scanning stage under the tip T, point detector mercury-cadmium-telluride or MCT. Hyperspectral images can be acquired by scanning the mirror and the sample. In the case of a 2D grid scan, or of a 1D line scan of the sample, the final output is, respectively, a 3D or 2D hyperspectral image. If the sample is not moved, but only the mirror is scanned, the final output is a 1D spectrum.

Further shown in FIG. 11 is a diagram of smart s-SNOM. Our contribution includes the smart sampling system, which provides a list of positions of the scanning mirrors for each sample point, and a reconstruction algorithm to estimate the value of the missing data and, hence, recreate a fully sampled hyperspectral image X. At each new spatial position of the sample, an intermediate reconstruction is calculated in order to evaluate an averaged envelope $\overline{\mathcal{H}(X)}$ of the interferograms. $\overline{\mathcal{H}(X)}$ is normalized and used as a random distribution to select the mirror positions for the next sample position.

Broadband IR light sources are desired for measuring multiple vibrational modes but are often limited by their low brilliance, which reduces the signal to noise ratio (SNR). Laser based IR spectroscopy has high brilliance but is challenged by sample exposure when low repetition rate and high pulse energy lasers are used. Therefore, chemical nano-imaging of biological, molecular, and quantum systems with large spatial and spectral resolution over large fields of view has remained challenging because of the associated large multidimensional datasets whose achievable SNR limits the acquisition rate. Modifications of s-SNOM to increase acquisition speed have been proposed but have not yet taken advantage of the large redundancy in s-SNOM datasets. Previous work showed that compressed sampling can reduce nano-FTIR acquisition time using spectral sparsity. Further, compressed sensing has been adapted for spatio-spectral nano-FTIR imaging, and augmented by spatial regularization. While compressed sampling and matrix completion have been used intensively for hyperspectral imaging, their full potential has not yet been exploited for s-SNOM. Matrix completion relies on the hypothesis that only a small number of chemical species, compositional characteristics, or structural features are present in the sample, which is in fact typically the case for most samples imaged with s-SNOM.

In this work we address this problem of reducing the amount of acquired data while maintaining physical relevance by using prior knowledge and an adaptive sampling algorithm tailored for s-SNOM. First, we demonstrate a reduction in data acquisition by using a combination of prior physical knowledge about the light source, the spectral sparsity, and a limited number of distinct chemical species. The analysis of the impact of each hypothesis individually, and their interplay, leads to the design of an effective reconstruction algorithm for full spatio-spectral s-SNOM imaging from compressed measurements. We show that a compression of up to 96.6% (1/30 sample) compared to acquisition under conventional uncompressed conditions can be achieved without sacrificing physically meaningful information in the nano-FTIR images or spectra. Further, we develop an adaptive algorithm for positioning the reference arm mirror at each spatial position of the sample. We note that random sampling is a universal strategy adapted for compressed sampling and matrix completion. We propose to estimate the normalized average envelope of the local interferograms to use as a probability distribution to select the random mirror positions. This approach acquires data in the most relevant parts of the interferogram with high probability, as shown in FIG. 11. To study the achievable performance of this new approach of smart s-SNOM, we use fully sampled real datasets of biological, quantum, and molecular materials as ground truth. A subsampled measurement is extracted from the ground truth measurement using smart sampling, then a reconstruction algorithm recovers the remaining not-sampled data by using prior knowledge about the light source and the sample.

Methods

Compressed sampling (CS) and matrix completion (MC) are well suited for s-SNOM to reduce the number of measurements needed to have a large field of view at high spectral resolution. In the following subsections we motivate choices to create reconstruction algorithms based on CS and MC and describe an adaptive scan strategy for the reference arm mirror position. Conventionally, the sample is raster scanned under an atomic force microscope (AFM) tip to image a repoints are distributed along a regular discrete grid of evenly spaced points. At a given spatial position of the tip, the reference arm mirror is scanned to acquire an interferogram. One data point of the interferogram corresponds to one mirror position, which corresponds to one optical delay between reference and signal arms. In practice, the mirror is translated with a constant speed and measurements are periodically performed to get regularly spaced delays. Here we propose to use only a small fraction of the mirror positions that are standard in conventional s-SNOM acquisition. In order to recover the missing data points, we exploit prior knowledge of the sample and the light source.

The data presented here are collected using three different IR s-SNOM instruments. All of the following instruments work on the same following principle. IR light is focused onto the apex of an oscillating metalized atomic force microscope tip. The tip oscillates at ω t which, through the nonlinear distance dependence of the near-field signal, produces harmonics. The tip scattered light is collected with a mercury cadmium telluride (MCT) detector. The near-field signal is discriminated from the far-field background by demodulating the total tip scattered light at higher harmonics of the tip tapping frequency. To get complex valued spectra from the near-field, the AFM is placed in one arm of an asymmetric Michelson interferometer. IR light is sent into this interferometer such that the tip scattered light can be amplified with the reference field from the interferometer reference arm that is scanned to change the relative path lengths between the two arms to perform Fourier Transform spectroscopy. Point, line scan, and array data are collected by positioning the AFM tip on the sample surface, then scanning the reference arm to acquire an interferogram. Line scans position the tip sequentially in a line and array scans perform repeated line scans with spacing in the orthogonal direction.

The ultrabroadband data collected using a synchrotron source was performed at Beamline 5.4, employing a specially modified AFM (Innova, Bruker), at the Advanced Light Source (ALS) at Lawrence Berkeley National Laboratory, which supplied the IR synchrotron radiation. Spectroscopy was performed, using a modified commercial FTIR spectrometer (Nicolet 6700, Thermo-Scientific) to control the reference arm. The low frequency SiO2 data was collected using a customized LHe-cooled Ge:Cu detector and Si beamsplitter. The broadband measurements, collected using a laser source, were performed at the University of Colorado Boulder. Here, tunable mid-IR light was generated by difference frequency generation (DFG) of signal and idler beams (HarmoniXX DFG, APE) from a femtosecond optical parametric oscillator (OPO) (Levante OPO, APE) pumped by a low-noise Yb oscillator operating at 75.7 MHz, with a pulse duration of 93 fs and an average power of 6 W (Flint, Light Conversion). The DFG light was tunable from 4 μm (2,500 $cm^{-1}$) to 15 m (666 $cm^{-1}$), with a pulse duration of 150 fs. The laser was tuned to relevant wavelengths for the PTFE and RuOEP experiments. In this case, the IR light was sent into a commercial s-SNOM instrument (nanoIR2-s prototype, Anasys Instruments/Bruker).

Atomic force microscope images. Atomic force microscope (AFM) images of the samples used in FIGS. 12A-12D are shown in FIG. 13. s-SNOM images require a longer acquisition time compared to AFM images. Moreover, for some applications s-SNOM acquisition can be performed on only a limited number of spatial point. Here, the AFM images are used to give an idea of the spatial distribution of the chemicals in the samples used to demonstrate smart s-SNOM. As shown in FIG. 13, blue circles indicate the spatial positions of the s-SNOM measurements used in FIGS. 12A-12D where applicable (single point for Amide, line scan for $SiO_2$, and array for RuOEP and PTFE). Red circles indicate the spatial positions of the data shown in FIGS. 12A-12D where applicable.

Compressed Sampling (CS). Infrared spectroscopy resolves spectral peaks from, e.g., molecular vibrations, which are specific to the molecular identity and their local chemical environment. Each spatial point of an s-SNOM measurement contains a mixture of distinct chemical species, which, when spectroscopically measured, yield a combination of vibrational spectra of multiple local chemical species. s-SNOM spectra are usually composed of a few resonance peaks and are thus, in principle, sparse signals.

Unfortunately, the sparsity assumption is not always correct, for instance, the free carrier response can contribute to a wide spectral range. In those cases, only other prior knowledge, as described in the following sections can be used. The number of mirror positions in FTIR spectroscopy can be reduced using concepts of compressed sampling. Compressed sampling is a well-established technique to efficiently acquire and reconstruct a signal. Two main assumptions are required, sparsity (here of the spectrum) and mathematical incoherence of the sensing matrix. In our context, incoherence means that every point of an interferogram is a different linear combination of each frequency point of the corresponding spectrum. Here, the interferogram and the spectrum are linked together by a Fourier transform. It is well known in signal processing that the Fourier transform associated with a random selection of samples leads to an incoherent sensing matrix}. Therefore, in s-SNOM, all the conditions are met to use CS on the spectral dimension. Moreover, spectral peaks can only be detected if they are within the light source bandwidth. Hence, the spectrum is reconstructed only inside the light source bandwidth and set to zero outside. When the light source is a laser, this can be used to greatly reduce the number of necessary samples acquired. The spectral portion outside the light source bandwidth does not affect the measurement and is considered to be composed of zeros. A truncated Fourier transform on the accessible part of the spectrum is used to reduce the problem dimension and to increase computation speed and compression factor.

Matrix Completion (MC). s-SNOM spectra are combinations of a few distinct chemical vibrational spectra. Under mild assumptions, this leads to a small rank measurement matrix when the number of chemical species in the sample is small compared to the number of spatial measurement points. Under a linear mixing assumption, it can be shown that the rank of the measurement matrix will be smaller than the number of chemical species in the sample.

Low rank assumption. Environmental effects can cause a progressive shift of the spectrum's peak. These can increase the rank of the measurement matrix and therefore the rank of the measurement matrix might not necessarily be smaller than the number of chemical species. Big data matrices generated by a simple generative model are of approximate low rank. We assume the hyper-spectral imaging data considered here are generated by a simple generative model and therefore can be assumed to be of approximate low rank.

Matrix completion is used to complete matrices with missing entries under the approximate low rank assumption. Regular s-SNOM data can be rearranged in a matrix form with interferograms in rows, where each row corresponds to a given spatial position of the tip. When only a few random positions of the mirror are selected, the missing data in the matrix is suitable for recovery as missing entries because the matrix is low rank. MC is not sensitive to the complex spatial distribution of the chemical species, therefore it remains a useful tool even for samples with random uncorrelated spatial distributions of the chemical species.

Adaptive Random Sampling. Redundancies in s-SNOM data can be exploited to recover a full field of view and a complete spectral image from fewer measurements. In addition, we propose an adaptive selection of the most appropriate sampling positions for the reference arm mirror at the next tip position. Intuitively, the sampling should select parts of the interferogram that convey the most variations. Thus, we propose tuning the probability distribution of the random sample selection as close as possible to the envelope of the interferograms. s-SNOM samples can show a wide diversity of interferogram envelopes, which emphasizes the necessity for an adaptive strategy to select the best mirror positions to acquire data. At the beginning of an acquisition, the only prior knowledge available is the spectral bandwidth of the light source and the sparsity of the spectrum. Therefore, for the first sample spatial position, we use a uniform random distribution to select the reference arm mirror positions where data will be collected. The number of samples to be acquired can be determined by using the Nyquist criterion and the sparsity assumption. For the following spatial position, we have more information from the previous measurement. Hence, we propose tuning the random distribution used to select the mirror positions so that it is as close as possible to the envelope of the interferogram. We reconstruct all of the interferograms at previous spatial positions and calculate their envelopes. We use the average of these envelopes to generate the probability distribution for spectral sampling at the next sample position. The sampling rate is continually reduced throughout the measurement such that the desired final compression factor is achieved.

Similar to MC, the performance gain due to our adaptive sampling strategy is sensitive to the number of pure chemical species in the sample as well as to the number of appearances of each chemical species. However, the performance gain does not depend on the spatial distribution of the chemical species.

Experimentally, smart s-SNOM moves the scanning mirror (see FIG. 10) to only some specific positions dictated by the adaptive sampling strategy. This kind of experiment is emulated by using the adaptive sampling selection rules on the data provided by a conventional s-SNOM experiment. The fully sampled dataset can then be used both as a ground truth to calculate errors, like relative mean square error, or to compare the peak positions of the reconstruction. In our algorithm, we made the choice to minimize a criterion enforcing fidelity to data using a quadratic norm with penalization added to enforce the sparsity of the spectrum and the low rank assumption. The criterion is convex and has two parameters $\lambda_1$ and $\lambda^*$) to tune how sparse and how low rank the reconstruction should be, respectively. We then use a generalized forward-backward algorithm to minimize this criterion.

---

Algorithm 1: Generalized Forward-Backward

Initialize $\tilde{X} = \tilde{X}_0$, $Z_i = \tilde{X}_0$ $\forall i$
repeat
| Compute $G = \nabla F(\tilde{X})$
| for i = 0 to N do
| | Compute $Z_i = \text{prox}_{N\theta H_i(\bullet)}(2\tilde{X} - Z_i - \theta G)$
| end

| Compute $\tilde{X} = \frac{1}{N}\sum_{k=1}^{N} Z_k$ until convergence;
return $\tilde{X}$

---

In the following we demonstrate how our strategy performs on different samples, and how well physically relevant information is kept in the reconstructions.

Results s-SNOM imaging can be used on a broad class of samples (see FIGS. 12A-12D), including biological, molecular and quantum materials. We tested our algorithms with a representative member of each of these material types and with two different light sources, including a laser and a synchrotron (Advanced Light Source ALS). Light source properties affect the interferogram shape (see FIGS. 12A-12D). Specifically, the synchrotron's broad bandwidth leads to a sparser representation than that of a laser. We quantify the compression with two different metrics. The ratio between the number of acquired samples for a fully sampled acquisition and for a smart s-SNOM acquisition is called the reduction factor (R). The experimental data used as ground truth in this paper are over-sampled to ensure Nyquist sampling above the highest frequency of the light source. Furthermore, the mirror displacement range is scanned to achieve a fixed spectral instrument resolution that is narrower than the observed spectral features. Therefore, we also give the ratio between minimally sampled acquisitions (at Nyquist rate and smallest mirror motion range) and smart s-SNOM sampling, which is called the compression factor (CF). We emphasize that, at the experimental integration time per sample, Nyquist sampling would greatly reduce the quality of the spectrum, therefore we use R as a fair ratio to be highlighted. Laser based broadband measurements (nano-FTIR) and synchrotron IR nanospectroscopy (SINS) were performed. We considered a range of sample types and light sources for a robust interpretation of smart s-SNOM reconstructions.

FIGS. 12A-12D illustrate results of smart s-SNOM to different materials (biological, molecular, and quantum), different light sources (laser, ALS, synchrotron), and different spatial scanning (single point, line, and 2D scan) according to the present technology. Fully sampled data sets acquired experimentally are shown with blue curves. Mirror positions selected by our adaptive sampling strategy are shown with red curves. Reconstructed spectrum in amplitude/phase of $|A(\bar{v})|/\Phi(\bar{v})$ and real/imaginary part or $\text{Re}(A(\bar{v}))/\text{Im}(A(\bar{v}))$ (shown with red and black dotted curves, respectively). For the PTFE sample, reconstruction from uniformly sampled measurements without the use of adaptive sampling are shown with green dotted curves. The reduction factors (R) for FIGS. 12A-12D are, respectively, 17, 30, 4, and 30. The compression factors (CF) for FIGS. 12A-12D are, respectively, 1, 4, 1.6, and 6.5. The regularization parameter called Nuc for FIGS. 12A-12D are, respectively, 0, 5, 0.75, and 0.005. The regularization parameter $l_1$ for FIGS. 12A-12D are, respectively, 0, $10^{-6}$, 0.01, and $10^{-5}$.

Figure 12A:
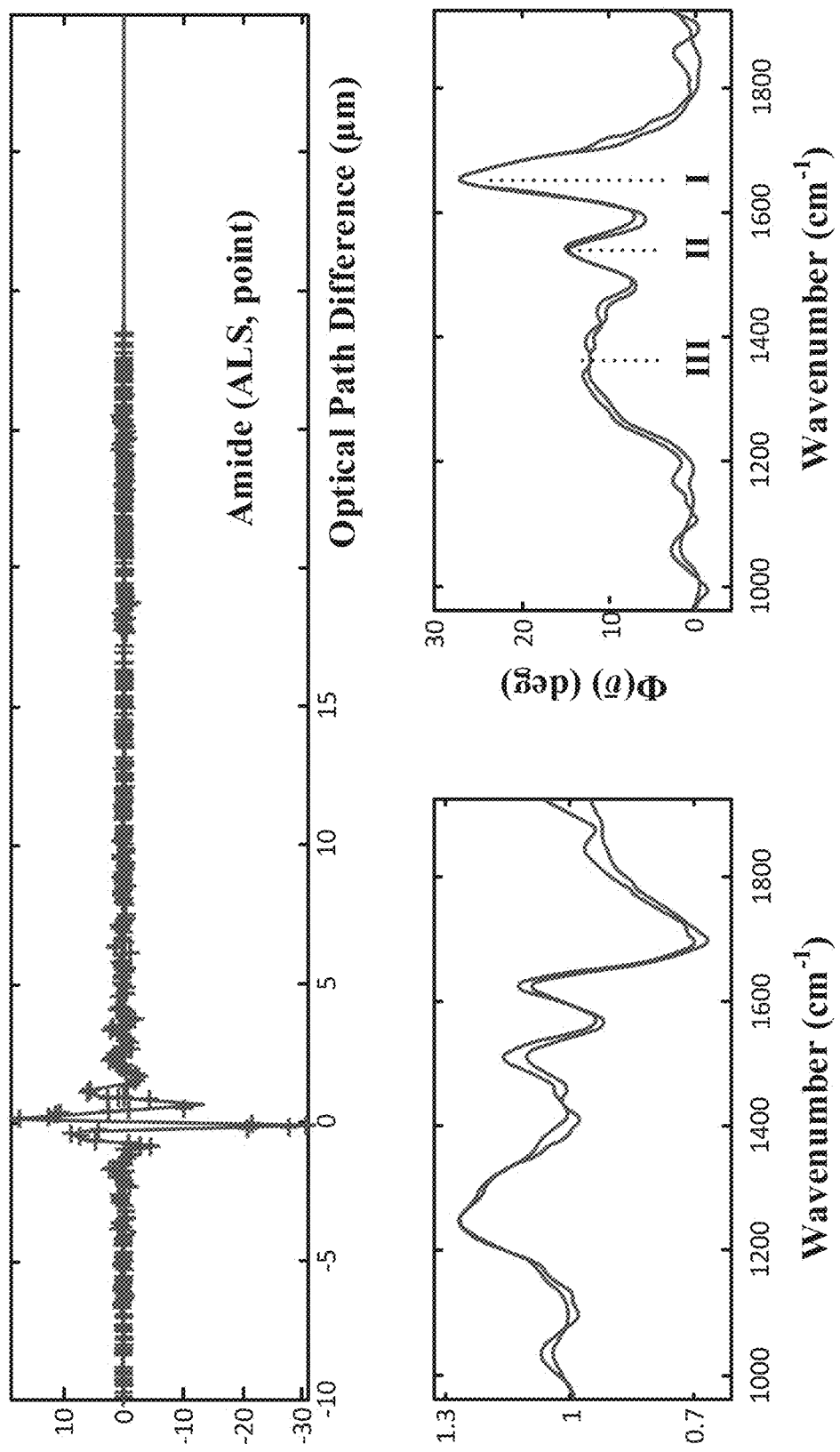
FIGS. 12A-12D illustrate results of smart s-SNOM to different materials, different light sources, and different spatial scanning according to the present technology.
Figure 13:
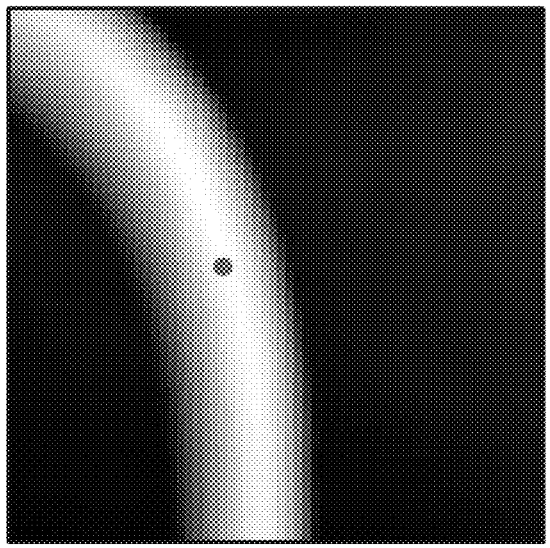
FIG. 13 illustrates atomic force microscope (AFM) images of the samples used to obtain the results shown in FIGS. 12A-12D according to the present technology.
Figure 13:
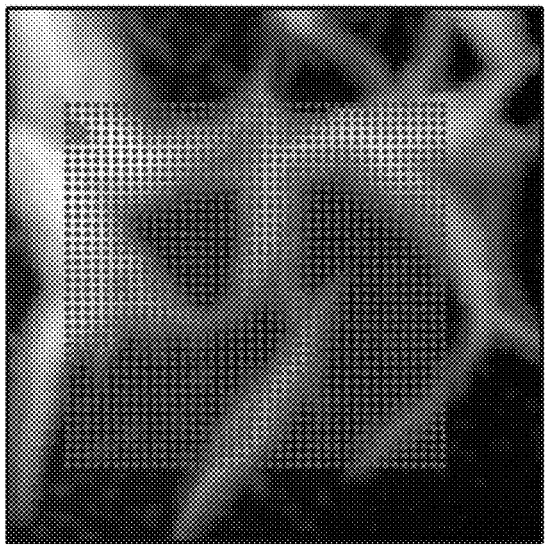
Figure 13:
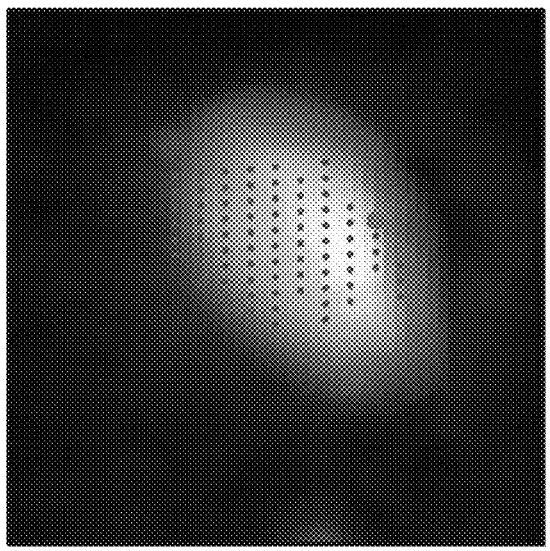
Figure 13:
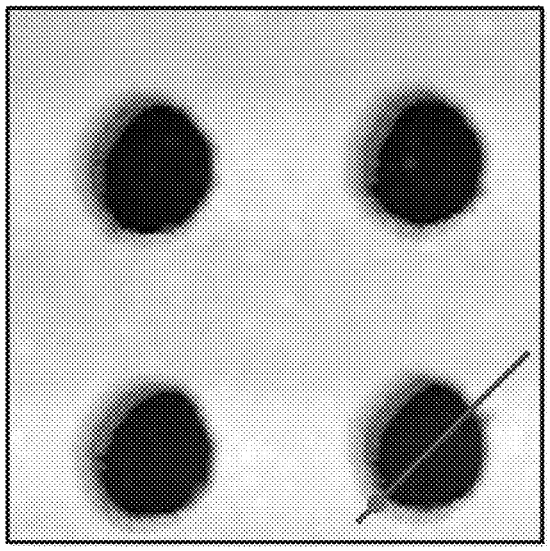

The first dataset shown in FIG. 12A is a synchrotron radiation based measurement of 400 nm thick gamma-globulin referenced to Si. This measurement highlights the difficulty of measuring multiple chemical resonances with a low brilliance light source. The spectrum of gamma-globulin shows the characteristic amide resonances (I,II, and III) of a protein and are indicated in FIG. 12A. Only one spatial point is acquired, therefore only sparsity of the spectrum and light source bandwidth priors can be used in this case. For this particular sample the sparsity of the spectrum in the light source bandwidth does not enable a compression factor over 1. Here, only the bandwidth prior has an effect on the compression. However, the reduction factor R is 17.

Figure 12B:
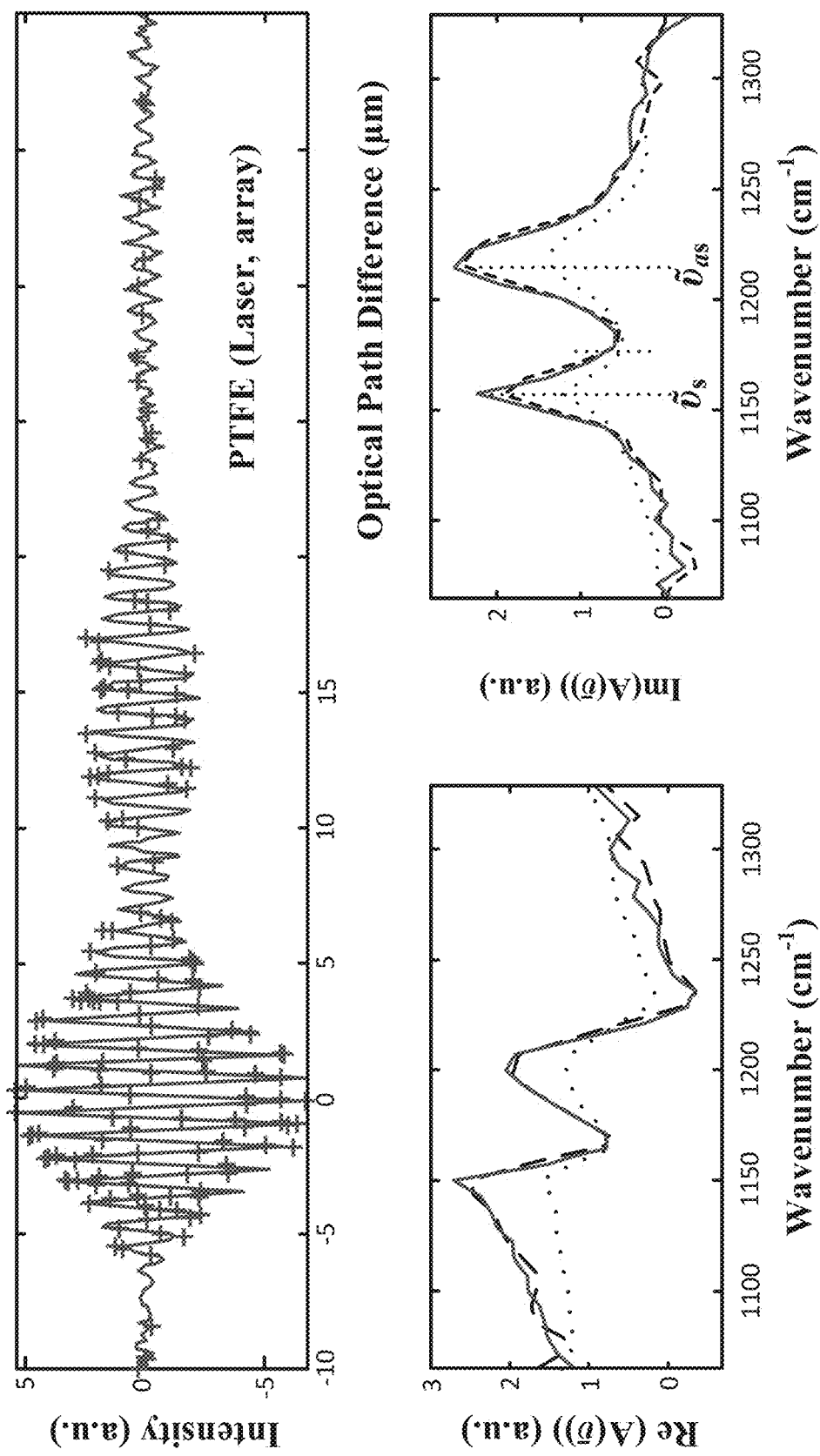
Figure 12C:
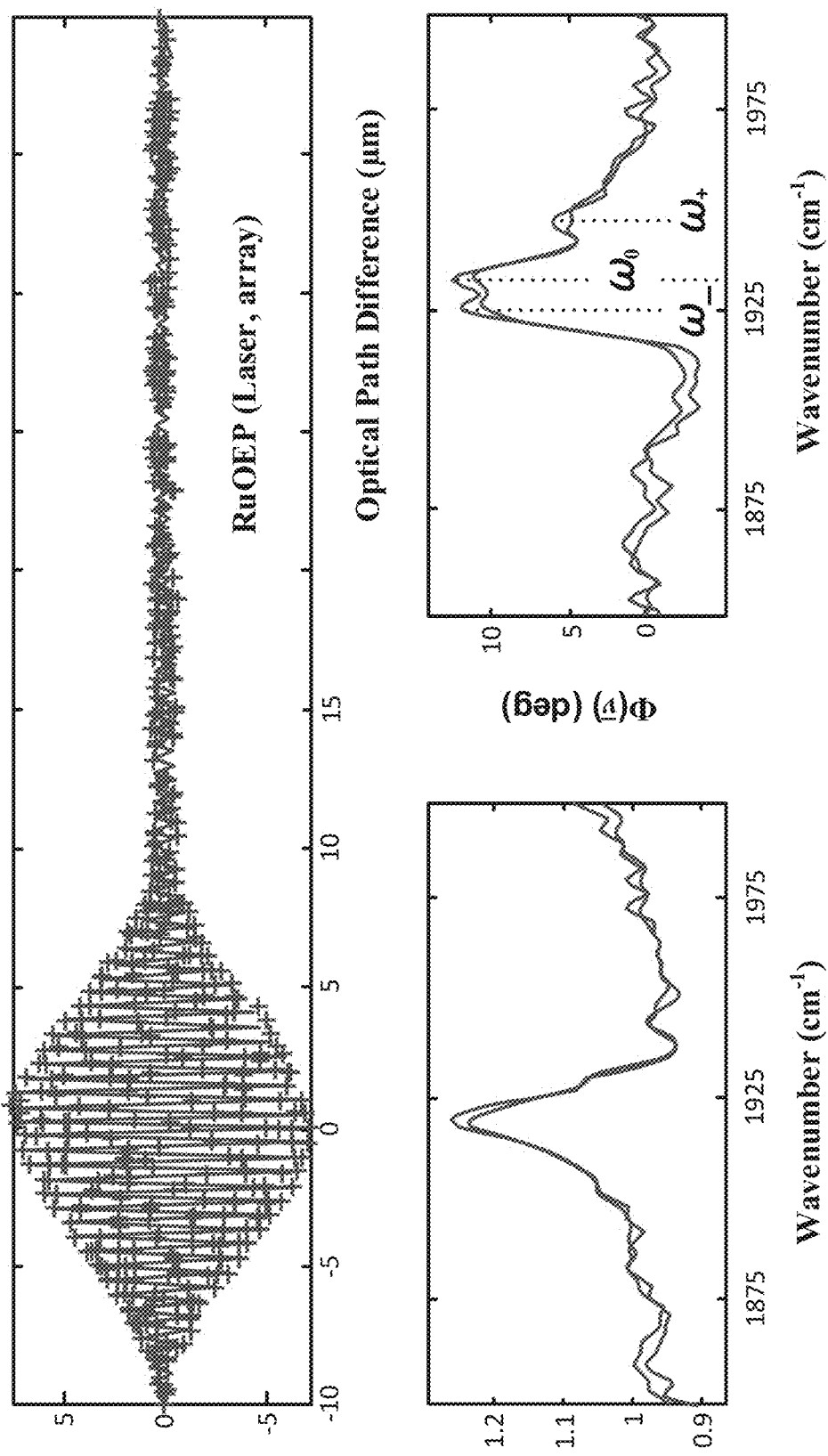

The second dataset shown in FIG. 12B corresponds to a laser based measurement of oriented PTFE referenced to gold. We examine the real and imaginary part of nano-FTIR spectra from PTFE, rather than the amplitude and phase, as the oscillator strength is too strong for the typical approximation between phase and imaginary spectra. The achieved compression factor is 4, well below the minimum number of the necessary points without the sparsity and small rank assumptions. Therefore, MC and/or CS are useful to improve the CF for PTFE samples.

Figure 14:
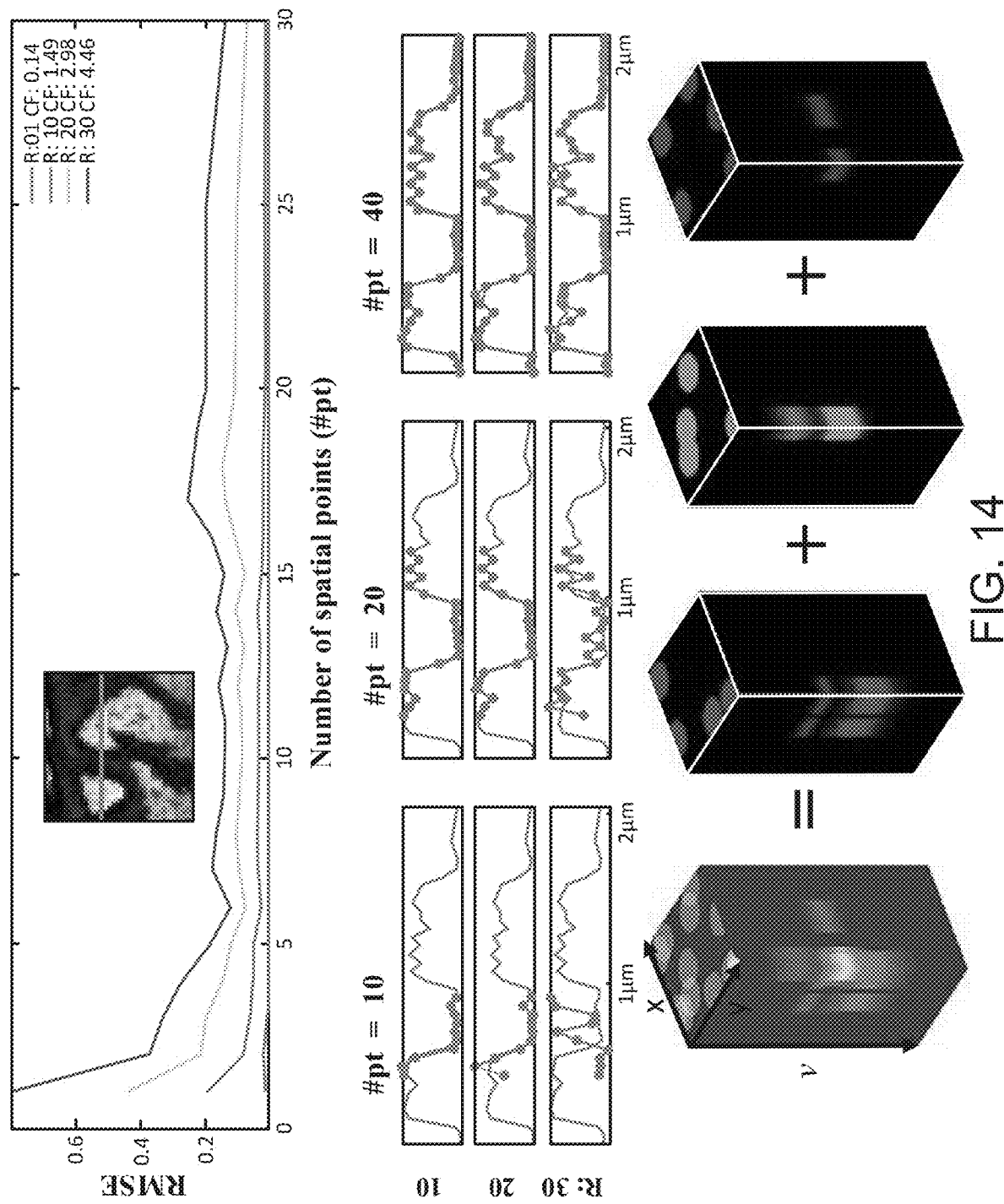
FIG. 14 illustrates the effect of low rank assumption on the reconstruction error according to the present technology.

The separate effect of CS and MC is demonstrated in FIG. 14 using the PTFE data set. The influence of R on the characterization of the two PTFE peaks is illustrated in FIG. 15.

FIG. 14 illustrates the effect of low rank assumption on the reconstruction error. We used a PTFE hyperspectral array scan to emulate an acquisition of different sized line scans. The position of the spatial line scanned is indicated with a blue line on the image of panel (B) in FIG. 14. Panel (A) of FIG. 14 provides plots of relative mean square error as a function of the number of spatial points for different reduction factors. The largest quality improvement occurs between 1 and 6 spatial points; this is an indication of the MC influence on the reconstruction quality. This can be different for other samples with a higher diversity of chemical specials. Referring again to panel (B) of FIG. 14, for each number of points used (10, 20, and 40 pixels), different reduction factors are emulated. 10, 20, and 30 by reducing more and more the number of positions used for the mirror. The spatial evolution of the spectrum amplitude at $\tilde{v}_{as}$ for ground truth is plotted in blue and the reconstructions in red. At a given reduction factor the visual quality of the reconstruction improves with the number of spatial points sampled; this is also an indication of the MC influence. Panel (C) of FIG. 14 provides an illustration of the principal of matrix completion. Each color—red, green, and blue— in panel (C) corresponds to one chemical species with a specific spectrum. Those images are separable in space (x, y) and frequency (v) and are, therefore, considered rank one images. In the case of a linear mixing model, the final hyperspectral image is a sum of a few (rank one) of these images if the number of chemical species is small in the sample. This explains the link between small rank assumption on hyperspectral images and the number of chemical species.

Figure 15:
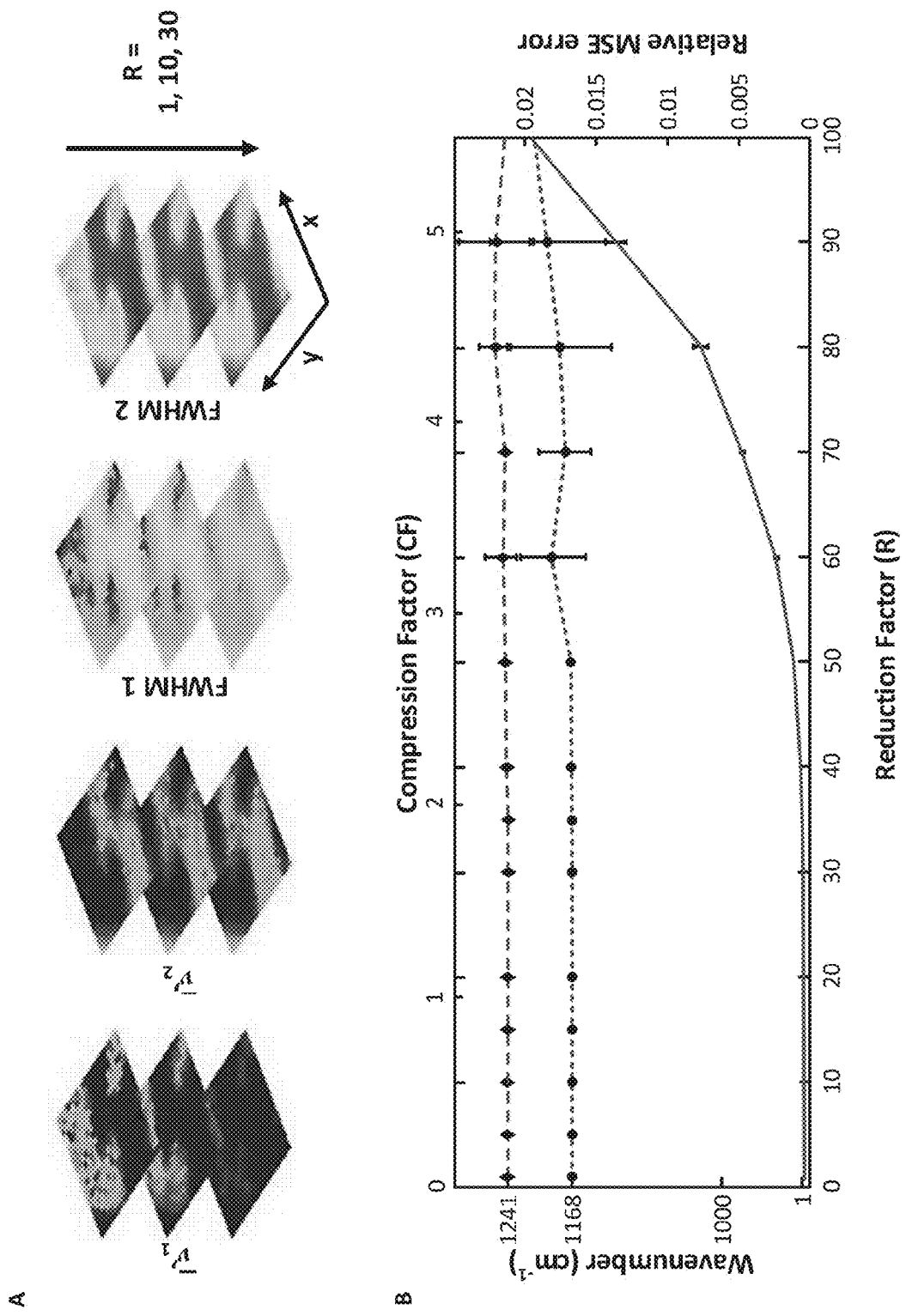
FIG. 15 illustrates extraction of physically relevant information from resonance peaks at different reduction factors.

FIG. 15 illustrates extraction of physically relevant information from resonance peaks at different reduction factors. Panel (A) of FIG. 15 provides characterization of the two spectral peaks of the PTFE sample located at $v_1 = 1168$ cm$^{-1}$ and $v_2 = 1241$ cm$^{-1}$. Each stack corresponds to three images obtained from reconstruction at different reduction factors (1, 10, and 30 from top to bottom, respectively, in panel (A) of FIG. 15). Each peak is characterized by its estimated position v'= and full width at half-maximum FWHM. Panel (B) of FIG. 15 shows in red a plot of the relative mean square error between reconstruction and ground truth. The plots shown in blue in panel (B) of FIG. 15 are plots of the localization of the two peaks as a function of the compression factor (CF, top axis) and to the reduction factor (R, bottom axis). The standard deviation of the peak localization increases with compression factor, leading to potential physical misinterpretation of the reconstruction for high reduction or compression factors.

The third dataset is a laser based measurement in a molecular electronic material of a metal carbonyl vibration (2,3,7,8,12,13,17,18-Octaethyl-21H,23H-porphine ruthenium(II) carbonyl). This example demonstrates the difficulty of accurately determining multiple spectral features of varying resonant strengths. The center resonance wo splits into ω_ and ω+, see FIG. 12C, as the crystalinity of the nanocrystals are increased. These resonances are close to each other and are of similar strength, hence increasing the difficulty of reducing the number of measurements. Nonetheless, we achieve a reduction factor R of 4. It is worth noting that the ground truth spatial sampling was irregular, namely only a subset of a regular rectangular grid positions were used. Our algorithm does not use the relative position of the spatial point, therefore any spatial scanning pattern is compatible with smart s-SNOM.

Figure 12D:
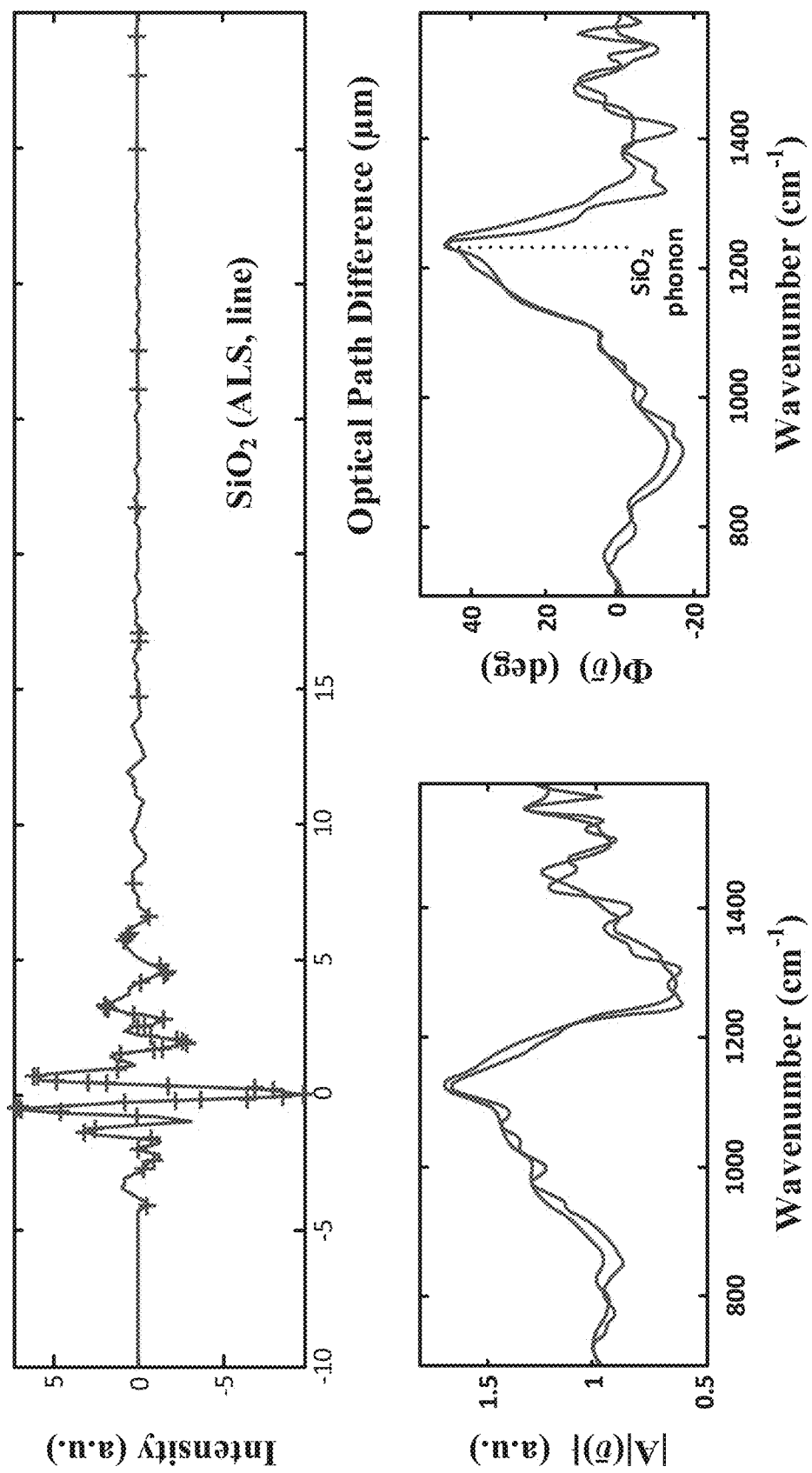

The fourth dataset is an FIR measurement of the silicon dioxide (SiO$_2$) phonon performed with synchrotron radiation. The ground truth corresponds to a line scan of the SiO$_2$ sample. A reduction factor of 30 was achieved on this sample corresponding to a CF of 6.5. Therefore, having an adaptive sampling strategy is attractive to collect data only at relevant mirror positions as shown in FIG. 12D. AFM images of the four datasets are shown in FIG. 13, as well as the spatial position of the tip where s-SNOM interferograms were acquired.

Adaptive Sampling Influence. The impact of the adaptive sampling influence can be seen by comparing the reconstructed spectrum from data selected with a uniform random position for the reference mirror to the reconstructed spectrum achieved from data selected with our adaptive sampling strategy (see respectively green and black dotted curves in FIG. 12B). We see that adaptive sampling dramatically improves the reconstruction quality. FIGS. 12A-2D displays a broad range of interferogram shapes. In each case, our adaptive strategy evaluates the average envelope and therefore allows us to select mirror positions in the most relevant parts of the interferograms. We see the selected mirror positions plotted with red crosses in FIG. 12D, showing that most of the sampled positions are near the zero-path difference (ZPD) region of the interferogram due to the distribution. In this case, improved spectral resolution achieved by larger mirror displacements does not appear to contribute new information; thus, points closer to the ZPD region are sufficient to reproduce the spectrum. In FIG. 12A the mirror positions are drawn from a uniform distribution because only one spatial point is used, therefore the acquisition has to be performed without any prior knowledge of the interferogram shape.

Compressed Sampling Influence. In FIG. 12A, the gamma-globulin sample is probed at only one spatial position. Therefore, only spectral compressed sampling could be used to reduce the number of measurements. Unfortunately, the resulting spectrum is not sparse compared to the bandwidth of the synchrotron. We observe that the compression factor is one, but nonetheless the reduction factor is 17. The knowledge of the bandwidth allows, in this case, to work with 17 times less data. FIG. 13 shows, for the PTFE sample, the relative mean square error (RMSE) between reconstruction and ground truth for four different compression factors (1, 10, 20, 30). The RMSE for only one spatial point are 0.019, 0.197, 0.440, 0.794 respectively. These errors are obtained using optimal parameter settings 0, 0.1, 0.1, 0.1 for the $l_1$ parameter and 0, 0, 0, 0 for the nuclear parameter respectively.

Algorithm. In this section we describe the algorithm used to exploit the physical prior knowledge like the light source bandwidth, spectrum sparsity, spatial redundancy, and small number of chemical species. The algorithm enables a reduction in the number of samples required to reconstruct the signal without loss of meaningful physical information. s-SNOM data can be represented in a sparse matrix form, called $\tilde{x}$ by applying a 1D Fourier transform truncated at the bandwidth of the light source along the rows of X, i.e., the interferograms, and optionally by applying a 2D wavelet transform along the columns.

$$\tilde{X} = W \times F \qquad [1]$$

where W and F are matrices performing a 2D wavelet transform and a truncated 1D Fourier transform respectively, when no wavelet transform is used W can be replaced by the identity matrix. Otherwise, this model can be called Kronecker compressive sensing. Let us call y the vector of measured samples, we have:

$$y = S(W^* \otimes F) \text{vect}(\tilde{X}) \qquad [2]$$

with ⊗ the Kronecker product and S the sampling matrix composed of 0 and only one 1 per line at the selected sample positions.

We notice that the nuclear parameter is always 0, indicating the fact that MC is not useful when only one spatial point is probed. For comparison, we perform reconstruction with the $l_1$ parameter also set to 0 to see the effect of the $l_1$ norm on the reconstruction the resulting RMSE are 0.0185, 1.42, 1.53, 1.6 respectively. We notice that the RMSE for compression factors of 10, 20 and 30 is greatly reduced using the $l_1$ norm (by 70% in average). As a result, we conclude that compressed sensing improves the performance for the PTFE sample, in agreement with similar effects observed by others.

Criterion. As explained above, a low rank assumption on IB can be done. Similarly, it can be shown that this is also true for x̃. In matrix completion, a low rank assumption can be used to complete the missing entries of a matrix. Usually a nuclear norm $\|\cdot\|^*$ penalization is used as the regularization term. Indeed, this norm can be seen as the /1 norm of the singular values of the matrix, i.e., the sum of the absolute value of the singular values. If the rank was known in advance, non Negative Matrix Factorization (NMF) could be applied. One can argue that a superior bound of the rank can be derived. While another disadvantage of NMF is that the problem is nonconvex. Therefore, we decided not to use NMF.

Alternatively, we use a convex criterion to minimize, enabling us easily to incorporate penalizations used in CS and MC:

$$J(\tilde{X}) = F(\tilde{X})G(\tilde{X}) \quad [3]$$

$$F(\tilde{X}) = \|S(W^t \otimes F)\text{vect}(\tilde{X}) - y\|^2 \quad [4]$$

$$G(\tilde{X}) = \lambda_1 \|\tilde{X}\|_1 + \lambda_* \|\tilde{X}\|_* \quad [5]$$

with $\|\cdot\|_1$ the /1 norm and $\lambda_1, \lambda^*$ two parameters to tune. The main criterion J is split in two parts, a smooth and convex fidelity to data term Eqn. (4) and a non differentiable convex sum of penalization part Eqn. (5).

Positivity. During acquisition, light is focused onto an AFM tip in intermittent contact (tapping) mode; as the tip oscillates, the near-field interaction increases as the tip approaches the sample and decreases as the tip moves away from the sample. The back-scattered light is heterodyne amplified with the reference arm and detected with a mercury cadmium telluride (MCT) detector. Demodulation of the amplified near-field signal at higher tip harmonics isolates the near-field response to within ~25 nm. Since each measurement is the result of a demodulation, there is no guarantee that they are positive valued, therefore a positivity prior is not applicable here.

Matrix Completion Influence. The effect of matrix completion depends on the number of spatial points acquired. If there are fewer spatial points than the number of pure chemical mixtures in the sample, matrix completion becomes irrelevant. To show how MC is used in our reconstruction, we study the effect of the number of spatial points on the quality of the reconstruction of the PTFE sample. The experiment consists of emulating line scan experiments of different sizes and different compression ratios. The curves displayed in panel (A) of FIG. 14 show that the relative mean square error (RMSE) of the reconstruction compared to the ground truth, decrease with the number of spatial points sampled. Moreover, we see that MC enables a higher CF compared to CS alone. In panel (B) of FIG. 14, the reconstruction of a 1D spatial section is shown for different number of spatial points and different reduction factor. There is a clear relation between R, the number of spatial points and the quality of the reconstruction. This shows the effectiveness of MC on the PTFE sample. We also observe that only a limited number of spatial points is needed to fully use MC (around 6 spatial points for PTFE). This is an indication that the number of chemical species is indeed small in this sample (see panel (C) of FIG. 14).

Physical Relevance of Reconstructions. In some applications users are only interested in the characteristics of the spectral peaks. In the PTFE example, there are two peaks, corresponding to the symmetric and antisymmetric modes that convey the physically relevant information. They are characterized by their location at $\tilde{v}_1 = 1168$ cm$^{-1}$ and $\tilde{v}_2 = 1241$ cm$^{-1}$, full width at half maximum, amplitude, and phase. Panel (A) of FIG. 15 illustrates the capacity to extract this information from smart s-SNOM data at different reduction factors. Color bars of each image correspond to an estimate of one of these parameters, each pixel corresponds to a spatial position of the sample. Ground truth value of the parameters are shown in the top images of each stack, where R=1, and are compared with the R=10 and R=30 cases. In panel (B) of FIG. 15, estimation of the peaks positions appears to be unbiased for a reduction factor up to 100, however the standard deviation increases with reduction factor (see error bars of blue curves). A good estimation of the peak's position, width and relative amplitude can be achieved for R up to 30. We also observe a denoising effect of our algorithm, where the sparsity assumption and the low rank assumption used in our algorithm allow us to reject a significant part of the noise contained in the reconstruction. This is explained by the fact that the noise component of the data is not sparse in Fourier domain and is not low rank.

Discussion

While signal processing for hyper-spectral imaging is a broad field, we presented a focused development of choices to create a smart s-SNOM approach taking into account its physical properties. In this section we discuss the particular choices made and avoided as well as the limitations of the technique.

CS for spatial dimension. Similar to the temporal or spectral dimension, spatial dimensions carry redundancies because samples are composed of finite types of molecules that are typically clustered or arranged in domains. The wavelet transform of such samples is known to be sparse. Additionally, the 2D Curvelet transform has been proven to be sparse for images that are piece-wise smooth with smooth boundaries. This could be used to reduce the number of spatial positions of the tip using CS. As an example, CS has been used in AFM to increase acquisition speed. CS along the spatial dimensions can be combined with CS in the spectral dimension and would fall in a family called Kronecker CS. In the case of a sample containing a spatially isolated chemical species, the Wavelet domain would no longer yield a sparse image and therefore would not comply with CS requirements. It is arguable whether this would be an interesting feature to be determined and hence whether the wavelet domain sparsity should be used or not. Moreover, as a practical note, performing this additional step slows down the reconstruction because at each iteration one needs to perform a spatial wavelet transform for each mirror position used. Given the small compression potential, the strong hypothesis on the sample and the added algorithmic cost, we decided not to implement this approach at this time.

Scanning. We note that mirror scanning stages have limitations not included in our model. Indeed, speed and precision of the mirror and tip motion are linked to the trajectory used. Lissajous curves are a good candidate for scanning strategy. Our adaptive selection of the mirror positions would need to be modified to take these limitations into account. Moreover, a multipass strategy could be used to improve the selection of the mirror position. Nonetheless, our contribution clearly demonstrates the potential of using an adaptive strategy to reduce s-SNOM acquisition time. Introducing scanning limitations in our model could lead to faster implementation of smart s-SNOM.

Algorithm. If the rank was known in advance, Non-Negative Matrix Factorization (NMF) could be applied. One can argue that an upper bound of the rank can be derived. Another disadvantage of NMF is that the problem becomes nonconvex, therefore we decided not to use NMF. Alternatively, we chose to minimize a convex criterion with a generalized forward-backward algorithm for its simplicity, its speed, and its flexibility to add and try multiple penalization terms. We chose to use $/_1$ norm and $/*$ nuclear norm to enforce the sparsity of the reconstructed spectra and to reduce the rank of the reconstruction respectively. Notwithstanding, one could think about many other penalization functions. For instance, we tried an $/_{1,2}$ penalization but the effect on the reconstruction quality is smaller than the two penalization functions we use. Adding a penalization function also increases the number of parameters to tune, therefore we tried to minimize the number of penalization functions. We still have two parameters to tune in our criterion.

Parameters tuning. We minimize criterion Eqn. (3) that contains two parameters, $\lambda_1$ and $\lambda^*$. They are used to balance how strongly the priors are applied to the optimal reconstruction. These two parameters require tuning depending on the sparsity of the spectra and on the number of pure chemical species in the sample. These parameters influence the quality of the reconstruction.

Figure 16:
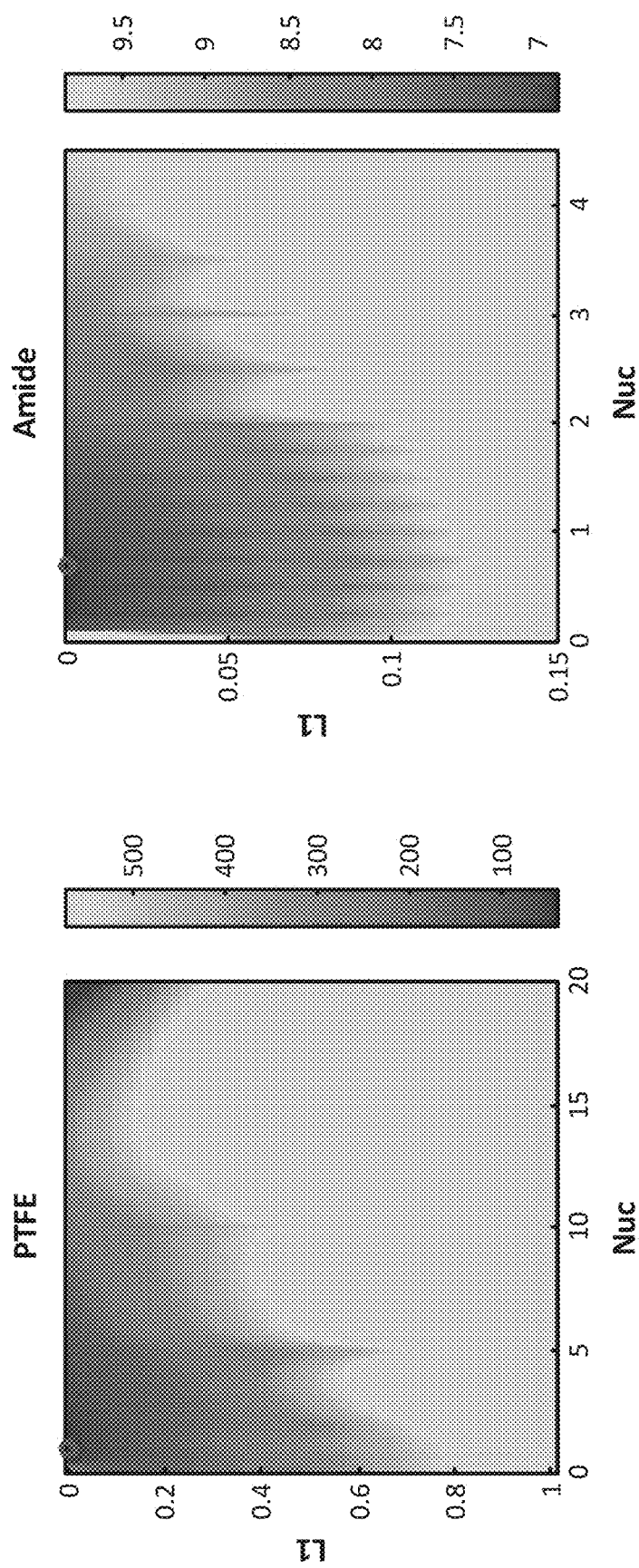
FIG. 16 illustrates error as a function of parameter settings for two different samples according to the present technology.

FIG. 16 illustrates error as a function of parameter settings for two different samples: PTFE and Amide. Light sources are a laser and a synchrotron, respectively, to illustrate the estimator behavior for two different spectral sparsities. Colors represent reconstruction errors, and spatial coordinates correspond to $(\lambda_1, \lambda_*)$ parameter settings. Color saturates to pure yellow for error values bigger than the error obtained with $\lambda_1=0$ and $\lambda_*=0$. This way the regions where errors are reduced are more visible. The red circles in FIG. 16 indicate optimal settings, and we observed that regions around the optimal settings give similar errors. We observed that tuning the parameters is easy and does not necessarily need to be optimal to obtain relevant reconstructions.

In FIG. 16, we show the mean square error between reconstruction and the "ground truth" with respect to these two parameters. In blue, we observe the region where the reconstruction error is smaller than when no penalization is used ($\lambda_1=0$ and $\lambda^*=0$). In addition, an automatic tuning strategy of the parameters like cross validation could be tested. The rule to select the number of mirror position at each spatial position also require tuning some parameters. However, those parameters depend on quantities assumed to be known like the light source bandwidth and the desired compression factor and on other parameters kept fix for all the different simulations. We have selected the following rule $S(k)=\max(N_1-\alpha k, N_2)$ with s(k) the number of mirror position used at $k^{th}$ spatial position. $N_1$ is the number of mirror position used at the first spatial position, this number is set to be above the Nyquist sampling criterion. We used $\alpha=a\times(N_1-N_2)/K$ with K the total number of spatial point and a=10 so that after one tenth of the spatial point are acquired, the number of mirror position stay constant (at $N_2$), then $N_2$ is tuned so that the total number of mirror position used for all spatial position is in agreement with the desired compression factor.

An automatic tuning strategy like cross validation could be tested.

A key aspect of smart s-SNOM is that it decreases acquisition time without sacrificing meaningful information. This might seem counterintuitive because of the potential impact on SNR of the reduction in total integration time. However, the lost integration time from missing data points is offset by both the reconstruction and denoising effects. In fact, while conventional sampling is inefficient with the data collection as prior knowledge is not used to inform sampling, smart s-SNOM reconstruction makes use of the prior knowledge of the object observed to reject noise and to recover missing acquisitions information.

Perspective and Summary

We propose a strategy to compress s-SNOM measurements and therefore greatly reduce acquisition time. To achieve that, we reduce the number of mirror positions needed at each location of the sample by exploiting redundancies in the s-SNOM dataset. Known prior knowledge like bandwidth of the light source, spectral sparsity, and the limited number of distinct chemical species is used to reduce the necessary measurements. By using the same prior knowledge in our adaptive selection of the sampled mirror positions, we greatly improve the performance of s-SNOM. Smart s-SNOM opens the way to applications where a wide field of view and a good spectral resolution are both required apart from the nanometric resolution.

Discussion on Implementation. In comparing smart s-SNOM with other approaches to improve s-SNOM acquisition rates, we noted a demonstration of an experimental implementation of the rotating frame for faster acquisition. The underlying physical mechanism through which rotating frame enables faster acquisition is not general and is only suitable for certain materials, resonances, and light sources. Previously presented work presented largely differs from smart s-SNOM in that it is not an adaptive technique and does not use knowledge about signal level strengths through an interferogram.

Experimental implementation of smart s-SNOM to reach the theoretical limit requires developments to overcome hardware constraints in existing systems. To best utilize the approach, trajectory optimization through the combined tip and mirror space would be necessary in addition to careful dynamic demodulation time constant and velocity engineering. Similarly, scanning of the tip mirror space could be done in iterations and evaluated after each iteration to determine what tip and mirror positions need to be measured more densely or with higher signal to noise ratio time constants. This approach would become a second and coarser form of adaptive imaging.

Figure 17:
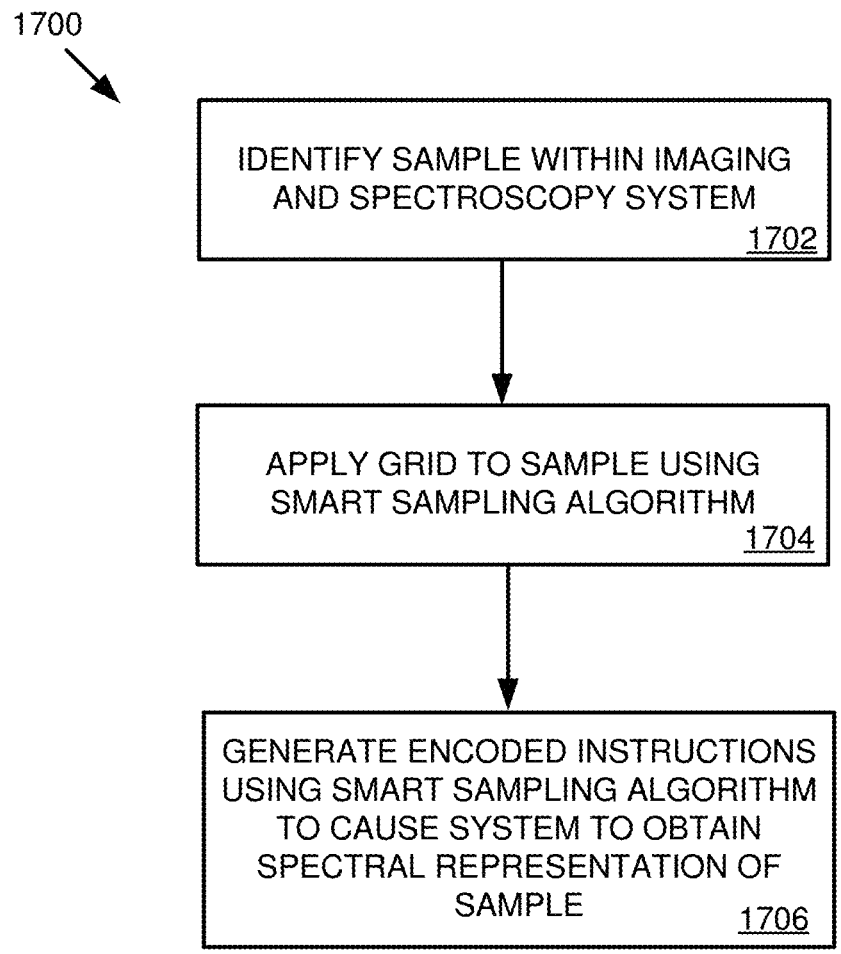
FIG. 17 illustrates a flowchart of a method according to the present technology.

FIG. 17 is a flowchart of a method 1700. Method 1700 may be embodied in a method for operating the smart sampling scattering scanning nearfield optical microscopy system 1000 shown and described with reference to FIG. 10 in the Example. Method 1700 may include the step of identifying 1702 a sample within an imaging and spectroscopy system. Method 1700 may also include the step of applying 1704, using a smart sampling algorithm, a grid to the sample. Method 1700 may further include the step of generating 1706, using the smart sampling algorithm, encoded instructions that, when executed by one or more processors, can cause the system to obtain a spectral image representation of the sample.

In method 1700, the spectral image representation can be based on a subset of measurements from the grid in a selected pattern. The smart sampling algorithm can be implemented in system 1000 as hardware components (e.g., application-specific integrated circuit(s)) and/or software code associated with a computing device or a computer processing system including one or more processors and at least one memory device storing the software code as program instructions executable by the processors to perform, implement, or otherwise facilitate at least some of the functions and other operations of the systems, methods, and apparatuses according to the present technology.

Method 1700 may include the step of pre-shaping a scan of the sample in phase, amplitude, or spectrum, before light is incident on the sample. In an example, method 1700 may include the step of pre-shaping a scan of the sample after light is incident to the sample. In another example, the selected pattern in method 1700 may be a pseudo random pattern, where the pseudo random pattern can take into account information regarding at least one of: a physical setup of components of the system, and estimated information regarding the sample. In yet another example, the selected pattern in method 1700 may be a pseudo random pattern, where the pseudo random pattern can take into account information regarding estimated information regarding the sample, the estimated information including at least one of: pulse spread time, and members of chemical species. In still another example, method 1700 may include the steps of: feeding back the subset of measurements taken from the grid, and updating the subset to include, or remove, a measurement from other areas of the grid.

Another embodiment of method 1700 may include the step of generating an optimized trajectory of a probe to facilitate minimizing a scanning time. In an example, method 1700 may include the step of shifting a carrier frequency into a rotating frame to reduce a number of data points required to sample a spectrum of the sample.

Exemplary Computer System Overview

Figure 18:
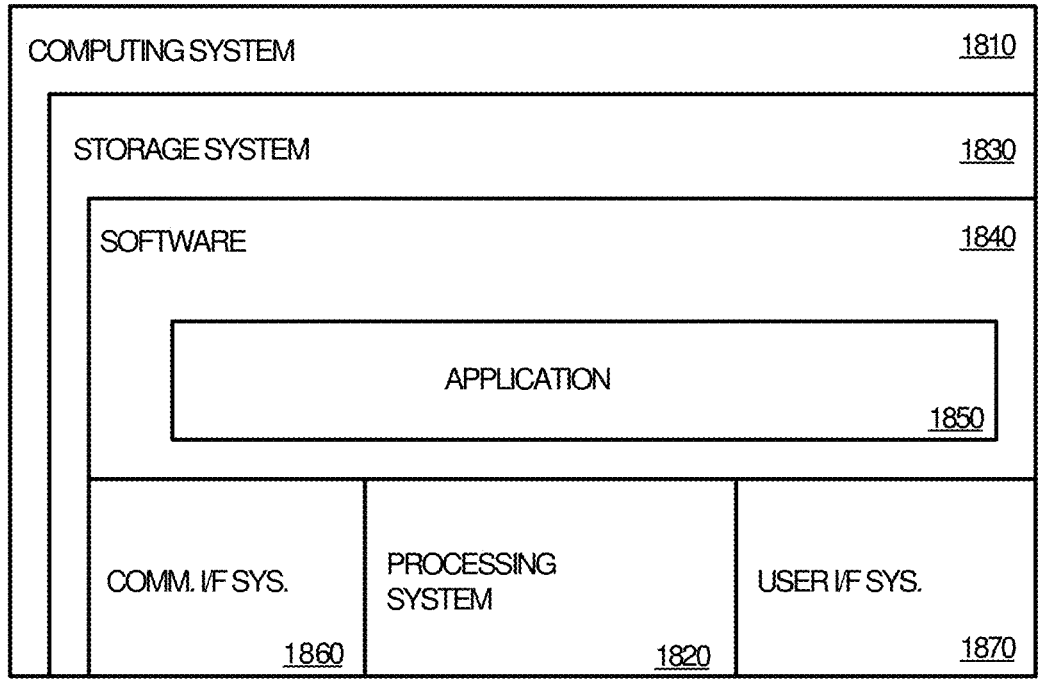
FIG. 18 illustrates an example of a computing system, which is representative of any suitable computer or processing systems in which the various embodiments of the present technology and associated processes disclosed herein may be implemented.

FIG. 18 illustrates an example of a computing system 1810, which is representative of any suitable computer or processing systems in which the various embodiments of the present technology and associated processes disclosed herein may be implemented. For example, computing system 1810 may include server computers, blade servers, rack servers, desktop computers, laptop computers, tablet computers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1810 may be implemented as a single apparatus, system, or device or may be implemented in a distributed manner as multiple apparatuses, systems, or devices. Computing system 1810 includes, but is not limited to, processing system 1820 (e.g., referred to above as "processor(s)"), storage system 1830 (e.g., "memory device(s)"), software 1840 (e.g., referred to above as "program instructions"), applications 1850, communication interface system 1860, and user interface system 1870. Processing system 1820 is operatively coupled with storage system 1830, communication interface system 1860, and user interface system 1870.

Processing system 1820 loads and executes software 1840 from storage system 1830. When executed by processing system 1820 in a multi-tenant cloud-based content and collaboration environments, for instance, software 1840 directs processing system 1820 to operate as described herein for at least the various processes, operational scenarios, and sequences discussed in the foregoing implementations. Computing system 1810 may optionally include additional devices, features, or functionality not discussed for purposes of brevity.

Processing system 1820 may comprise a micro-processor and other circuitry that retrieves and executes software 1840 from storage system 1830. Processing system 1820 may be implemented within a single processing device, but may also be distributed across multiple processing devices or sub-systems that cooperate in executing program instructions. Examples of processing system 1820 include general purpose central processing units, application specific processors, and logic devices, as well as any other type of processing device, combinations, or variations thereof.

Storage system 1830 may comprise any computer readable storage media readable by processing system 1820 and capable of storing software 1840. Storage system 1830 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1830 may also include computer readable communication media over which at least some of software 1840 may be communicated internally or externally. Storage system 1830 may be implemented as a single storage device, but may also be implemented across multiple storage devices or sub-systems co-located or distributed relative to each other. Storage system 1830 may comprise additional elements, such as a controller, capable of communicating with processing system 1820 or possibly other systems.

Software 1840 may be implemented in program instructions and among other functions may, when executed by processing system 1820, direct processing system 1820 to operate as described with respect to the various operational scenarios, sequences, and processes illustrated herein. For example, software 1840 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1840 may include additional processes, programs, or components, such as operating system software, virtual machine software, or application software. Software 1840 may also comprise firmware or some other form of machine-readable processing instructions executable by processing system 1820.

In general, software 1840 may, when loaded into processing system 1820 and executed, transform a suitable apparatus, system, or device (of which computing system 1810 is representative) overall from a general-purpose computing system into a special-purpose computing system. Indeed, encoding software on storage system 1830 may transform the physical structure of storage system 1830. The specific transformation of the physical structure may depend on various factors in different implementations of this description. Examples of such factors may include, but are not limited to, the technology used to implement the storage media of storage system 1830 and whether the computer-storage media are characterized as primary or secondary storage, as well as other factors.

For example, if the computer readable storage media are implemented as semiconductor-based memory, software 1840 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1860 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1870 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1870. In some cases, the input and output devices may be combined in a single device, such as a display capable of displaying images and receiving touch gestures. The aforementioned user input and output devices are well known in the art and need not be discussed at length here. In some cases, the user interface system 1870 may be omitted when the computing system 1810 is implemented as one or more server computers such as, for example, blade servers, rack servers, or any other type of computing server system (or collection thereof).

User interface system 1870 may also include associated user interface software executable by processing system 1820 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 1810 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system comprising:
    a probe to generate measurement signals based on a location of the probe relative to a sample, wherein the probe is connected to an actuator to move the probe to a desired location over the sample;
    a sampling system configured to:
        generate instructions to determine the location, and a state, of the probe; and
        divide the location of the sample into a grid, wherein the instructions generated cause the probe to:
            first use a random or deterministic psuedo-random spatial sampling of the grid to collect data; and
            then use the collected data to identify selected areas within the grid covering the sample; and
    a reconstruction module to reconstruct a representation of the sample based on the measurements collected from the selected areas of the sample.

2. The system of claim 1, wherein the probe is an optical probe.

3. The system of claim 2 further comprising a light source to illuminate at least one of: the probe, and at least a portion of the sample.

4. The system of claim 1, wherein the probe generates signals for processing to facilitate retrieval of an optical spectrum.

5. The system of claim 1, wherein the sampling system determines the location and the state of the probe based on prior signals collected by the probe.

6. The system of claim 1, wherein the sampling system is further configured to determine the location, and the state, of the probe based on prior knowledge about at least one of: the sample, and the sampling system.

7. The system of claim 6, wherein the prior knowledge includes at least one of: a light source spectrum, a spectral sparsity of the sample, a number of distinct chemical species, compositional characteristics of the sample, and structural features in the sample.

8. The system of claim 4, wherein for generating signals to facilitate retrieval of the optical spectrum, the probe comprises: a spectrometer, an interferometer, a grating spectrometer, a Fourier transform spectrometer, an optical homodyne, a heterodyne detection component, or a laser.

9. The system of claim 4, wherein the optical spectrum provides spectroscopic data including a spatial analysis or a spectral analysis.

10. The system of claim 1, wherein the sampling system is further configured to divide the sample into a grid, and wherein the instructions generated cause the probe to select a pseudo-random subset of the grid.

11. The system of claim 1, wherein, in a plurality of probe states, the probe is configured to measure different qualities of the sample at a given location.

12. The system of claim 11 further comprising a Fourier transform interferometer including a mirror, wherein the plurality of probe states corresponding to different positions of the mirror.

13. The system of claim 1, wherein the sampling system is further configured to divide the sample into a grid, and wherein the instructions generated cause the probe to select at least one of: a subset of the grid, and a subset of the states of the measurement probe.

14. The system of claim 4 further comprising a spectrometer, wherein the sampling system is further configured to divide the sample into a grid, and wherein the instructions generated cause the probe to select a pseudo-random subset of the grid for a spectroscopy analysis.

15. The system of claim 1, wherein the representation includes at least one of: spatial information, and spectral information, about the sample.

16. The system of claim 1, wherein the representation includes sub-diffraction limit spatial resolution information about the sample.

17. The system of claim 1, wherein the reconstruction module is configured to reconstruct the representation to include nanometer scale images having at least one of intrinsic vibrational, phonon, and electronic resonance contrast.

18. The system of claim 1, wherein the reconstruction module is configured to reconstruct the representation to include information about at least one of a: biological, molecular, and quantum, system.

19. The system of claim 1, wherein the sampling system is further configured to provide sub Nyquist sampling.

20. The system of claim 1, wherein the sampling system is further configured to perform at least one of: compressed sampling, matrix completion, and adaptive random sampling.

21. A method comprising:
    identifying a sample within an imaging and spectroscopy system;
    applying, using a smart sampling algorithm, a grid to the sample; and
    generating, using the smart sampling algorithm, instructions that when executed by one or more processors cause the system to obtain a spectral image representation of the sample based on a subset of measurements from the grid in a selected pattern,
    wherein the selected pattern is a pseudo random pattern that takes into account information regarding estimated information regarding the sample.

22. The method of claim 21 further comprising pre-shaping a scan of the sample in phase, amplitude, or spectrum, before light is incident on the sample.

23. The method of claim 21 further comprising pre-shaping a scan of the sample after light is incident to the sample.

24. The method of claim 21, wherein the selected pattern takes into account information regarding a physical setup of components of the system.

25. The method of claim 21, wherein the estimated information includes at least one of: pulse spread time, and members of chemical species.

26. The method of claim 21 further comprising: feeding back the subset of measurements taken from the grid, and updating the subset to include, or remove, a measurement from other areas of the grid.

27. The method of claim 21 further comprising generating an optimized trajectory of a probe to facilitate minimizing a scanning time.

28. The method of claim 21 further comprising shifting a carrier frequency into a rotating frame to reduce a number of data points required to sample a spectrum of the sample.

29. An apparatus comprising:
a non-transitory computer readable medium; and
a processing system,
wherein the non-transitory computer readable medium has program instructions stored thereon which, when executed by the processing system, direct the processing system to:
receive a profile hint associated with a sample that is the subject of spectroscopy analysis;
generate encoded instructions for performing the spectroscopy analysis of a sample based on selected sub-sampling of the subject; and
communicate the instructions to a spectroscopy analysis system that performs the spectroscopy analysis in accordance with the encoded instructions,
wherein the encoded instructions further cause the spectroscopy analysis system to shift a carrier frequency into a rotating frame.

30. The apparatus of claim 29, wherein the carrier frequency being shifted into the rotating frame by the spectroscopy analysis system reduces a number of data points required to sample a spectrum of the sample.

31. The apparatus of claim 29, wherein the encoded instructions further cause the spectroscopy analysis system to:
identify two basis vectors spanning a rotated space; and
measure a complex-valued field using amplitude modulated two-phase homodyne imaging.

32. The apparatus of claim 31, wherein the encoded instructions further cause the spectroscopy analysis system to generate spectroscopically resolved voxels by: repeating the two-phase homodyne imaging at each reference arm delay, stacking resulting images, correcting for spatial drift, and Fourier transforming an interferogram at each pixel using the rotating frame.

33. The apparatus of claim 29, wherein the profile hint identifies resonances of interest.

34. The apparatus of claim 33, wherein a spectral resolution is selected based on the resonances of interest.

35. The apparatus of claim 33, wherein a maximum measure frequency is selected based on the resonances of interest.

36. The apparatus of claim 29, wherein the encoded instructions further cause the spectroscopy analysis system to feedback a subset of measurements taken from a grid.

37. The apparatus of claim 36, wherein the encoded instructions further cause the spectroscopy analysis system to update the subset to include an additional measurement from other areas of the grid.

38. The apparatus of claim 37, wherein the encoded instructions further cause the spectroscopy analysis system to generate an optimized trajectory of a tip of a probe to facilitate minimizing a scanning time.

39. A method comprising:
identifying a sample within an imaging and spectroscopy system;
applying, using a smart sampling algorithm, a grid to the sample;
generating, using the smart sampling algorithm, instructions that when executed by one or more processors cause the system to obtain a spectral image representation of the sample based on a subset of measurements from the grid in a selected pattern; and
feeding back the subset of measurements taken from the grid.

40. The method of claim 39 further comprising updating the subset to include, or remove, a measurement from other areas of the grid.

41. An apparatus comprising:
a non-transitory computer readable medium; and
a processing system,
wherein the non-transitory computer readable medium has program instructions stored thereon which, when executed by the processing system, direct the processing system to:
receive a profile hint associated with a sample that is the subject of spectroscopy analysis, wherein the profile hint identifies resonances of interest;
generate encoded instructions for performing the spectroscopy analysis of a sample based on selected sub-sampling of the subject; and
communicate the instructions to a spectroscopy analysis system that performs the spectroscopy analysis in accordance with the encoded instructions.

42. The apparatus of claim 41, wherein a spectral resolution is selected based on the resonances.

43. The apparatus of claim 41, wherein a maximum measure frequency is selected based on the resonances.

44. An apparatus comprising:
a non-transitory computer readable medium; and
a processing system,
wherein the non-transitory computer readable medium has program instructions stored thereon which, when executed by the processing system, direct the processing system to:
receive a profile hint associated with a sample that is the subject of spectroscopy analysis;
generate encoded instructions for performing the spectroscopy analysis of a sample based on selected sub-sampling of the subject; and
communicate the instructions to a spectroscopy analysis system that performs the spectroscopy analysis in accordance with the encoded instructions,
wherein the encoded instructions further cause the spectroscopy analysis system to feedback a subset of measurements taken from a grid.

45. The apparatus of claim 44, wherein the encoded instructions further cause the spectroscopy analysis system to update the subset to include an additional measurement from other areas of the grid.

46. The apparatus of claim 45, wherein the encoded instructions further cause the spectroscopy analysis system to generate an optimized trajectory of a tip of a probe to facilitate minimizing a scanning time.

* * * * *